US007848995B2

(12) United States Patent
Dalal

(10) Patent No.: US 7,848,995 B2
(45) Date of Patent: Dec. 7, 2010

(54) FINANCIAL DECISION SYSTEMS

(76) Inventor: Pankaj B. Dalal, 115-01 Sutter Ave., South Ozone Park, NY (US) 11420

( * ) Notice: Subject to any disclaimer, the term of this patent is extended or adjusted under 35 U.S.C. 154(b) by 345 days.

(21) Appl. No.: 11/523,368

(22) Filed: Sep. 18, 2006

(65) Prior Publication Data

US 2007/0067233 A1    Mar. 22, 2007

Related U.S. Application Data

(60) Provisional application No. 60/717,962, filed on Sep. 16, 2005, provisional application No. 60/730,121, filed on Oct. 24, 2005.

(51) Int. Cl.
*G06Q 10/00* (2006.01)
(52) U.S. Cl. .............................. 705/37; 705/35; 705/38; 705/39; 705/40
(58) Field of Classification Search ........................ None
See application file for complete search history.

(56) References Cited

U.S. PATENT DOCUMENTS

| | | | |
|---|---|---|---|
| 6,012,046 A | 1/2000 | Lupien et al. | |
| 6,317,728 B1* | 11/2001 | Kane | 705/36 R |
| 6,907,404 B1* | 6/2005 | Li | 705/36 R |
| 7,243,083 B2* | 7/2007 | Burns et al. | 705/37 |
| 7,356,499 B1* | 4/2008 | Amburn | 705/37 |
| 7,356,501 B2* | 4/2008 | Churquina | 705/37 |
| 7,392,214 B1* | 6/2008 | Fraser et al. | 705/37 |
| 7,403,921 B2* | 7/2008 | Tanpoco et al. | 705/37 |
| 2002/0069152 A1* | 6/2002 | B.C et al. | 705/37 |
| 2002/0069155 A1 | 6/2002 | Nafeh et al. | |
| 2002/0156719 A1* | 10/2002 | Finebaum et al. | 705/37 |
| 2002/0184134 A1* | 12/2002 | Olsen et al. | 705/37 |
| 2003/0004852 A1* | 1/2003 | Burns | 705/37 |
| 2004/0128225 A1* | 7/2004 | Thompson et al. | 705/37 |
| 2005/0075965 A1* | 4/2005 | Cutler | 705/37 |
| 2005/0075966 A1* | 4/2005 | Duka | 705/37 |
| 2005/0228735 A1* | 10/2005 | Duquette | 705/37 |
| 2005/0283422 A1* | 12/2005 | Myr | 705/37 |
| 2006/0036542 A1* | 2/2006 | McNair | 705/39 |
| 2006/0047590 A1* | 3/2006 | Anderson et al. | 705/35 |
| 2006/0112001 A1* | 5/2006 | Perales | 705/37 |
| 2006/0116943 A1* | 6/2006 | Willain | 705/35 |
| 2006/0265320 A1* | 11/2006 | Duquette | 705/37 |
| 2007/0022036 A1* | 1/2007 | Korzinin | 705/37 |
| 2007/0043648 A1* | 2/2007 | Chait | 705/37 |
| 2007/0162365 A1* | 7/2007 | Weinreb | 705/35 |

OTHER PUBLICATIONS

The Banker Technology Awards 2003 Banker, Jun. 1, 2003, 7 pages.*
The World at Your Fingertips Investor's Chronicle, Dec. 2005.*

* cited by examiner

*Primary Examiner*—Alexander Kalinowski
*Assistant Examiner*—Bruce I Ebersman
(74) *Attorney, Agent, or Firm*—Stoneman Volk Patent Group; Martin L. Stoneman; Michael D. Volk, Jr.

(57) ABSTRACT

The financial decision system provides for real-time calculation of buying pressure and selling pressure for any tradable instrument market. Additionally, it provides real-time visual simultaneous plots and charts of buying pressure and selling pressure. Further, the system automatically presents buy and sell indicators and expert commentary based on automatically detected market trend changes. The system automatically analyzes market trends and changes in multiple timeframes simultaneously to identify, in real time, multiple confirmations of suggested trading actions, such as buying or selling. The system also encompasses training materials and methods necessary for teaching concepts and methods of usage to improve the likelihood of success for new users.

24 Claims, 68 Drawing Sheets

RELATION BETWEEN V1 & V2 AT THE CONVERSION OF BEARISH WAVES TO BULLISH WAVES AT THE NEW CROSS (V1 - V2) -- Becomes positive value to negative $\Delta V1$ = Change in V1 from previous time frame - Decreases (less positive)

$\Delta V2$ = Change in V1 from previous time frame - Decreases (less positive)

$\boxed{\Delta V1} / \boxed{\Delta V2}$ = V-TWO Ratio Decreases or less positive Close - V1: Less negative (or negative to positive)

Close - V2: More negative

For most of the market conditions above facts may apply

RELATION BETWEEN V1 & V2 AT THE CONVERSION OF BULLISH WAVES TO BEARISH WAVES AT THE NEW CROSS (V1- V2) -- Becomes negative value to positive Δ V1 = Change in V1 from previous time frame- Decreases ( less positive)

Δ V2 = Change in V2 from previous time frame=Decreases ( less positive)

$$\boxed{\Delta V1} / \boxed{\Delta V2} = \text{V-TWO Ratio Increases}$$

Close - V1: More Negative compared to previous time frame
Close - V2: More Negative compared to previous time frame For most of the market conditions above facts may apply

RELATION BETWEEN V1 & V2 BEFORE THE CONVERSION OF BEARISH WAVES TO BULLISH WAVES AT THE NEW CROSS (V1 - V2) -- Positive value and becomes less positive towards crosses $\Delta V1$ = Change in V1 from previous time frame - Decreases (less positive)

$\Delta V2$ = Change in V2 from previous time frame - Increases (more positive)

$\boxed{\Delta V1} / \boxed{\Delta V2}$ = V-TWO Ratio Decreases or less positive Close –V1 : Less Negative (or negative to positive) Compared to previous time frame.

Close-V2: less Negative Compared to previous time frame.

For most of the market conditions above facts may apply

FIG. 7

RELATION BETWEEN V1 & V2 BEFORE THE CONVERSION OF BULLISH WAVES TO BEARISH WAVES AT THE NEW CROSS

(V1- V2) --Becomes less negative compared to previous time frame. But always negative $\Delta$ V1 = Change in V1 from previous time frame- positive $\Delta$ V2 = Change in V2 from previous time frame=Decreases ( less positive)

$\boxed{\Delta \mathbf{V1}} \Big/ \boxed{\Delta \mathbf{V2}}$ = V-TWO Ratio Increases Close - V1: More negative compared to previous time frame Close - V2: Less negative compared to previous time frame For most of the market conditions above facts may apply

FIG. 8

RELATION BETWEEN V3 & V4 AT THE CONVERSION OF BEARISH WAVES TO BULLISH WAVES AT THE NEW CROSS

(V3 - V4) -- Becomes negative value to more negative or less negative

ΔV3 = Change in V3 from previous time frame- Increases (more positive)

ΔV4 = Change in V4 from previous time frame=Decrease (less positive)

$\boxed{\Delta V3} / \boxed{\Delta V4}$ = Full Ratio (V-FOUR) Increases or more positive Close - V3: Less negative (or negative to positive), more negative, more positive. less positive
Close - V4: More negative For most of the market condition above facts may apply

FIG. 11

RELATION BETWEEN V3 & V4 AT THE CONVERSION OF BULLISH WAVES TO BEARISH WAVES AT THE NEW CROSS (V3 - V4) -- Becomes negative value to positive ( & more positive), less positive Δ V3 = Change in V3 from previous time frame - Decreases (less positive). Occasionally it Increases more positive Δ V4 = Change in V4 from previous time frame - Decreases (less positive), more positive

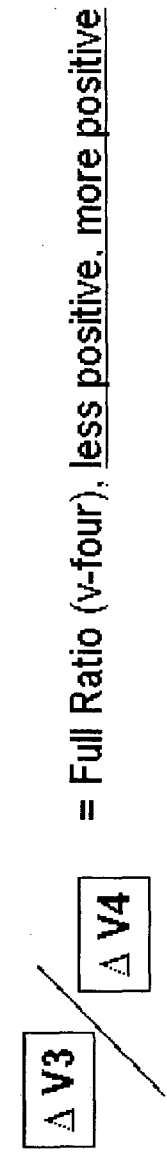

= Full Ratio (v-four), less positive, more positive

Close – V3: Less negative or more negative compared to previous time frame, positive to negative compared to previous time frame
Close - V4: Less negative, more negative compared to previous time frame For most of the market conditions above facts may apply

RELATION BETWEEN V3 & V4 BEFORE THE CONVERSION OF BEARISH WAVES TO BULLISH WAVES AT THE NEW CROSS (V3 - V4) -- Negative values, and becomes more negative towards crosses, or positive to negative ΔV3 = Change in V3 from previous time frame- Increases ( more positive)

ΔV4 = Change in V4 from previous time frame: Increases ( more positive), decreases ( less positive)

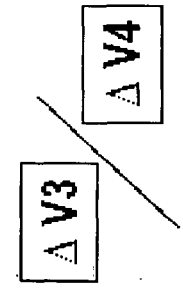
ΔV3 / ΔV4 = Full Ratio (V_FOUR) Decreases or less positive, increases or more positive Close - V3: Less negative or more negative Compared to previous time frame.

Close - V4: More negative Compared to previous time frame.

For most of the market conditions above facts may apply

RELATION BETWEEN V3 & V4 BEFORE THE CONVERSION OF BULLISH WAVES TO BEARISH WAVES AT THE NEW CROSS (V3 - V4) -- Becomes more positive towards cross compared to previous time frame. Or negative to positive compared to previous time frame $\Delta$ V3 - Change in V3 from previous time frame - less positive or decreases $\Delta$ V4 - Change in V4 from previous time frame : Decreases (less positive).

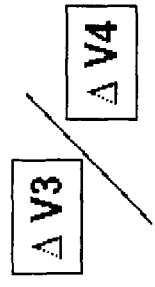 = Full Ratio (V-FOUR) less positive

Close - V3 : Less negative or more negative compared to previous time frame.
Close - V4: Less negative compared to previous time frame.

For most of the market conditions above facts may apply

SOME BASIS OF V1, V2, V3, & V4 & VOLATILITY

| Previous Time Frame | Before Cross — From Previous Time Frame | At Cross — From Previous Time Frame | After Cross — From Previous Time Frame | Previous Time Frame | Note |
|---|---|---|---|---|---|
| BULLISH WAVE TO BEARISH WAVE CONVERSION | | | | | |
| DECREASING | V1 < V2 | V1 > V2 | V1 > V2 | INCREASING | Most time |
| INCREASING | V3 > V4 | V3 > V4 | V3 > V4 | INCREASING | Most time |
| | | | | | |
| Bullish | Bullish | | Bearish | Bearish | Volatility |
| | Decrease | Increase | Increase | | |
| BEARISH WAVE TO BULLISH WAVE CONVERSION | | | | | |
| INCREASING | V1 > V2 | V1 < V2 | V1 < V2 | DECREASING | Most time |
| DECREASING | V3 < V4 | V3 > V4 | V3 < V4 | DECREASING | IF INDECISION IN PREVIOUS TIME FRAME |
| | | V3 = V4 | | | |
| Bearish | Bearish | Bullish | Bullish | Bullish | Volatility |
| | Decrease | Decrease | Increase | | |

HISTORY OF ALIGNMENT AND POSITIONS
FROM NEW CROSS

Alignments for US Dollar - Japanese Yen (USDJPY)
as of Date _____ Time Year_____

| Time Frame | Status | Since | Close at Cross |
|---|---|---|---|
| Yearly | Sell | 1 bar (S) | 109.0500 |
| Quarterly | Sell | 1 bar (S) | 109.0500 |
| Monthly | Sell | 1 bar (S) | 109.000 |
| Weekly | Sell | 0 bar (S) | 109.3500 |
| Daily | Sell | 6 bar (S) | 111.4000 |
| 720 minute | Sell | 12 bar (S) | 111.8100 |
| 660 minute | Sell | 20 bar (S) | 111.7500 |
| 600 minute | Sell | 15 bar (S) | 111.3700 |
| 540 minute | Buy | 0 bar (S) | 109.5800 |
| 480 minute | Buy | 0 bar (S) | 109.5100 |
| 420 minute | Buy | 0 bar (S) | 109.5200 |
| 360 minute | Buy | 0 bar (S) | 109.4900 |
| 300 minute | Sell | 5 bar (S) | 109.2300 |
| 240 minute | Buy | 0 bar (S) | 109.4900 |
| 288 minute | Buy | 0 bar (S) | 109.4900 |
| 180 minute | Buy | 0 bar (S) | 109.4900 |
| 120 minute | Buy | 1 bar (S) | 109.2500 |
| 90 minute | Buy | 2 bar (S) | 109.3800 |
| 60 minute | Sell | 1 bar (S) | 109.2200 |
| 45 minute | Sell | 1 bar (S) | 109.2700 |
| 30 minute | Sell | 3 bar (S) | 109.2500 |
| 15 minute | Buy | 1 bar (S) | 109.2200 |
| 10 minute | Sell | 0 bar (S) | 109.2700 |
| 5 minute | Sell | 2 bar (S) | 109.2200 |

Note: bar: One time frame. For 30 minute, 3 bar means ; since 3x 30 = 90 minutes
Note: Instead of above time frames from 5 minute to yearly, one can use the time frames in any multiple of a minute including a tick

FIG. 17A

MARKET SUMMARY

For-Ex Pairs
Long-Term Status Report
as of
11:00 AM, March 11, 2009

NOTE: FOR SHORT TERM, SWING TRADING OR DAY TRADING ONE CAN CHOOSE SIMILIAR LAYOUT. ALSO IT CAN INDICATE THE POSITION FROM CROSSES, BUY OR SELL, HIGHLIGHT WHICH ARE IN ALIGNMENT. ALSO WE CAN ADD QUATERLY OR YEARLY TIME FRAMES OR ANY OTHER TIME FRAME IN ANY MULTIPLE OF A MINUTE.

The following table represent the currencies daily variations in pips and Dollar value with a 100k contract size. The variation is calculated either on 1 day and 5, 10 and 20 days average.

| Pair | CHANGE OF Pip(1 day) | CHANGE OF $(1 day) | CHANGE OF Pip(5 day) | CHANGE OF $(5 day) | CHANGE OF Pip(10 day) | CHANGE OF $(10 day) | CHANGE OF Pip(20 day) | CHANGE OF $(20 day) |
|---|---|---|---|---|---|---|---|---|
| EUR-USD | 88 | 880 | 128 | 1280 | 116 | 1160 | 115 | 1190 |
| USD-JPY | 120 | 1067 | 140 | 1265 | 121 | 1079 | 103 | 916 |
| GBP-USD | 124 | 1240 | 178 | 1780 | 162 | 1620 | 151 | 1510 |
| USD-CHF | 88 | 877 | 133 | 1047 | 131 | 1008 | 131 | 1008 |
| USD-CAD | 146 | 1178 | 110 | 894 | 103 | 837 | 109 | 886 |
| AUD-USD | 84 | 840 | 74 | 740 | 72 | 720 | 79 | 780 |
| EUR-JPY | 99 | 791 | 166 | 1424 | 133 | 1163 | 112 | 996 |

| AT ALIGNMENT | BASE LINE TIME | TREND TIME | VERIFICATION TIME | ENTRY TIME | FIVE MINUTE | TYPE |
|---|---|---|---|---|---|---|
| FIRST SIGNAL | 120 | 60 | 45 | 10 | 5 | BULLISH |
| SECOND SIGNAL | 120 | 90 | 60 | 30 | 5 | BULLISH |
| THIRD SIGNAL | 180 | 120 | 90 | 60 | 5 | BULLISH |

FIG. 40

FINANCIAL DECISION SYSTEMS

CROSS-REFERENCE TO RELATED APPLICATION

The present application is related to and claims priority from prior provisional application Ser. No. 60/717,962, filed Sep. 16, 2005, entitled "FINANCIAL DECISION SYSTEMS", and is related to and claims priority from prior provisional application Ser. No. 60/730,121, filed Oct. 24, 2005, entitled "FINANCIAL DECISION SYSTEMS", the contents of both of which are incorporated herein by this reference and are not admitted to be prior art with respect to the present invention by the mention in this cross-reference section.

BACKGROUND

This invention relates to providing a system for improved decision making for buying and selling in financial markets. More particularly this invention relates to providing a system for providing improved reliability for early confirmation of changes in market trends for stocks, commodities, indexes, currencies or financial market derivatives, collectively referred to as Market Vehicles.

Technical analysis, which involves the evaluation of stocks based on historical market statistics and chart patterns, has become extremely popular in recent years. During the 1990's, a wide variety of tools became available to day traders and other types of retail traders. In summary, the objective of these tools is to provide the earliest possible identification of changes in market direction, up or down. These market analysis tools are often based on various statistical methods, such as J. Welles Wilder's directional movement index (DMI), critical path method, real time swing bar methods, etc. These methods and others provide a wealth of information to the trader, but they tend to be complicated and in some cases not completely real time in their displays and calculations. Additionally, market forces such as buying pressure and selling pressure are not completely evaluated or displayed meaningfully to the trader.

Additionally, the existing tools do not automatically provide the ability to evaluate market trends across more than one timeframe simultaneously. Thus, traders must manually evaluate different timeframes to confirm indications of changes in direction or continuation of a current trend.

Thus, it is highly desirable to provide a system for providing improved visual presentation of market trends and trend changes and automatic evaluation of market trends and trend changes over multiple timeframes. It is also highly desirable to provide training in decision-making for traders using real-time market analysis software.

OBJECTS AND FEATURES OF THE INVENTION

A primary object and feature of the present invention is to provide a system for real time calculation of buying pressure and selling pressure for any tradable instrument market.

It is a further object and feature of the present invention is to provide such a system for real time visual simultaneous presentation of buying pressure and selling pressure.

Another object and feature of the present invention is to provide such a system for automatic presentation of buy and sell indicators and expert commentary based on automatically detected market trend changes.

Yet another object and feature of the present invention is to provide such a system, preferably including training systems for traders to make better actual trading decisions, for automatic analysis of market trends and market changes in multiple timeframes to identify, in real time, multiple confirmations of suggested trading actions, such as buying or selling.

A further primary object and feature of the present invention is to provide such a system that is efficient, inexpensive, and handy. Other objects and features of this invention will become apparent with reference to the following descriptions.

It is noted that within figures showing screens, training charts, etc., preferably use color specifically to greatly assist speed and accuracy of visualization and learning; and the original within figures, including all the priority documents, are in specific colors. Although applicant has tried to point out in specification words and reference numbers the location and use of such colors, should this application be published without color, corresponding priority application(s) in the United States in such original colors will be available for public view and specification assistance.

SUMMARY OF THE INVENTION

In accordance with a preferred embodiment hereof, this invention provides a system related to assisting decision making, by least one trader, related to buying and selling at least one tradable instrument comprising the steps of: receiving historical time-relevant trading data relating to such at least one tradable instrument; calculating, as at least one first calculation, at least one first time-relevant value representing historical collective desire to sell such at least one tradable instrument using such historical time-relevant trading data for at least one plurality of timeframes; calculating, as at least one second calculation, at least one second time-relevant value representing historical collective desire to buy such at least one tradable instrument using such historical time-relevant trading data for such at least one plurality of timeframes; comparing such historical collective desire to sell such at least one tradable instrument to such historical collective desire to buy such at least one tradable instrument to make a first determining of at least one "greater-lesser relationship" between such historical collective desire to buy and such historical collective desire to sell for at least one timeframe of such at least one plurality of timeframes; from such first determining compared to at least one prior timeframe such "greater-lesser relationship" second determining, identifying any reversal of such "greater-lesser relationship" between such first determining and such second determining; and notifying such at least one trader of such any reversal; wherein such notifying may be used to assist such decision making by such least one trader. Moreover, it provides such a system further comprising the steps of: utilizing at least one computer-based program for performing required computations in substantially real-time; and utilizing such at least one computer-based program for communication with such at least one trader in substantially real-time. Additionally, it provides such a system further comprising the steps of: creating at least one first graphical representation of such at least one first time-relevant value for such at least one timeframe; creating at least one second graphical representation of such at least one second time-relevant value for such at least one timeframe; and wherein such at least one first graphical representation and such at least one second graphical representation are presented jointly in at least one comparative analysis chart providing at least one system relating to comparative analysis. Also, it provides such a system further comprising the steps of: calculating at least one third time-relevant value for such at least one timeframe; wherein such at least one third time-relevant value is based on at least one lowest price paid for such at least one tradable instrument for such at least one timeframe; calculating at least one fourth time-relevant value for such at least one timeframe; wherein such at least one fourth time-relevant value is based on at least one highest price paid for such at least one tradable instrument for such at least one timeframe; creating at least one third graphical representation of such at least one third time-relevant value for such at least one timeframe; creating at least one fourth graphical representation of such at least one fourth time-relevant value for such at least one timeframe; and wherein such at least one third graphical representation and such at least one fourth graphical representation are each presented jointly with such at least one first graphical representation and such at least one second graphical representation on such at least one comparative analysis chart. In addition, it provides such a system further comprising the steps of: calculating at least one fifth time-relevant value representing volatility of such at least one tradable instrument for such at least one timeframe; wherein such at least one fifth time-relevant value is based on at least one range of prices paid for such at least one tradable instrument for such at least one timeframe; creating at least one fifth graphical representation of such at least one fifth time-relevant value for such at least one timeframe; presenting such at least one fifth graphical representation in at least one volatility chart; and presenting such at least one volatility chart in conjunction with such at least one comparative analysis chart. And, it provides such a system wherein such at least one time relevant historical trading data comprises at least: highest price for such at least one tradable instrument for such at least one timeframe; lowest price for such at least one tradable instrument for such at least one timeframe; opening price for such at least one tradable instrument for such at least one timeframe; and closing price for such at least one tradable instrument for such at least one timeframe. Further, it provides such a system wherein: such at least one first time-relevant value is based on such at least one first calculation using at least such closing price for such at least one tradable instrument for such at least one timeframe; and such at least one second time-relevant value is based on such at least one second calculation using at least such closing price for such at least one tradable instrument for such at least one timeframe. Even further, it provides such a system wherein at least one set of buy/sell indicators comprises: at least one sell indicator; and at least one buy indicator. Moreover, it provides such a system wherein the step of notifying such at least one trader of such any reversal comprises the steps of: presenting such at least one sell indicator on such at least one comparative analysis chart when such at least one first time-relevant value is greater than such at least one second time-relevant value; and presenting such at least one buy indicator on such at least one comparative analysis chart when such at least one second time-relevant value is greater than such at least one first time-relevant value for at least one timeframe. Additionally, it provides such a system wherein such at least one plurality of timeframes comprise discrete periods of time, each of substantially different time lengths than each other, from at least one minute to at least one year. Also, it provides such a system further comprising the steps of: evaluating such at least two timeframes, in parallel, within at least one plurality of timeframes; calculating, in substantially real-time, any historically time-relevant trading trends, at least whether bearish trends or bullish trends, within each timeframe of such at least one plurality of timeframes signals; comparing each such calculation of such trading trends in such each timeframe with at least one trading trend in at least one timeframe prior to such each timeframe; and notifying such at least one trader of any such comparisons comprising a change in such trading trend (bearish versus bullish). In addition, it provides such a system wherein: each such prior timeframe, compared to each such timeframe, comprises at least one time-adjacent and equal-length timeframe as each such timeframe. And, it provides such a system further comprising the steps of: automatically comparing such historical collective desire to sell such at least one tradable instrument to such historical collective desire to buy such at least one tradable instrument to determine at least one "greater-lesser relationship" for at least one plurality of such periods of time of such at least one plurality of timeframes; automatically notifying such at least one trader of such results of such comparison for each of such at least one plurality of such periods of time for such at least one plurality of timeframes; and automatically notifying such at least one trader when such at least one reversal of such "greater-lesser relationship" occurs in at least two such discrete periods of time. Further, it provides such a system further comprising the step of automatically notifying such at least one trader when such at least one reversal of such "greater-lesser relationship" occurs in at least three such discrete periods of time. Even further, it provides such a system further comprising the step of automatically notifying such at least one trader when such at least one reversal of such "greater-lesser relationship" occurs in at least four such discrete periods of time. Moreover, it provides such a system further comprising the steps of: creating at least one first symbol representing occurrence of such at least one reversal of such "greater-lesser relationship" for joint presentation with at least one other chart; creating at least one second symbol representing such "greater-lesser relationship" for joint presentation with such at least one other chart; creating at least one third symbol representing occurrence of such at least one reversal of such "greater-lesser relationship" in at least three such discrete periods of time for joint presentation with such at least one other chart; and creating at least one fourth symbol representing occurrence of such at least one reversal of such "greater-lesser relationship" in at least four such discrete periods of time for joint presentation with such at least one other chart.

In accordance with another preferred embodiment hereof, this invention provides a computer program system relating to real-time analysis relating to assisting decision making, by least one trader, relating to buying and selling at least one tradable instrument comprising the steps of: electronically receiving, in substantially real-time, historical time-relevant trading data relating to such at least one tradable instrument; calculating, as at least one first calculation, in substantially real-time, at least one first time-relevant value representing historical collective desire to sell such at least one tradable instrument using such historical time-relevant trading data for at least one plurality of timeframes; calculating, as at least one first calculation, in substantially real-time, at least one second time-relevant value representing historical collective desire to buy such at least one tradable instrument using such historical time-relevant trading data for such at least one plurality of timeframes; comparing, in substantially real-time, such historical collective desire to sell such at least one tradable instrument to such historical collective desire to buy such at least one tradable instrument to make a first determining of at least one "greater-lesser relationship" between such historical collective desire to buy and such historical collective desire to sell for at least one timeframe of such at least one plurality of timeframes; from such first determining compared to at least one prior timeframe such "greater-lesser relationship" second determining, identifying any reversal of such "greater-lesser relationship" between such first determining and such second determining wherein such at least one reversal comprises at least one set of buy/sell indicators for such at least one tradable instrument; and displaying such at least one set of buy/sell indicators, in substantially real-time, to such at least one trader. Additionally, it provides such a computer program system further comprising the steps of: creating at least one first graphical representation of such at least one first time-relevant value for such at least one timeframe; creating at least one second graphical representation of such at least one second time-relevant value for such at least one timeframe; and displaying jointly such at least one first graphical representation and such at least one second graphical representation in at least one comparative analysis chart. Also, it provides such a computer program system further comprising the steps of: calculating at least one third time-relevant value for such at least one timeframe; wherein such at least one third time-relevant value is based on at least one lowest price paid for such at least one tradable instrument for such at least one timeframe; calculating at least one fourth time-relevant value for such at least one timeframe; wherein such at least one fourth time-relevant value is based on at least one highest price paid for such at least one tradable instrument for such at least one timeframe; creating at least one third graphical representation of such at least one third time-relevant value for such at least one timeframe; creating at least one fourth graphical representation of such at least one fourth time-relevant value for such at least one timeframe; and displaying such at least one third graphical representation and such at least one fourth graphical representation jointly with such at least one first graphical representation and such at least one second graphical representation on such at least one comparative analysis chart. In addition, it provides such a computer program system further comprising the steps of: calculating at least one fifth time-relevant value representing volatility of such at least one tradable instrument for such at least one timeframe; wherein such at least one fifth time-relevant value is based on at least one range of prices paid for such at least one tradable instrument for such at least one timeframe; creating at least one fifth graphical representation of such at least one fifth time-relevant value for such at least one timeframe; displaying such at least one fifth graphical representation in at least one volatility chart; and displaying jointly such at least one volatility chart with such at least one comparative analysis chart. And, it provides such a computer program system wherein such at least one time relevant historical trading data comprises at least: highest price for such at least one tradable instrument for such at least one timeframe; lowest price for such at least one tradable instrument for such at least one timeframe; opening price for such at least one tradable instrument for such at least one timeframe; and closing price for such at least one tradable instrument for such at least one timeframe. Further, it provides such a computer program system wherein: such at least one first time-relevant value is based on such at least one first calculation using such closing price for such at least one tradable instrument for such at least one timeframe; and such at least one second time-relevant value is based on such at least one second calculation using such closing price for such at least one tradable instrument for such at least one timeframe. Even further, it provides such a computer program system wherein such at least one set of buy/sell indicators comprises: at least one sell indicator; and at least one buy indicator. Moreover, it provides such a computer program system comprising the steps of: displaying such at least one sell indicator on such at least one comparative analysis chart when such at least one first time-relevant value is greater than such at least one second time-relevant value for at least one timeframe; and displaying such at least one buy indicator on such at least one comparative analysis chart when such at least one second time-relevant value is greater than such at least one first time-relevant value for at least one timeframe. Additionally, it provides such a computer program system wherein such at least one plurality of timeframes comprise discrete periods of time, each of substantially different time lengths than each other, from at least one minute to at least one year. Also, it provides such a computer program system further comprising the steps of: evaluating such at least two timeframes, in parallel, within at least one plurality of timeframes; calculating, in substantially real-time, any historically time-relevant trading trends, at least whether bearish trends or bullish trends, within each timeframe of such at least one plurality of timeframes signals; comparing each such calculation of such trading trends in such each timeframe with at least one trading trend in at least one timeframe prior to such each timeframe; and notifying such at least one trader of any such comparisons comprising a change in such trading trend (bearish versus bullish). In addition, it provides such a system wherein: each such prior timeframe, compared to each such timeframe, comprises at least one time-adjacent and equal-length timeframe as each such timeframe. And, it provides such a computer program system further comprising the steps of: automatically comparing such historical collective desire to sell such at least one tradable instrument to such historical collective desire to buy such at least one tradable instrument to determine at least one "greater-lesser relationship" for at least one plurality of such periods of time of such at least one plurality of timeframes; automatically notifying such at least one trader of such results of such comparison for each of such at least one plurality of such periods of time for such at least one plurality of timeframes; and automatically notifying such at least one trader when such at least one reversal of such "greater-lesser relationship" occurs in at least two such discrete periods of time. Further, it provides such a computer program system further comprising the step of automatically notifying such at least one trader when such at least one reversal of such "greater-lesser relationship" occurs in at least three such discrete periods of time. Even further, it provides such a computer program system further comprising the step of automatically notifying such at least one trader when such at least one reversal of such "greater-lesser relationship" occurs in at least four such discrete periods of time. Moreover, it provides such a computer program system further comprising the steps of: creating at least one first symbol representing occurrence of such at least one reversal of such "greater-lesser relationship" for joint display with at least one other chart; creating at least one second symbol representing such "greater-lesser relationship" for joint display with such at least one other chart; creating at least one third symbol representing occurrence of such at least one reversal of such "greater-lesser relationship" in at least three such discreet periods of time for joint display with such at least one other chart; and creating at least one fourth symbol representing occurrence of such at least one reversal of such "greater-lesser relationship" in at least four such discrete period of time for joint display with such at least one other chart.

In accordance with another preferred embodiment hereof, this invention provides a computer real-time analysis system, relating to assisting decision making, by at least one trader, related to buying and selling at least one tradable instrument comprising: at least one computer processor adapted for receiving, in substantially real-time, historical time-relevant trading data relating to such at least one tradable instrument; at least one computer processor adapted for calculating, as at least one first calculation, in substantially real-time, at least one first time-relevant value representing historical collective desire to sell such at least one tradable instrument using such historical time-relevant trading data for at least one plurality of timeframes; at least one computer processor adapted for calculating, as at least one second calculation, in substantially real-time, at least one second time-relevant value representing historical collective desire to buy such at least one tradable instrument using such historical time-relevant trading data for such at least one plurality of timeframes; at least one computer processor adapted for comparing, in substantially real-time, such historical collective desire to sell such at least one tradable instrument to such historical collective desire to buy such at least one tradable instrument to make a first determining of at least one "greater-lesser relationship" between such historical collective desire to buy and such historical collective desire to sell for at least one timeframe of such at least one plurality of timeframes; at least one computer processor adapted for comparing such first determining to at least one prior timeframe such "greater-lesser relationship" second determining, for identifying any reversal of such "greater-lesser relationship" buy/sell indicators for such at least one tradable instrument; and at least one computer processor adapted for displaying such at least one set of buy/sell indicators, in substantially real-time, to such at least one trader. Additionally, it provides such a computer real-time analysis system further comprising: at least one computer processor adapted for creating at least one first graphical representation of such at least one first time-relevant value for such at least one timeframe; at least one computer processor adapted for creating at least one second graphical representation of such at least one second time-relevant value for such at least one timeframe; and at least one computer processor adapted for jointly displaying such at least one first graphical representation and such at least one second graphical representation in at least one comparative analysis chart providing at least one system relating to comparative analysis. Also, it provides such a computer real-time analysis system further comprising: at least one computer processor adapted for calculating at least one third time-relevant value for such at least one timeframe; wherein such at least one third time-relevant value is based on at least one lowest price paid for such at least one tradable instrument for such at least one timeframe; at least one computer processor adapted for calculating at least one fourth time-relevant value for such at least one timeframe; wherein such at least one fourth time-relevant value is based on at least one highest price paid for such at least one tradable instrument for such at least one timeframe; at least one computer processor adapted for creating at least one third graphical representation of such at least one third time-relevant value for such at least one timeframe; at least one computer processor adapted for creating at least one fourth graphical representation of such at least one fourth time-relevant value for such at least one timeframe; and at least one computer processor adapted for jointly displaying such at least one third graphical representation and such at least one fourth graphical representation on such at least one comparative analysis chart. In addition, it provides such a computer real-time analysis system further comprising: at least one computer processor adapted for calculating at least one fifth time-relevant value representing volatility of such at least one tradable instrument for such at least one timeframe; wherein such at least one fifth time-relevant value is based on at least one range of prices paid for such at least one tradable instrument for such at least one timeframe; at least one computer processor adapted for creating at least one fifth graphical representation of such at least one fifth time-relevant value for such at least one timeframe; at least one computer processor adapted for displaying such at least one fifth graphical representation in at least one volatility chart; and at least one computer processor adapted for displaying such at least one volatility chart in conjunction with such at least one comparative analysis chart. And, it provides such a computer real-time analysis system wherein such at least one time relevant historical trading data comprises at least: highest price for such at least one tradable instrument for such at least one timeframe; lowest price for such at least one tradable instrument for such at least one timeframe; opening price for such at least one tradable instrument for such at least one timeframe; and closing price for such at least one tradable instrument for such at least one timeframe. Further, it provides such a computer real-time analysis system wherein: such at least one first time-relevant value is based on such at least one first calculation using such closing price for such at least one tradable instrument for such at least one timeframe; and such at least one second time-relevant value is based on such at least one second calculation using such closing price for such at least one tradable instrument for such at least one timeframe. Even further, it provides such a computer real-time analysis system wherein such at least one set of buy/sell indicators comprises: at least one sell indicator; and at least one buy indicator. Moreover, it provides such a computer real-time analysis system comprises: at least one computer processor adapted for displaying such at least one sell indicator on such at least one comparative analysis chart when such at least one first time-relevant value is greater than such at least one second time-relevant value for at least one timeframe; and at least one computer processor adapted for displaying such at least one buy indicator on such at least one comparative analysis chart when such at least one second time-relevant value is greater than such at least one first time-relevant value for at least one timeframe. Additionally, it provides such a computer real-time analysis system wherein such at least one plurality of timeframes comprise discrete periods of time, each of substantially different time lengths than each other, from at least one minute to at least one year. Also, it provides such a computer real-time analysis system further comprising: at least one computer processor adapted for parallel evaluation of such at least two timeframes within at least one plurality of timeframes comprising discrete periods of time, each of substantially different time lengths than each other, and each ending at the present time, from at least one minute to at least one year; at least one computer processor adapted for calculating, in substantially real-time, any historically time-relevant trading trends, at least whether bearish trends or bullish trends, within each timeframe of such at least one plurality of timeframes signals; at least one computer processor adapted for comparing each such calculation of such trading trends in such each timeframe with at least one trading trend in at least one timeframe prior to such each timeframe; and at least one computer processor adapted for notifying such at least one trader of any such comparisons comprising a change in such trading trend (bearish versus bullish). In addition, it provides such a computer real-time analysis system wherein: each such prior timeframe, compared to each such timeframe, comprises at least one time-adjacent and equal-length timeframe as each such timeframe. And, it provides such a computer real-time analysis system further comprising: at least one computer processor adapted for automatically comparing such historical collective desire to sell such at least one tradable instrument to such historical collective desire to buy such at least one tradable instrument to determine at least one "greater-lesser relationship" for at least one plurality of such periods of time of such at least one plurality of timeframes; at least one computer processor adapted for automatically notifying such at least one trader of such results of such comparison for each of such at least one plurality of such periods of time for such at least one plurality of timeframes; and at least one computer processor adapted for automatically notifying such at least one trader when such at least one reversal of such "greater-lesser relationship" occurs in at least two such discrete periods of time. Further, it provides such a computer real-time analysis system further comprising at least one computer processor adapted for automatically notifying such at least one trader when such at least one reversal of such "greater-lesser relationship" occurs in at least three such discrete periods of time. Even further, it provides such a computer real-time analysis system further comprising at least one computer processor adapted for automatically notifying such at least one trader when such at least one reversal of such "greater-lesser relationship" occurs in at least four such discrete periods of time. Even further, it provides such a computer real-time analysis system further comprising: at least one computer processor adapted for creating at least one first symbol representing occurrence of such at least one reversal of such "greater-lesser relationship" for joint presentation with at least one other chart; at least one computer processor adapted for creating at least one second symbol representing such "greater-lesser relationship" for joint presentation with such at least one other chart; at least one computer processor adapted for creating at least one third symbol representing occurrence of such at least one reversal of such "greater-lesser relationship" in at least three such discrete periods of time for joint presentation with such at least one other chart; and at least one computer processor adapted for creating at least one fourth symbol representing occurrence of such at least one reversal of such "greater-lesser relationship" in at least four such discrete periods of time for joint presentation with such at least one other chart.

In accordance with another preferred embodiment hereof, this invention provides a computer real-time analysis system, relating to assisting decision making, by at least one trader, related to buying and selling at least one tradable instrument comprising: at least one computer processor adapted for receiving, in substantially real-time, historical time-relevant trading data relating to such at least one tradable instrument; at least one computer processor adapted for parallel evaluation within at least one plurality of timeframes comprising discrete periods of time, each of substantially different time lengths than each other, and each ending at the present time, from at least one minute to at least one year; at least one computer processor adapted for calculating, in substantially real-time, any historically time-relevant trading trends, at least whether bearish trends or bullish trends, within each timeframe of such at least one plurality of timeframes signals; at least one computer processor adapted for comparing each such calculation of such trading trends in such each timeframe with at least one trading trend in at least one timeframe prior to such each timeframe; at least one computer processor adapted for notifying such at least one trader of any such comparisons comprising a change in such trading trend (bearish versus bullish). Even further, it provides such a computer real-time analysis system wherein: each such prior timeframe, compared to each such timeframe, comprises at least one time-adjacent and equal-length timeframe as each such timeframe. Even further, it provides such a computer real-time analysis system wherein: such at least one plurality of timeframes comprises at least one part of multiple sets of such pluralities (of such different discrete periods of time) wherein each such set comprises a different combination of such discrete periods from any other such set; at least one computer processor adapted for determining which of such sets are bullish and which of such sets are bearish; and at least one computer processor adapted for notifying such at least one trader of each of such sets which are bullish and each of such sets which are bearish; wherein such notifying may be used to assist such decision making by such least one trader.

In accordance with another preferred embodiment hereof, this invention provides a method of assisting instruction, relating to a computer real-time analysis system having at least one analysis screen to assist decision making by at least one trader in trading at least one tradable instrument, related to use in instruction of such at least one trader, comprising the steps of: providing at least one first teaching aid comprising at least one first explanatory chart associated with at least one example of such at least one analysis screen; wherein such at least one analysis screen comprises at least one indicator signal computed by such computer real-time analysis system; providing at least one second teaching aid comprising at least one second explanatory chart relating to at least one method of computation of such at least one indicator signal; providing at least one third teaching aid comprising at least one third explanatory chart relating to interpretation of such at least one indicator signal; and providing at least one fourth teaching aid comprising at least one fourth explanatory chart relating to directly guiding trading decisions of such at least one trader. Even further, it provides such a method further comprising the step of: providing instruction of such at least one trader relating to such directly guiding trading decisions of such at least one trader using such at least one first teaching aid, such at least one second teaching aid, such at least one third teaching aid, and such at least one fourth teaching aid. Even further, it provides such a method wherein such at least one indicator signal comprises: V-FOUR indicators produced by such computer real-time analysis system; V-TWO indicators produced by such computer real-time analysis system; Alignment indicators produced by such computer real-time analysis system; and Commentary indicators produced by such computer real-time analysis system. Even further, it provides such a method wherein such at least one indicator signal further comprises: New Cross indicator produced by such computer real-time analysis system; Synthetic Cross indicator produced by such computer real-time analysis system; Dot Theory indicator produced by such computer real-time analysis system; and Golden Bar Theory indicators produced by such computer real-time analysis system. Even further, it provides such a method wherein such at least one indicator signal further comprises FX Pivot Theory indicators produced by such computer real-time analysis system. Even further, it provides such a method wherein such at least one indicator signal further comprises Volatility Theory indicators produced by such computer real-time analysis system. Even further, it provides such a method wherein such at least one indicator signal further comprises Reversal Bar indicator produced by such computer real-time analysis system. Even further, it provides such a method wherein such at least one indicator signal further comprises Real Time Swing Bar Theory indicators produced by such computer real-time analysis system. Even further, it provides such a method wherein such at least one indicator signal further comprises Day Trader Heaven indicators produced by such computer real-time analysis system. Even further, it provides such a method wherein such at least one indicator signal further comprises Swing Trader Heaven indicators produced by such computer real-time analysis system. Even further, it provides such a method wherein such at least one indicator signal further comprises Short Term Trader Heaven indicators produced by such computer real-time analysis system. Even further, it provides such a method wherein such at least one indicator signal further comprises Long Term Trader Heaven Theory indicators produced by such computer real-time analysis system. Even further, it provides such a method wherein such at least one indicator signal further comprises Critical Path Method for Alignment indicators produced by such computer real-time analysis system. Even further, it provides such a method further comprising the steps of: providing at least one training curriculum relating to such instruction; conducting at least one training session based on such at least one curriculum; and recording such conducting of such at least one training session. Even further, it provides such a method wherein such step of conducting at least one training session based on such at least one curriculum comprises the steps of: conducting at least one live classroom-based training session; and conducting at least one live Internet-based training session. Even further, it provides such a method further comprising the steps of: preparing at least one recording of such at least one live classroom-based training session; preparing at least one recording of such at least one live Internet-based hands-on training session. Even further, it provides such a method further comprising the steps of: providing for distribution of such at least one recording on at least one form of distributable media; and providing for distribution of such at least one recording from at least one Internet-based web site. Even further, it provides such a method wherein: multiple colors are used to distinguish elements of such at least one first explanatory chart; multiple colors are used to distinguish elements of such at least one second explanatory chart; multiple colors are used to distinguish elements of such at least one third explanatory chart; and multiple colors are used to distinguish elements of such at least one fourth explanatory chart.

In accordance with another preferred embodiment hereof, this invention provides a kit system relating to assisting instruction of at least one trader, relating to a computer real-time analysis system having at least one analysis screen (wherein such at least one analysis screen comprises at least one indicator signal computed by such computer real-time analysis system) to assist decision making by such at least one trader in trading at least one tradable instrument, comprising: at least one first teaching aid comprising at least one first explanatory chart associated with at least one example of such at least one analysis screen; at least one second teaching aid comprising at least one second explanatory chart relating to at least one method of computation of such at least one indicator signal; at least one third teaching aid comprising at least one third explanatory chart relating to interpretation of such at least one indicator signal; and at least one fourth teaching aid comprising at least one fourth explanatory chart relating to directly guiding trading decisions of such at least one trader.

DEFINITIONS, ACRONYMS AND CROSS-REFERENCES

The following terms and acronyms are explained below as background and are used throughout the detailed description:

Bollinger Bands. A technical analysis technique in which lines are plotted two standard deviations above and below a moving average, and at the moving average itself. Because standard deviation measures volatility, these bands will be wider during increased volatility and narrower during decreased volatility. Some technical analysts consider a market which approaches the upper band to be overbought, and a market which approaches the lower band to be oversold.

PIP. The smallest price change that a given exchange rate can make. Since most major currency pairs are priced to four decimal places, the smallest change is that of the last decimal point—for most pairs this is the equivalent of $1/100^{th}$ of one percent, or one basis point. For example, the smallest move the USD/CAD currency pair can make is $0.0001, or one basis point. The smallest move in a currency does not always need to be equal to one basis point, but this is generally the case with most currency pairs.

Pivot/Pivot Point. A technical indicator derived by calculating the numerical average of a particular stock's high, low and closing prices. The pivot point is used as a predictive indicator. If the following day's market price falls below the pivot point, it may be used as a new resistance level. Conversely, if the market price rises above the pivot point, it may act as the new support level.

Relative Strength Index (RSI). Technical analysis indicator which measures the magnitude of gains over a given time period against the magnitude of losses over that period. The equation is $RSI=100-100/(1+RS)$ where $RS=$(total gains/n)/(total losses/n) and n=number of RSI periods. The value can range from 1 to 100. Some technical analysts believe that a value of 30 or below indicates an oversold condition and that a value of 70 or above indicates an overbought condition.

Stochastic. A model based on the belief that as prices increase (or decrease), closing prices tend to accumulate ever more closely to the highs (or lows) for a given period.

Tick. As use herein, one tick is one completed transaction, for example five ticks refers to five completed transactions, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 shows the relation between V1 and V2 at the conversion of bearish waves to bullish waves at a new cross according to a preferred embodiment of the present invention.

FIG. 6 shows the relation between V1 and V2 at the conversion of bullish waves to bearish waves at a new cross according to a preferred embodiment of the present invention.

FIG. 7 shows the relation between V1 and V2 before the conversion of bearish waves to bullish waves at the new cross according to a preferred embodiment of the present invention.

FIG. 8 shows the relation between V1 and V2 before the conversion of bullish waves to bearish waves at the new cross according to a preferred embodiment of the present invention.

FIG. 11 shows the relation between V3 and V4 at the conversion of bearish waves to bullish waves at a new cross according to a preferred embodiment of the present invention.

FIG. 12 shows the relation between V3 and V4 at the conversion of bullish waves to bearish waves at a new cross according to a preferred embodiment of the present invention.

FIG. 13 shows the relation between V3 and V4 before the conversion of bearish waves to bullish waves at a new cross according to a preferred embodiment of the present invention.

FIG. 14 shows the relation between V3 and V4 before the conversion of bullish waves to bearish waves at a new cross according to a preferred embodiment of the present invention.

FIG. 15 shows a table illustrating some basis for V1, V2, V3, and V4 and volatility according to a preferred embodiment of the present invention.

FIG. 17A shows a table illustrating the concept of history of alignment and positions from a new cross according to a preferred embodiment of the present invention.

FIG. 26A shows a display illustrating a market summary presentation of generated symbols for currency pairs at selected timeframes according to a preferred embodiment of the present invention.

FIG. 34 shows a chart illustrating the FX volatility theory for selected currency pairs according to a preferred embodiment of the present invention.

FIG. 40 shows a table illustrating expert commentary generated for three consecutive alignments according to a preferred embodiment of the present invention.

Figure 1:
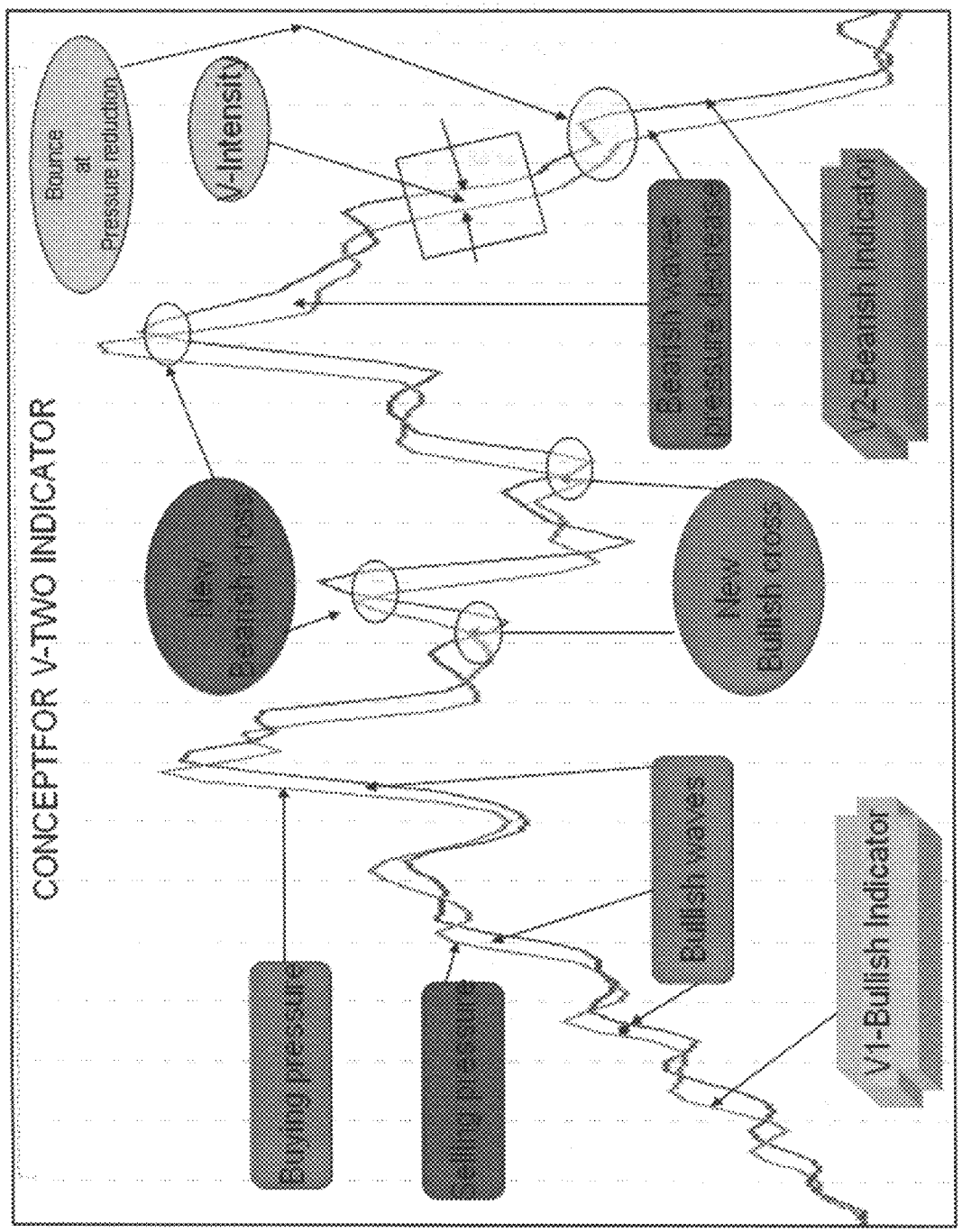
FIG. 1 shows an illustration of V-TWO Indicator display concepts according to a preferred embodiment of the present invention.

DETAILED DESCRIPTION OF THE BEST MODES AND PREFERRED EMBODIMENTS OF THE INVENTION

Multiple Timeframe Alignment Concepts

For stocks, commodities, indexes, currencies or financial market derivatives (referred to collectively as tradable instruments or "Market Vehicles") price movement and price changes create internal (embedded) trends as well as external trends which may be identified as bullish or bearish trends. A trend may be evaluated on a variety of historical timeframes from one tick (one transaction), to one minute to any multiple of minutes (for example: five minutes, 60 minutes, 400 minutes, daily, weekly, yearly, etc.). Evaluation of the open, close, high and low prices of a trend for each of the various historical timeframes will produce a set trend lines, or waves, relative to each timeframe evaluated. Each wave will indicate either a bearish trend, in which prices are falling, or a bullish trend, in which prices are rising. Trending agreement, between waves in multiple timeframes, some or all bullish (buying pressure) or some or all bearish (selling pressure), can be recognized as either buying or selling opportunities. Preferably, agreement, hereinafter referred to as alignment, occurring at a transition point (reversal of the relationship between buying pressure and selling pressure) represents a significant buying or selling opportunity (at least herein embodying from such first determining compared to at least one prior timeframe such "greater-lesser relationship" second determining, identifying any reversal of such "greater-lesser relationship" between such first determining and such second determining; at least herein embodying notifying such at least one trader of such any reversal; and at least herein embodying wherein such notifying may be used to assist such decision making by such least one trader). The transition point, hereinafter referred to as a New Cross, is point at which the prevailing trend, either bearish or bullish, of open, close, high or low prices for a Market Vehicle reverses direction.

According to a preferred embodiment of the present invention an alignment represents multiple confirmations of true reversals at the beginning of either a new embedded trend or an external trend. Preferably, alignment can be done either for all bullish or all bearish waves for two or more timeframes from one minute to one year or any multiple of minutes in between. Preferably, the grouping identifies the trend and the number of smaller to bigger timeframes in alignment. The more waves of different timeframes in alignment preferably signifies the strength of the trend, which can be interpreted as buying pressure for bullish waves and selling pressure for bearish waves. Preferably, increasing numbers of timeframes in alignment indicates a stronger trend or more pressure or more strength of a wave. Decreasing numbers of timeframes in alignment indicates less strong waves and therefore less pressure. Preferably, longer timeframes in alignment indicate a better possibility of the trend's real direction than only shorter timeframes in alignment. However, examination of the sequence of several of such alignments can preferably indicate movement of smaller bullish or bearish waves to bigger waves. Identification of more than two sequential alignment patterns preferably gives further confirmation of direction of either bullish or bearish waves. Knowing this, traders can stay in trades until these sequences weaken or are broken with opposite types of waves. Existence of opposite types of waves can preferably indicate exits in trading. This allows traders to stay in or exit trades with confidence while avoiding "noise" or false signals.

Preferably, any bullish or bearish bias is based on preceding price actions and future confirmation. Bullish to bearish wave formation begins after advancement of bullish waves for certain timeframes from previous transition or reversal points (New Crosses). The bullish waves start weakening and at an indecision point in the market, they have equilibrium with bearish waves. In real market conditions, such as uncertain times, indecision exists and at those times bullish and bearish waves balance. Preferably, the increasing intensity of bearish waves is signified by alignment of additional bearish waves created by selling pressure. Preferably, a new reversal point is confirmed (New Cross, new buy or sell signal) verifying that several waves for varying timeframes are in alignment. Preferably, some event interjections (see explanation below) of external values to the algorithms (bearish and bullish) may be required to create New Crosses. Preferably, after a bullish to bearish indecision point, further bearish waves are required for bearish confirmation.

Basis of Algorithm

Variables such as open, close, high, low prices of a particular Market Vehicle, received as a real-time data feed for the Market Vehicle, may be evaluated for any particular timeframe (from one minute to one year (at least herein embodying receiving historical time-relevant trading data relating to such at least one tradable instrument). Preferably, the results of that evaluation permit plotting, in real time, at least one buying pressure line (typically green) and at least one selling pressure line (typically red) against X and Y axis (at least herein embodying utilizing at least one computer-based program for performing required computations in substantially real-time; and at least herein embodying utilizing such at least one computer-based program for communication with such at least one trader in substantially real-time). Preferably, two separate algorithms are used to determine the lines to be plotted:

V1: Selling pressure real time plot as a red line (at least herein embodying calculating, as at least one first calculation, at least one first time-relevant value representing historical collective desire to sell such at least one tradable instrument using such historical time-relevant trading data for at least one plurality of timeframes); and V2: Buying pressure real time plot as a green line (at least herein embodying calculating, as at least one second calculation, at least one second time-relevant value representing historical collective desire to buy such at least one tradable instrument using such historical time-relevant trading data for such at least one plurality of timeframes).

Figure 2:
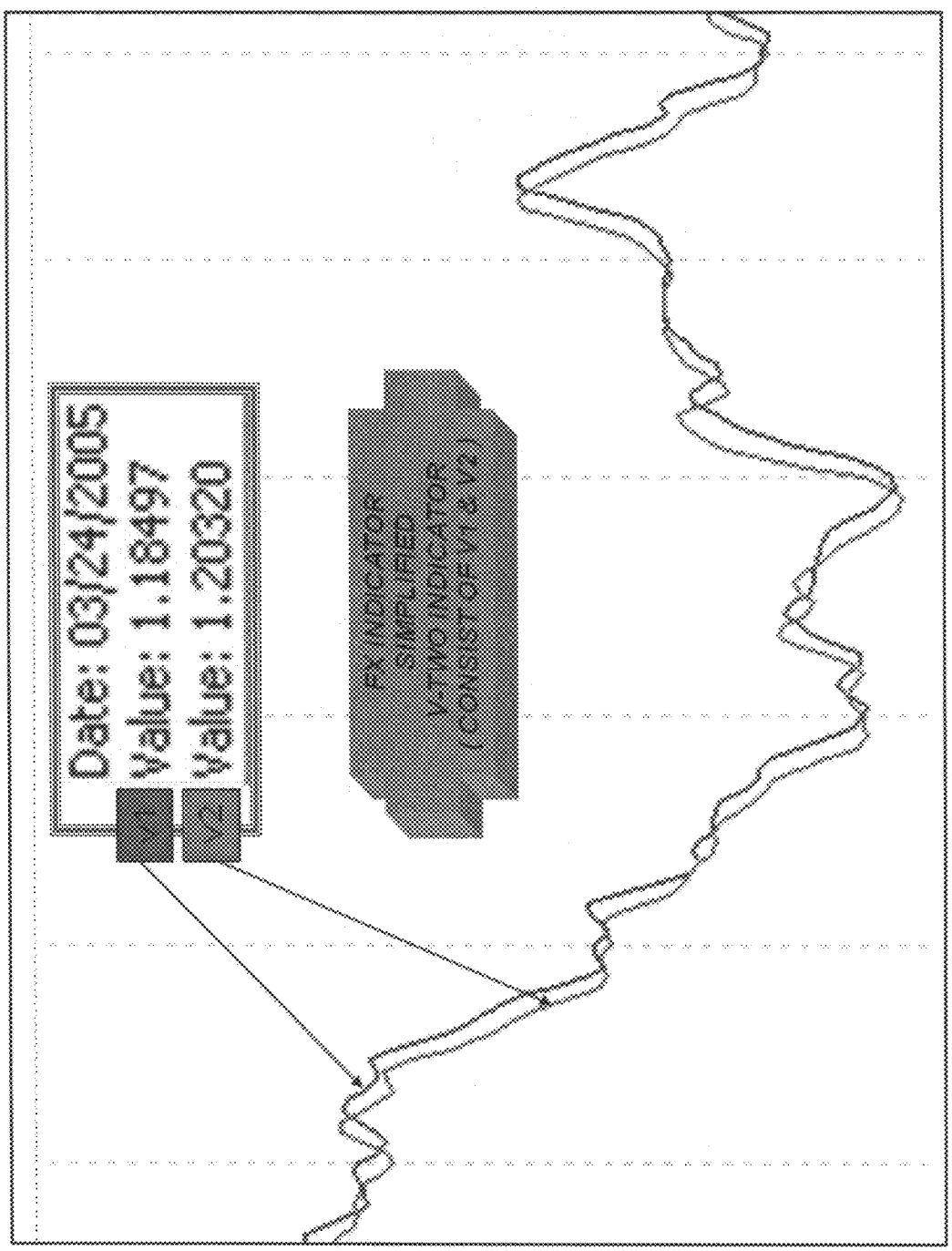
FIG. 2 shows an example of V-TWO Indicator display with an illustration of values for V1 and V2 according to a preferred embodiment of the present invention.
Figure 3:
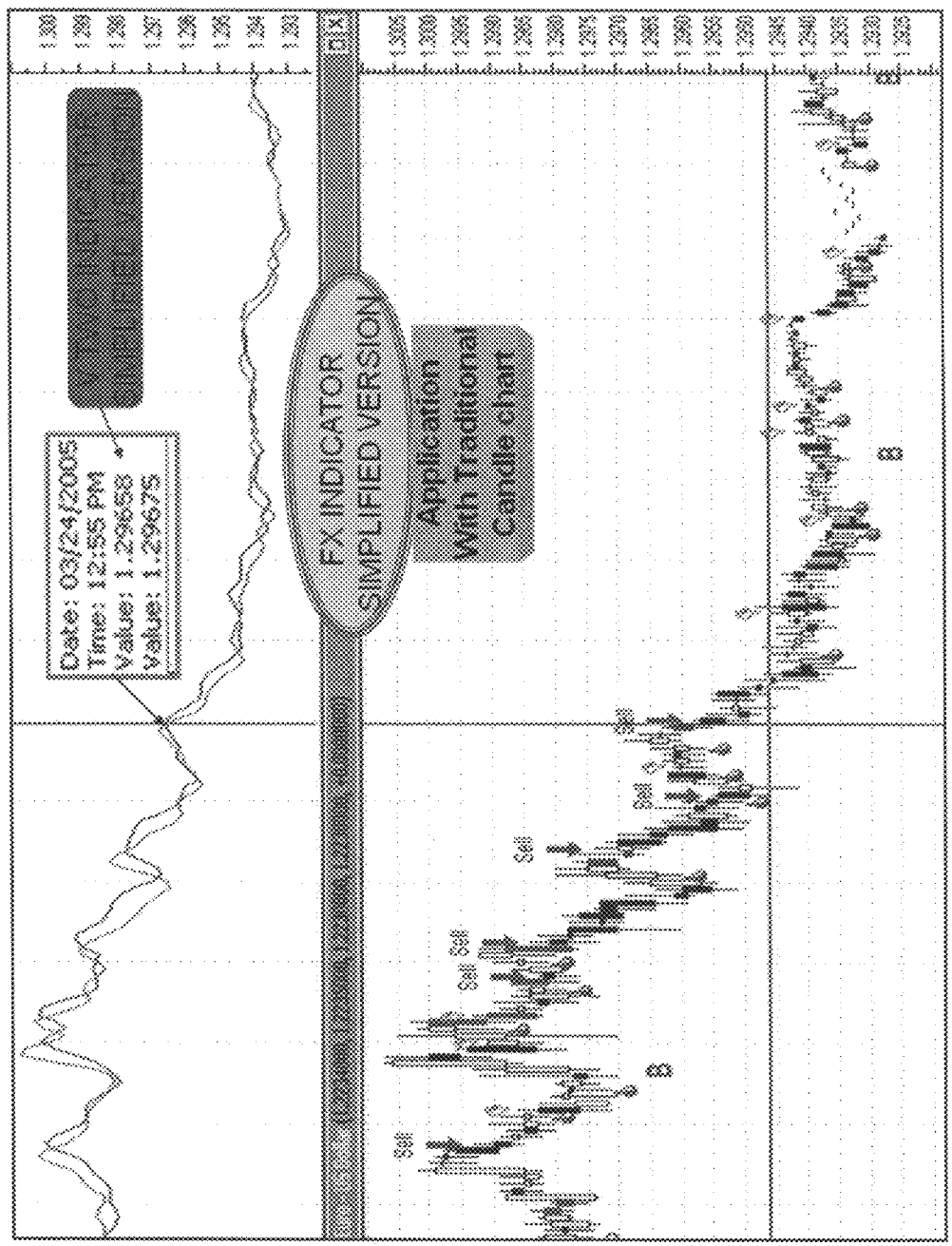
FIG. 3 shows an example of use of V-TWO Indicator display in conjunction with traditional candle chart according to a preferred embodiment of the present invention.
Figure 4:
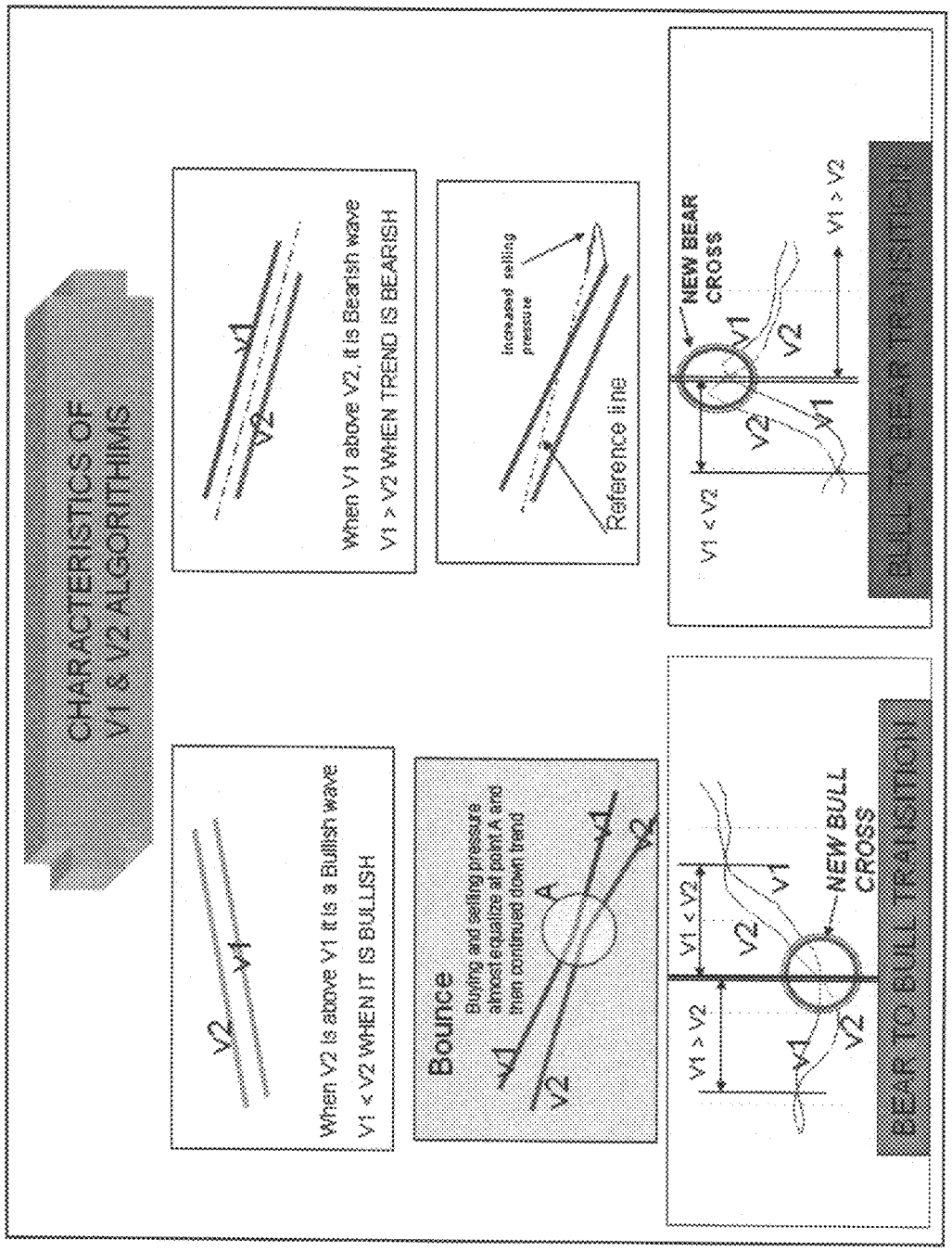
FIG. 4 shows an illustration of the characteristics of V1 and V2 in varying situations according to a preferred embodiment of the present invention.

Preferably, both algorithms are created using mathematical formulas based on open, high, low, close prices of the Market Vehicle for a particular timeframe either independently, or in a combination with some variable factors and constants. For example, preferably the open and close price may be used for the average of any number of timeframes using a natural log function as an exponent. Upon reading the teachings of this specification, those with ordinary skill in the art will now understand that, under appropriate circumstances, considering issues such as availability of market data, etc., other arrangements, such as, for example, availability of bid and ask prices, etc., other trend calculation methods may suffice. Examples of the preferred relationship between both algorithms and how they can create a New Cross, or new transition point, in a particular timeframe are shown in FIG. 1, FIG. 2 and FIG. 3 (at least herein embodying creating at least one first graphical representation of such at least one first time-relevant value for such at least one timeframe, and at least herein embodying creating at least one second graphical representation of such at least one second time-relevant value for such at least one timeframe; and at least herein embodying wherein such at least one first graphical representation and such at least one second graphical representation are presented jointly in at least one comparative analysis chart providing at least one system relating to comparative analysis). The preferred basic behaviors of both V1 and V2 for bullish and bearish trends are shown in FIG. 4. As shown in FIG. 4, bullish trends are signified by V2 being above V1 and the reverse for bearish trends (at least herein embodying comparing such historical collective desire to sell such at least one tradable instrument to such historical collective desire to buy such at least one tradable instrument to make a first determining of at least one "greater-lesser relationship" between such historical collective desire to buy and such historical collective desire to sell for at least one timeframe of such at least one plurality of timeframes).

Preferably, evaluating the characteristics and behavior of V1 and V2, permits one to predict the end or the beginning of either a bull or a bearish trend. Preferably, V1 and V2 both may be created with open or close prices with several variable factors in order to achieve the characteristics shown in FIG. 4.

Preferred Definitions

FX Indicator: The FX Indicator preferably includes plotting a green line (V2), a red line (V1) and green dots (V4), and red dots (V3). The formulas for the FX Indicator preferably determine trends, bullish or bearish and the Bounces and New Crosses for a Market Vehicle. Preferably, V1, V2, V3 and V4 algorithms are recalculated and re-plotted as each new set of market data values is received.

Bounce: Red and green indicators (either V1 and V2 or V3 and V4) converging, not crossing, and then separating. Red and green indicators converge within specified percentage of convergence input. The Red and green indicator values can be equal, but cannot cross. The Bounce signal is preferably triggered once the values exceed the convergence percentage, after moving to or within the convergence percentage.

New Cross: Red crossing green indicators (either V1 and V2 or V3 and V4) in either direction.

V-TWO Indicator: A simplified version of the FX Indicator as it preferably only presents the plot lines for V1 and V2. Using V1 and V2 algorithm values, preferably the V-TWO Indicator permits real-time identification of buying and selling opportunities, the direction of a trend, and possible reversals in the price direction of a Market Vehicle. Preferably, it works in many ways as an indicator in producing buy and sell signals. Refer to FIG. 1, FIG. 2 and FIG. 3 for the relationship of V1 and V2 and to FIG. 15 for more on the basis of V1 and V2.

Referring to FIG. 5, FIG. 6, FIG. 7 and FIG. 8, some preferred characteristics of the V-TWO Indicator are:

ΔV1—Change in V1 from previous timeframe; decreases (less positive change in V1 from previous timeframe, decreases (less positive) change in V1 from previous timeframe, decreases (less positive) change in V1 from previous timeframe, decreases (less positive) change in V1 from previous timeframe, positive.

ΔV2—Change in V2 from previous timeframe; decreases (less positive), from previous timeframe; decreases, change in V2 from previous timeframe, increases (more positive) change in V2 from previous timeframe, decreases (less positive).

ΔV1/ΔV2—V-TWO Ratio decreases or less positive, increase, decreases or less positive, increase. The lower the value the more chance for a trend change.

Close—V2: More negative, less negative, negative to positive.

Close—V1: Less negative (or negative to positive), more negative.

(V1–V2): Becomes positive value to negative, becomes negative value to positive, positive values, becomes less positive towards crosses, becomes less negative compared to previous timeframe and negative only in some cases.

V-TWO Intensity: Preferably, the intensity of buying or selling pressure can be measured by the difference of in the values of V1 and V2 in the current timeframe compared to the previous timeframe. For example, in a bearish market the variable factor for V1 (bear) and V2 (bull) preferably remains negative compared to selected price in a previous timeframe. The sudden change in values of V1 and V2 in a reverse direction indicates possible continuation of the trend. The value of V2 accelerates once the trend resolves in a negative direction.

Figure 9:
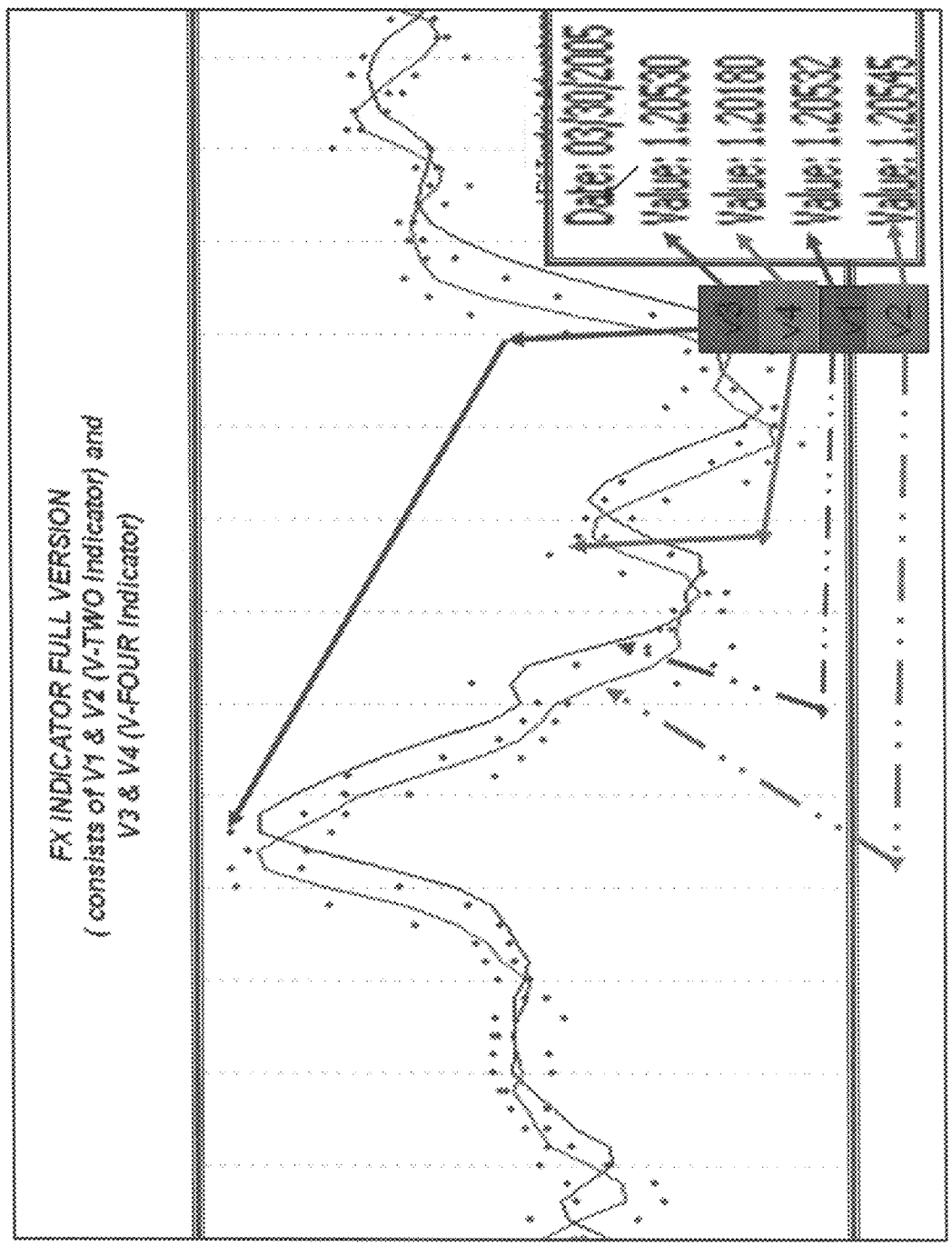
FIG. 9 shows an example of V-FOUR Indicator display with an illustration of values for V1, V2, V3 and V4 according to a preferred embodiment of the present invention.
Figure 10:
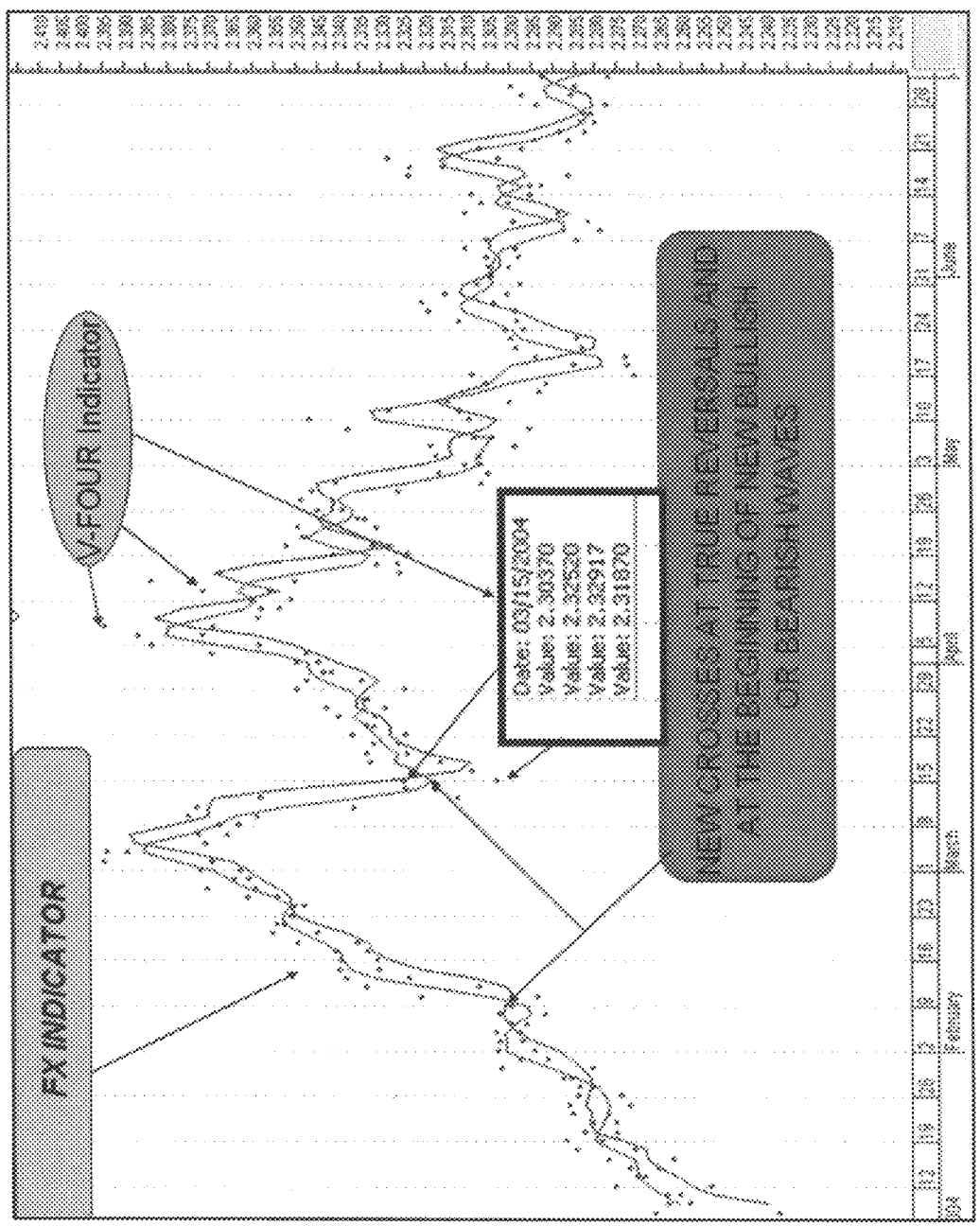
FIG. 10 shows an example of V-FOUR Indicator display with an illustration of values for V1, V2, V3 and V4 according to a preferred embodiment of the present invention.

V-FOUR Indicator: Preferably, another set of algorithms can be plotted in real time and in conjunction with the real-time plot of V2 and V1, i.e. around V-TWO Indicator (at least herein embodying wherein such at least one third graphical representation and such at least one fourth graphical representation are each presented jointly with such at least one first graphical representation and such at least one second graphical representation on such at least one comparative analysis chart). Preferably, these algorithms reflect, in real time, the position of highest prices (V4 as depicted by green dots) and lowest prices (V3 as depicted by red dots) in a particular timeframe in relation to the previous timeframe (at least herein embodying calculating at least one third time-relevant value for such at least one timeframe; at least herein embodying wherein such at least one third time-relevant value is based on at least one lowest price paid for such at least one tradable instrument for such at least one timeframe; at least herein embodying calculating at least one fourth time-relevant value for such at least one timeframe; at least herein embodying wherein such at least one fourth time-relevant value is based on at least one highest price paid for such at least one tradable instrument for such at least one timeframe; at least herein embodying creating at least one third graphical representation of such at least one third time-relevant value for such at least one timeframe; and at least herein embodying creating at least one fourth graphical representation of such at least one fourth time-relevant value for such at least one timeframe). Preferably, the position of the V4 green dots will be below the V2 green line, when stronger selling pressure exists and will be above the V2 green line when stronger buying pressure exists in a market. The position of the V3 red dots will be above the V1 red line, when stronger selling pressure exists and will be below the V2 green line when stronger buying pressure exists in a market. At the reversal of trend or at the crosses the position of V3 red dots and V4 green dots will be either reversed, on top of each other or at an angle (different kind of degree for angles). For more explanation about dots, refer below to Dot Theory. Refer FIG. 9 and FIG. 10 for V-TWO Indicator presentation examples. The behavior of V1, V2, V3 and V4 under various market situations is presented in FIG. 15.

Referring to FIG. 11, FIG. 12, FIG. 13 and FIG. 14, some preferred characteristics of the V-FOUR Indicator are:

ΔV3—Change in V3 from previous timeframe; decreases (less positive change in V3 from previous timeframe, decreases (less positive) change in V3 from previous timeframe, decreases (less positive) change in V3 from previous timeframe, decreases (less positive) change in V3 from previous timeframe, positive.

ΔV4=Change in V4 from previous timeframe; decreases (less positive), from previous timeframe; decreases, change in V4 from previous timeframe, increases (more positive) change in V4 from previous timeframe, decreases (less positive) and occasionally it increases.

ΔV3/ΔV4—V-FOUR ratio increases or more positive, decreases and occasionally increases, decreases or less positive.

Close—V4: less negative compared to previous timeframe. Occasionally more negative, more negative.

Close—V3: Less negative (or negative to positive), more negative, more positive.

(V3–V4): Becomes positive value to negative, becomes negative value to positive, positive values, becomes less positive towards crosses, becomes less negative compared to previous timeframe and negative only in some cases.

V-FOUR Intensity: The intensity of buying or selling pressure preferably can be measured by the difference of both values (V3 and V4) compared to the previous timeframe. Preferably, in a bearish market the variable factor for V3 (bear) and V4 (bull) remain negative compared to a selected price in the previous timeframe. Preferably, a sudden change in values of V3 and V4 in reverse direction indicates possible continuation of the trend. Preferably, the value of V4 accelerates once the trend resolves in a negative direction.

V-FOUR intensity and V-TWO intensity preferably can be further compared for additional confirmation.

Event Interjection Techniques

Preferably, event interjection techniques are used to create Synthetic Crosses at the transformation of either bullish waves to bearish waves or from bearish waves to bullish waves. Once the pressure decreases or increases, in order to create precise entries in live trading of any Market Vehicle, interjection of some external variables may preferably be done for both V1 and V2 values to create a new Synthetic Cross exactly at the highest point in the case of transformation from a bullish wave to a bearish wave, or exactly at lowest point in case of transformation from a bearish wave to a bullish wave. Preferably, interjection of external variables may also be used to create a Synthetic Cross at first reversal of closing or open prices of the first timeframe from the high point in case of bullish to bearish transformation, or at first reversal on the closing or opening prices of a second timeframe. Preferably, interjection of external variables can be similarly applied for bearish to bullish wave transformations. Preferably, the New Crosses created by these external injections may also be termed "Synthetic Crosses" while New Crosses created by natural reversal at the transformation without any external injection may also be termed "Natural Crosses". Herein the terms New Crosses and Natural Crosses are used interchangeably.

The biggest advantage of Synthetic Crosses is to pin-point the entries at the confirmation with conventional charting patterns. This technique may produce lower profit, but is much less risky than using Natural Crosses. Traditional reversal patterns in many charting tools and their reversal confirmation points can preferably be substituted by just plotting Synthetic Crosses.

Preferably, Synthetic Crosses can be plotted against the X and Y axes on any time interval, which can be either first, second, or third interval from the first timeframe that had the highest price for bullish wave or lowest price for bearish waves. Preferably, this applies to all waves, embedded trends, and retracements.

Confirmation of buying pressure drops and crosses by traditional methods or patterns may be referred to as New Bearish Crosses. Confirmation of buying pressure drops and crosses by external variable interjections may be referred to as Synthetic Bear Crosses. Confirmation of selling pressure drops and crosses by traditional methods or patterns may be referred to as New Bullish Crosses. Confirmation of selling pressure drops and crosses by external variable interjections may be referred to as Synthetic Bullish Crosses.

Figure 16:
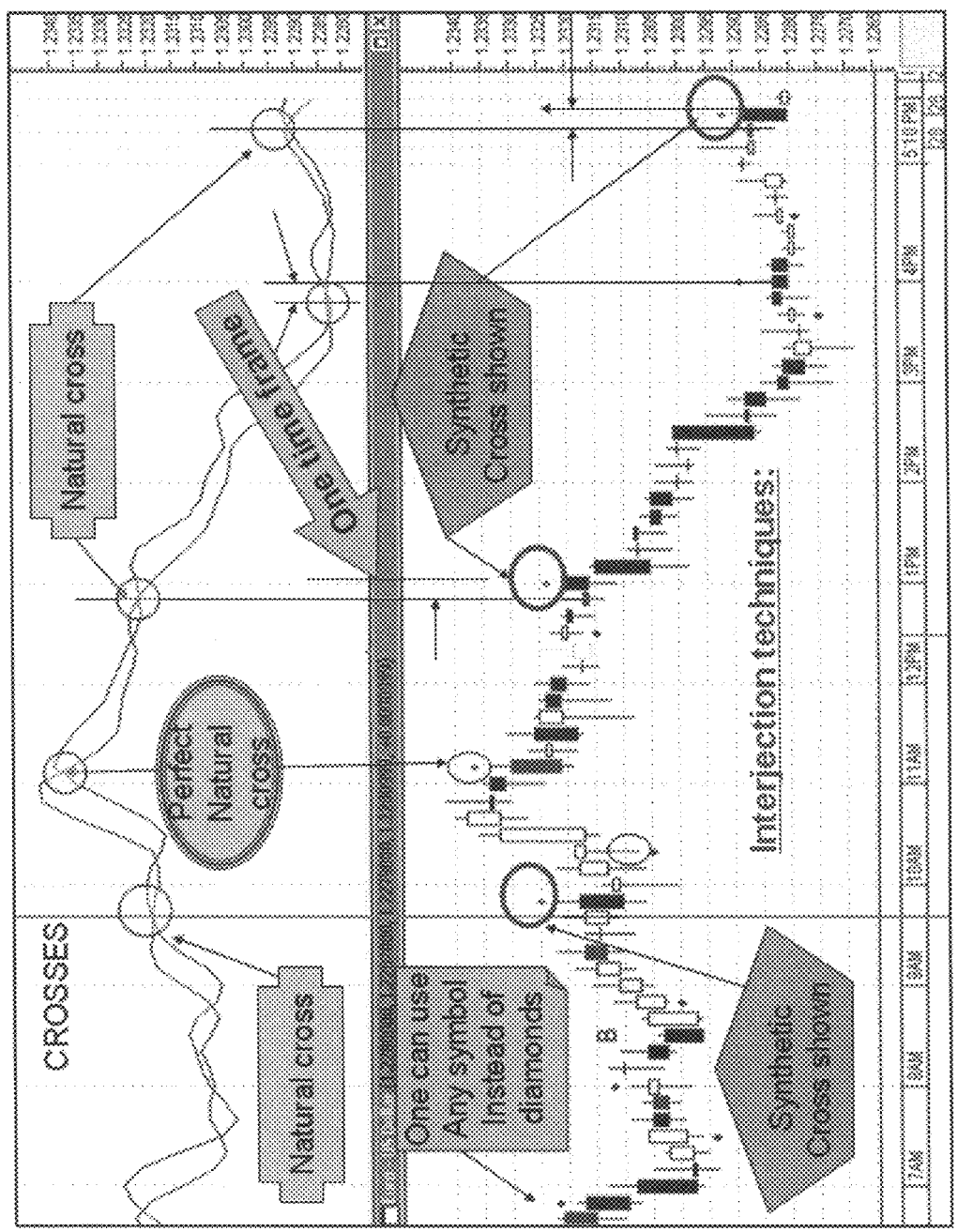
FIG. 16 shows a display illustrating the use of interjection techniques according to a preferred embodiment of the present invention.
Figure 17:
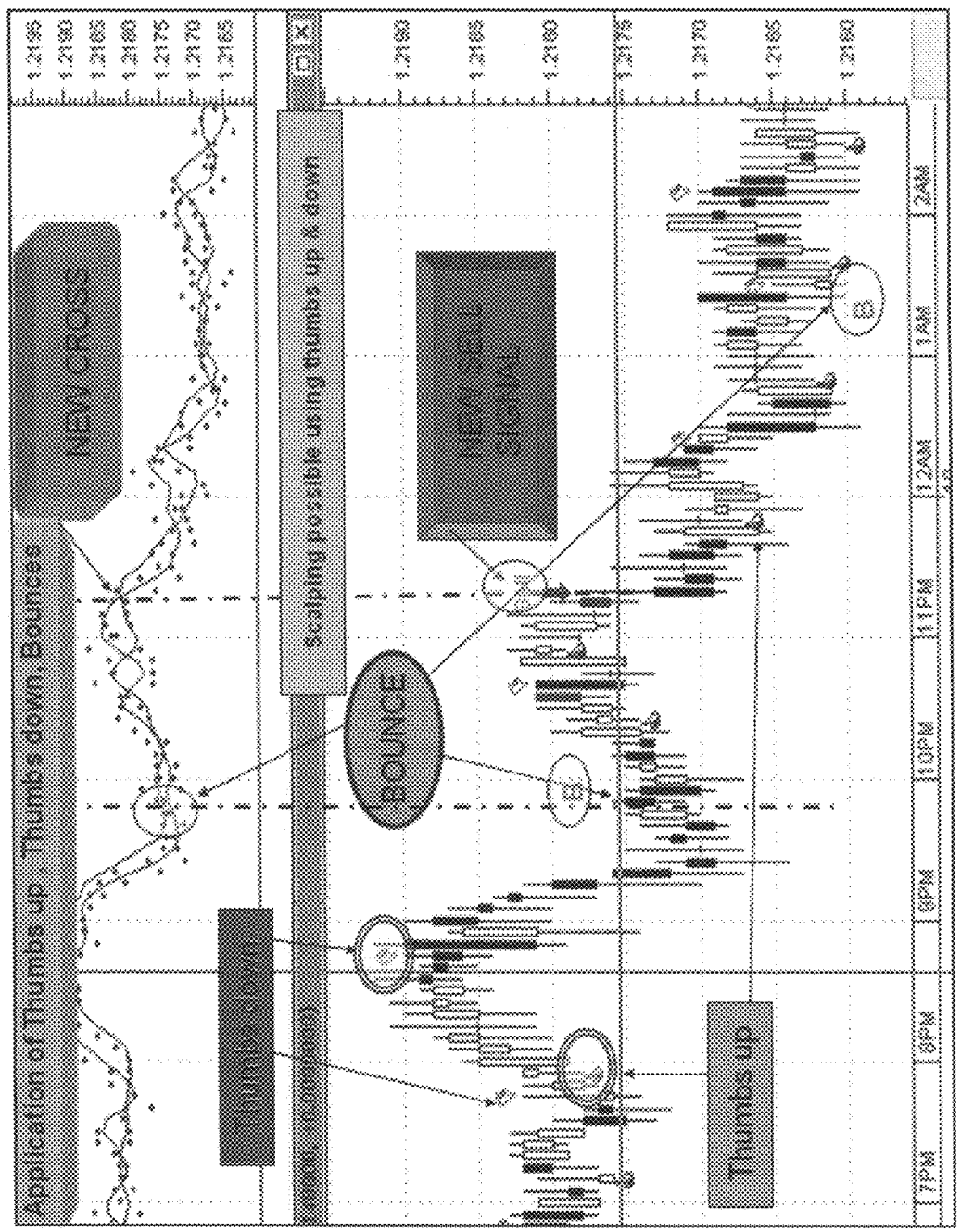
FIG. 17 shows a display illustrating the use of symbols generated from V-FOUR Indicator on a traditional candle chart according to a preferred embodiment of the present invention.

Preferably, both Natural crosses and Synthetic Crosses can be shown, or to keep things simple, every cross can be recognized as a New Cross or as a Bullish Cross or as a Bearish Cross. Preferably, Synthetic Crosses can be spotted, by comparing the crosses on V-TWO Indicator and V-FOUR Indicator and by examining conventional bar charts and candle charts. Refer to FIG. 16 and FIG. 17.

Using Proper Alignment to Generate Entry and Exit Signals

Figure 19:
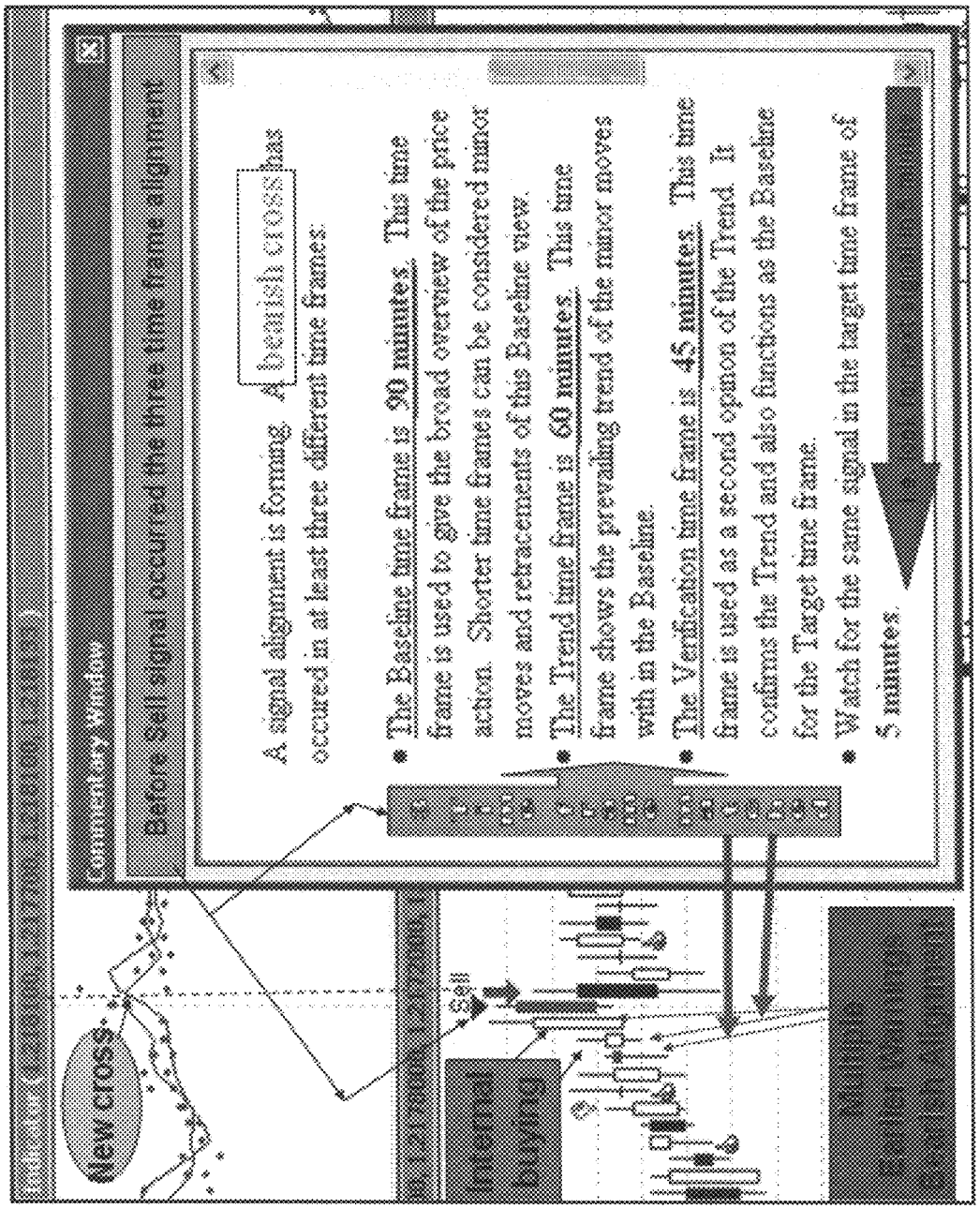
FIG. 19 shows a display of V-FOUR Indicator and alignment areas on a traditional candle chart with multiple early warnings of a bearish alignment and related expert commentary according to a preferred embodiment of the present invention.
Figure 20:
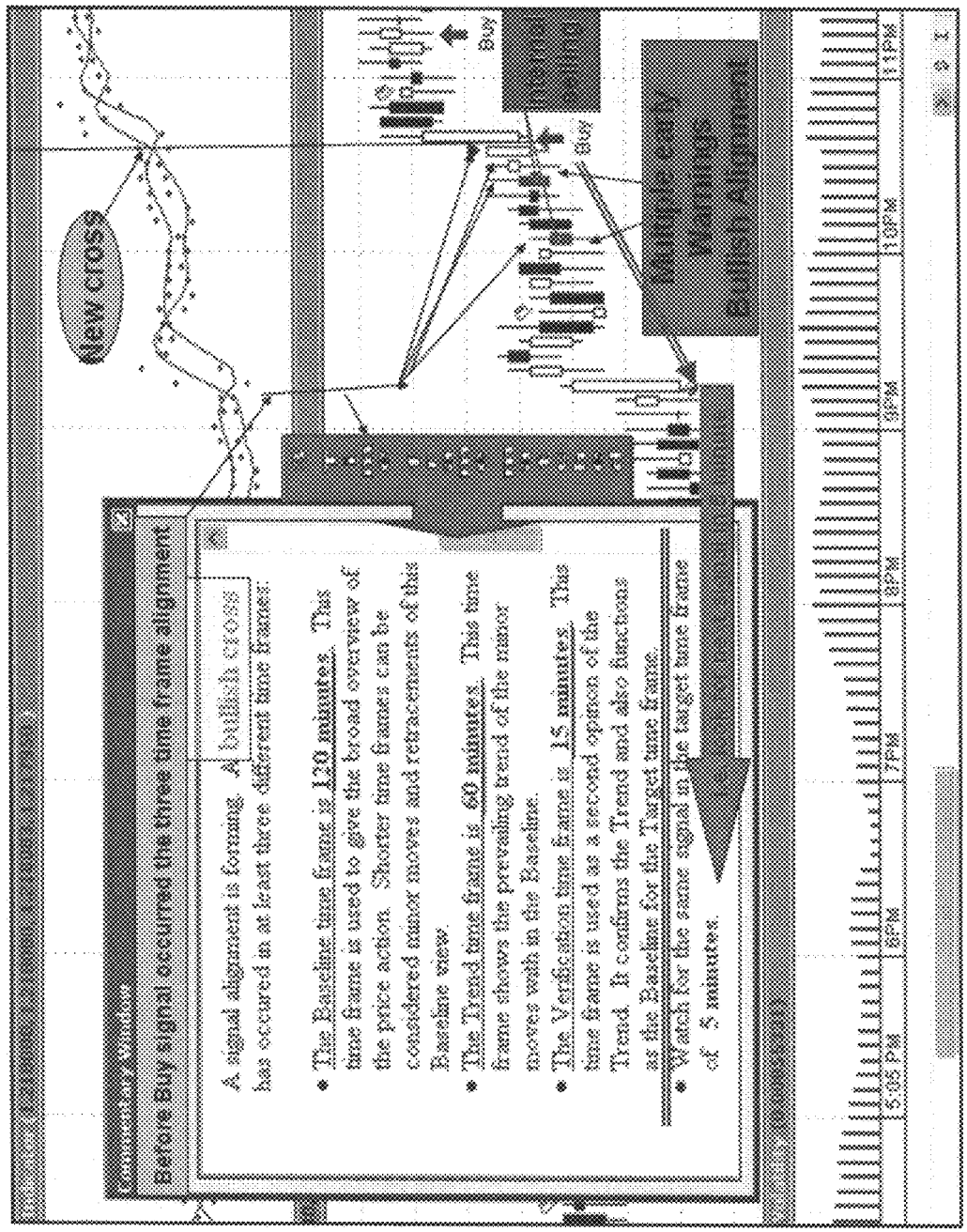
FIG. 20 shows a display of V-FOUR Indicator and alignment areas on a traditional candle chart with multiple early warnings of a bullish alignment and related expert commentary according to a preferred embodiment of the present invention.

Preferably, the alignment of the first three all bearish or all bullish New Crosses can be used as a pre-warning for the final alignment and can be shown as a colored bar, candle or line in traditional charts. Preferably, these bars/candles/lines can appear multiple times, until alignment of at least four such timeframes occurs. Preferably, on alignment of the fourth timeframe the signal will be transformed as an entry signal on a five-minute timeframe. Preferably, the trader has the option to choose any combination of multiple time-frames such as two, three, four, five, six and more for the alignment and can use a colored bar for any minute timeframe of choice. See FIG. 19 and FIG. 20.

Preferably, it is not necessary to have selected an entry signal of five minute timeframe. Preferably, the trader can use 10, 15, 30, 45, 60 or any combination of multiples of one minute or one tick (one transaction). Preferably, for example, the trader may select a predetermined number of timeframes such as 30, 180, 480, Daily and get alignment on a 30 minute timeframe to generate the signal. Preferably, there are endless combinations one can have for an alignment. Preferably, each alignment event for multiple timeframes can be presented in commentary form for educational purposes before taking into consideration a final alignment signal as an entry for either bullish or bearish market condition. See FIG. 19 and FIG. 20.

When alignment of three timeframes occurs and the trader is waiting for final buy or sell signal, preferably the trader can use the technique of internal selling or buying (buying or selling activity with the five minute timeframe) by preferably using hollow or filled candles on a traditional candle chart. In the case of a bullish cross at the alignment, the candle can preferably appear as filled green candle, to indicate evidence of internal selling, even when there is a bullish alignment. Preferably, the trader can see those timeframes in red, when using Commentary and Alignment (Refer to Commentary and Alignment below). Preferably, the same logic applies in a bearish alignment. A trader can preferably use filled candle as a favorite sign at or before the alignment and avoid empty red candles and locate internal buying in Commentary and Alignment.

Preferably, the entire history can be presented in commentary including all timeframes, currently selected timeframes, the type of wave (bullish or bearish), how many timeframes since the current wave started, the time, the prices of the Market Vehicle at a New Cross, current status, open, close, high and low prices, and when a New Cross happened. Preferably, the trader can customize any timeframe in this history. Preferably, the trader can utilize the results of Critical Path analysis (Refer to Critical Path Method for Alignment) in various alignments for a particular Market Vehicle or for a multiple Market Vehicles. See FIG. 17A for a sample history of alignment and market positions.

Applications in Market Timing Using Alignment

Figure 18:
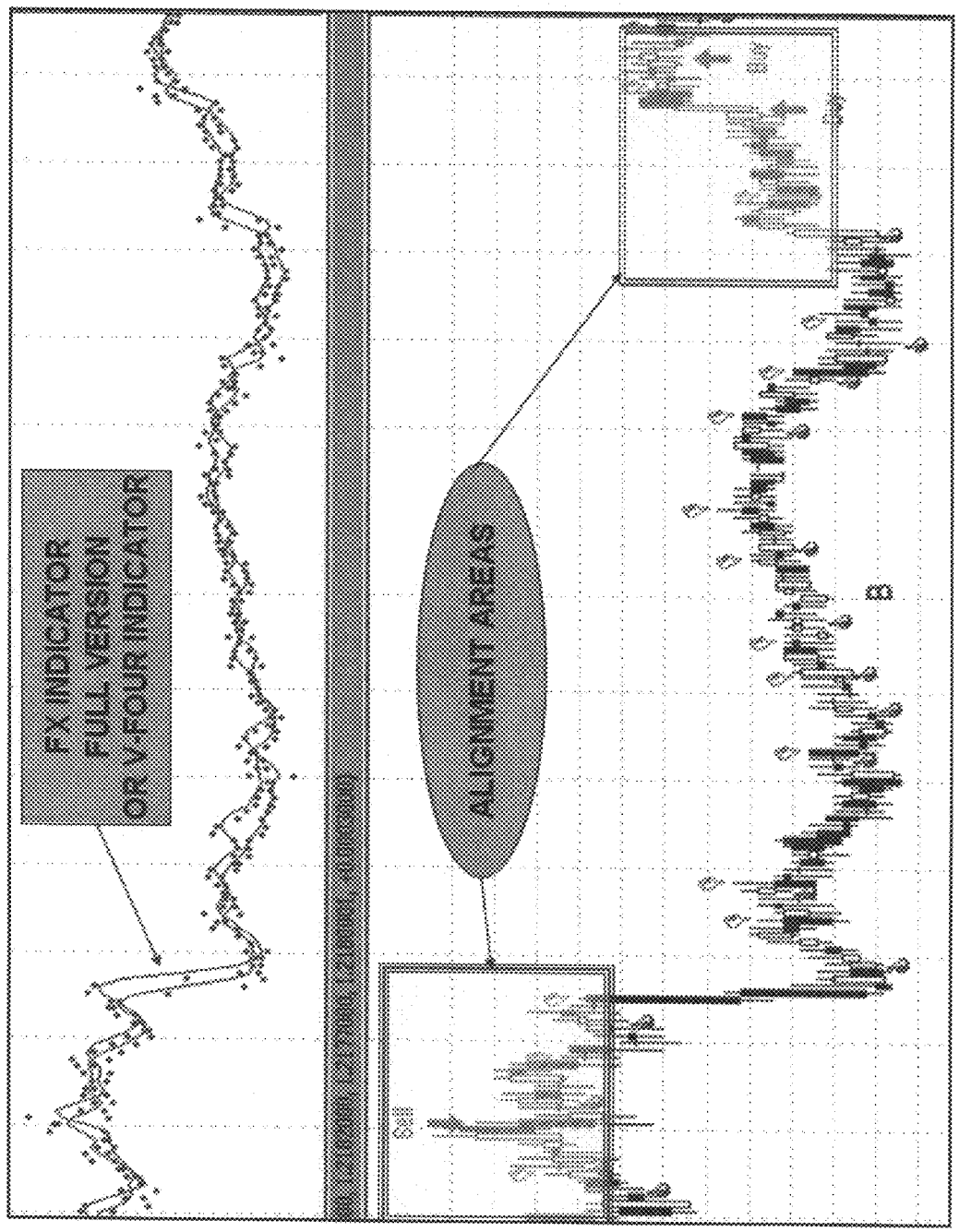
FIG. 18 shows a display of V-FOUR Indicator and alignment areas on a traditional candle chart according to a preferred embodiment of the present invention.
Figure 20A:
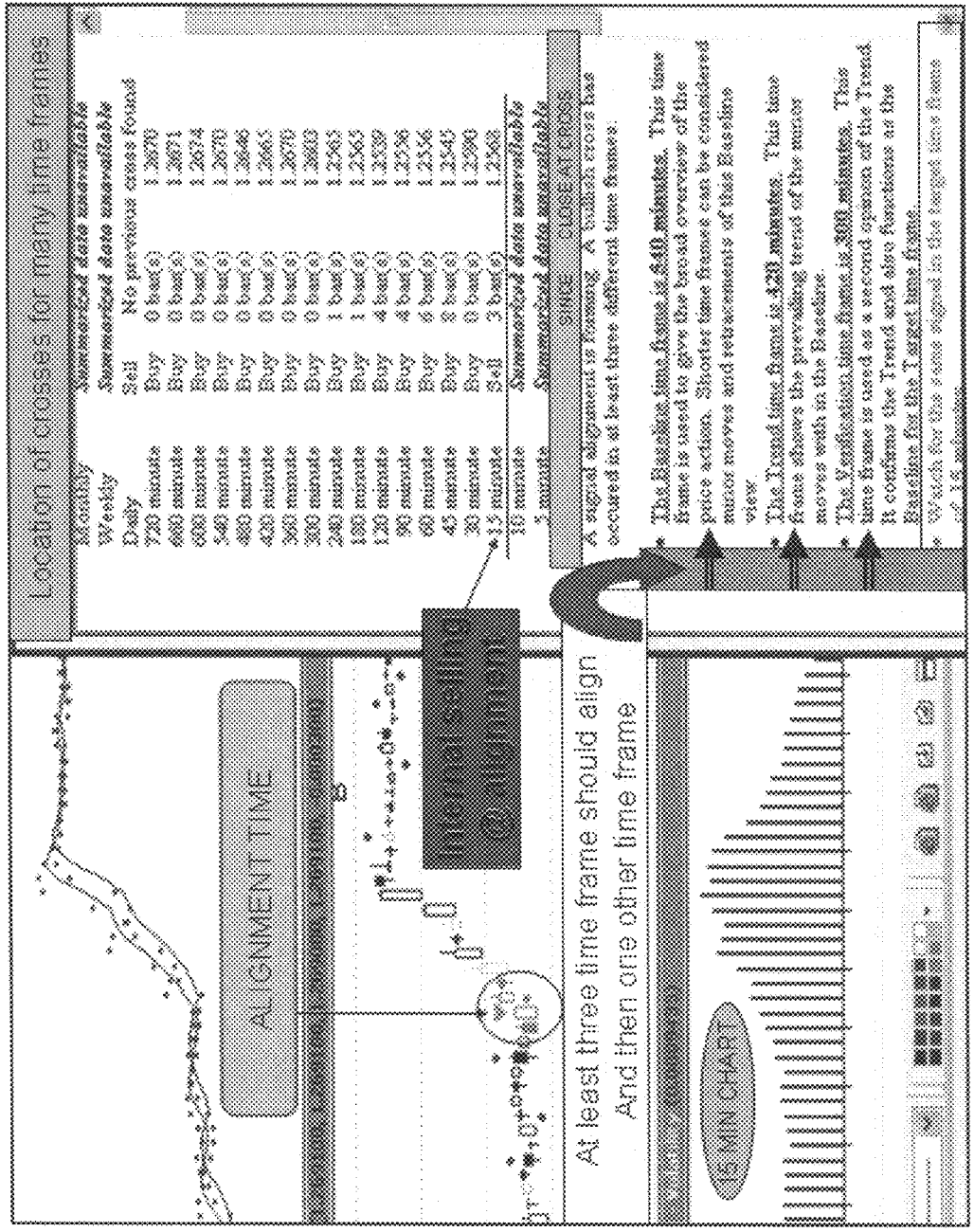
FIG. 20A shows a display of V-FOUR Indicator and alignment areas on a traditional candle chart with location of crosses for many timeframes and related expert commentary according to a preferred embodiment of the present invention.

Preferably, New Crosses formed at the beginning of new bullish or bearish waves can be used from different timeframes, at open, close, high, low prices and be aligned with multiple timeframes (more than two) and with a five minute New Cross. Preferably, the final alignment event (four new crosses either bullish or bearish) can be then transferred as a signal on a five minute bar or candle as an entry signal for either bullish or bearish bias in a Market Vehicle. Preferably, the final alignment can be shown as a green or red arrow or any symbol of choice on any traditional chart method such as candles, bar, line etc. Refer FIG. 18 for an example of alignment, and refer to FIG. 19, FIG. 20 & FIG. 20A for examples of alignment and a five minute entry signal.

Alignment and Commentary

Preferably, the alignment history for a particular Market Vehicle can be given in commentary form by using the expert commentary (as described below). Preferably, expert commentary can help traders making better judgments about entry and exit signals as well as better educate him/her self Preferably, New Cross positions for all timeframes are reviewed and the best available options are selected and presented to the trader using expert commentary. Preferably, it can automatically show the two or more timeframes which are ready for alignment arranged from the shortest to longest timeframe which produces a less risky entry. Preferably, the trader may choose pre-selected timeframes to create alignment, but this will result in fewer opportunities and lower profits. Preferably, natural alignments provide ample opportunities and fewer trades in real time. Also, preferably expert commentary can recognize the smallest timeframe which can be available for alignment after looking at the nearest possible New Cross in another timeframe and select the most probable timeframe and put it on a watch list in the commentary section.

Figure 21:
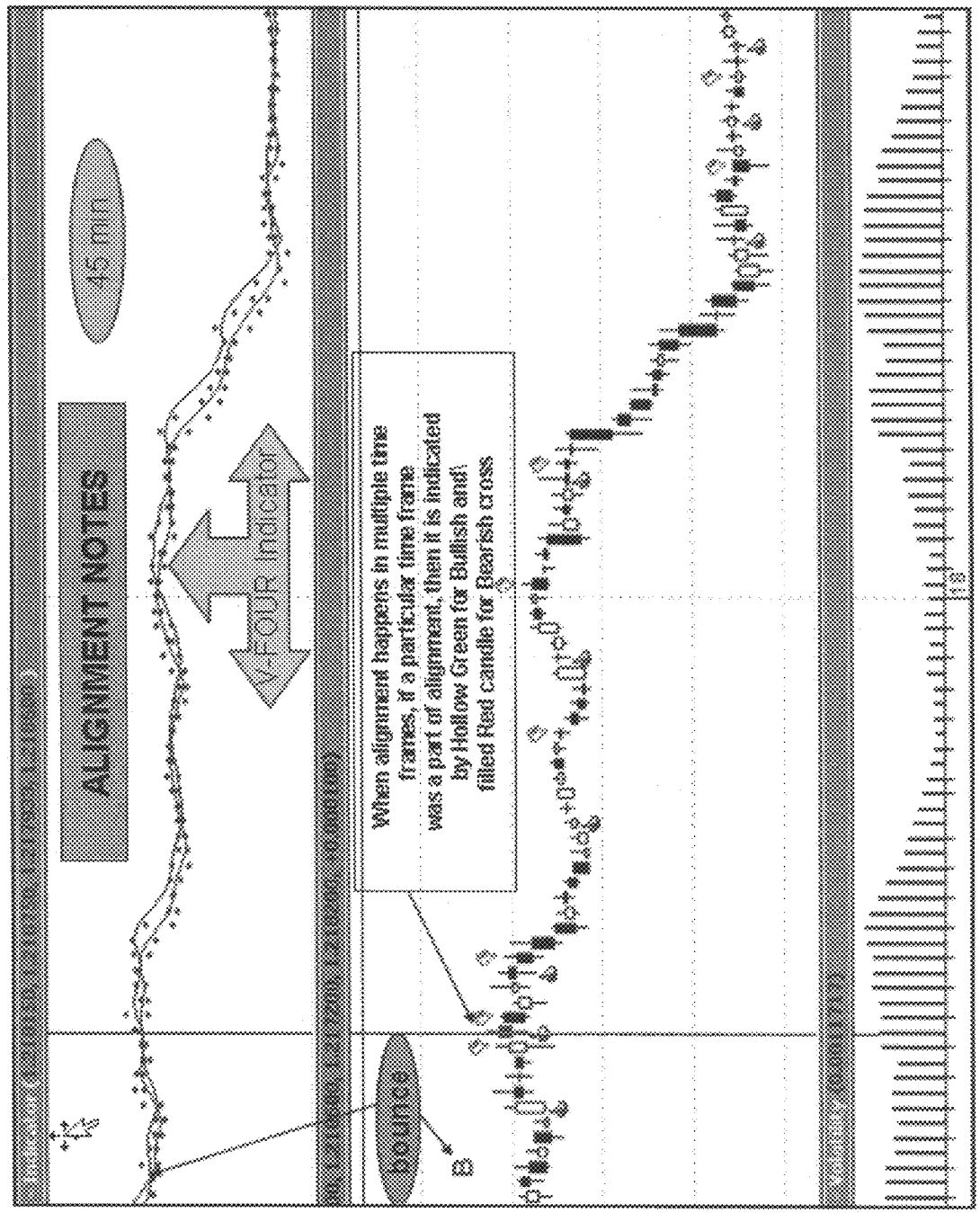
FIG. 21 shows a display illustrating multiple timeframe alignments and relevant symbols applied to a traditional candle chart according to a preferred embodiment of the present invention.
Figure 22:
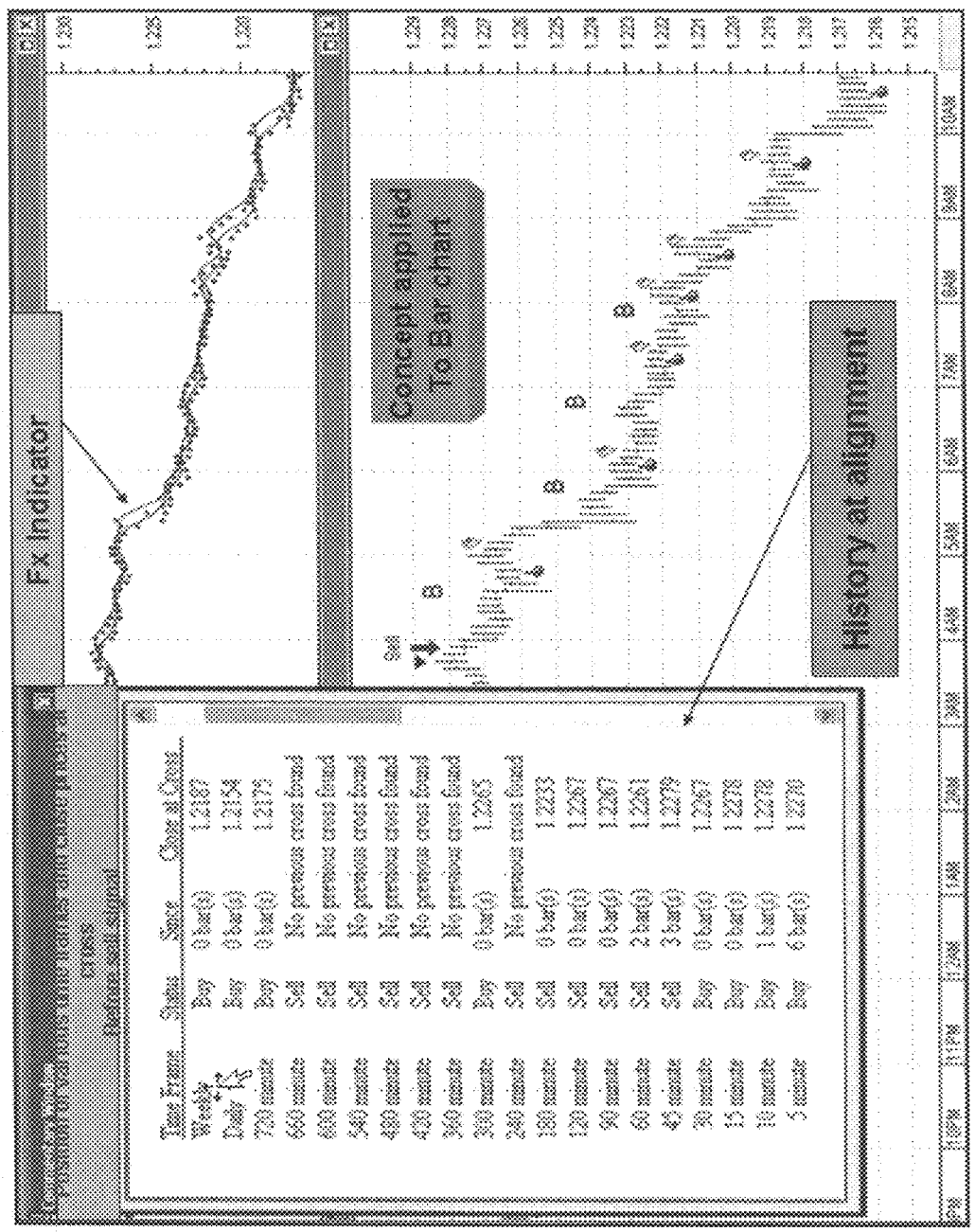
FIG. 22 shows a display illustrating multiple timeframe alignments and relevant symbols applied to a traditional bar chart according to a preferred embodiment of the present invention.
Figure 23:
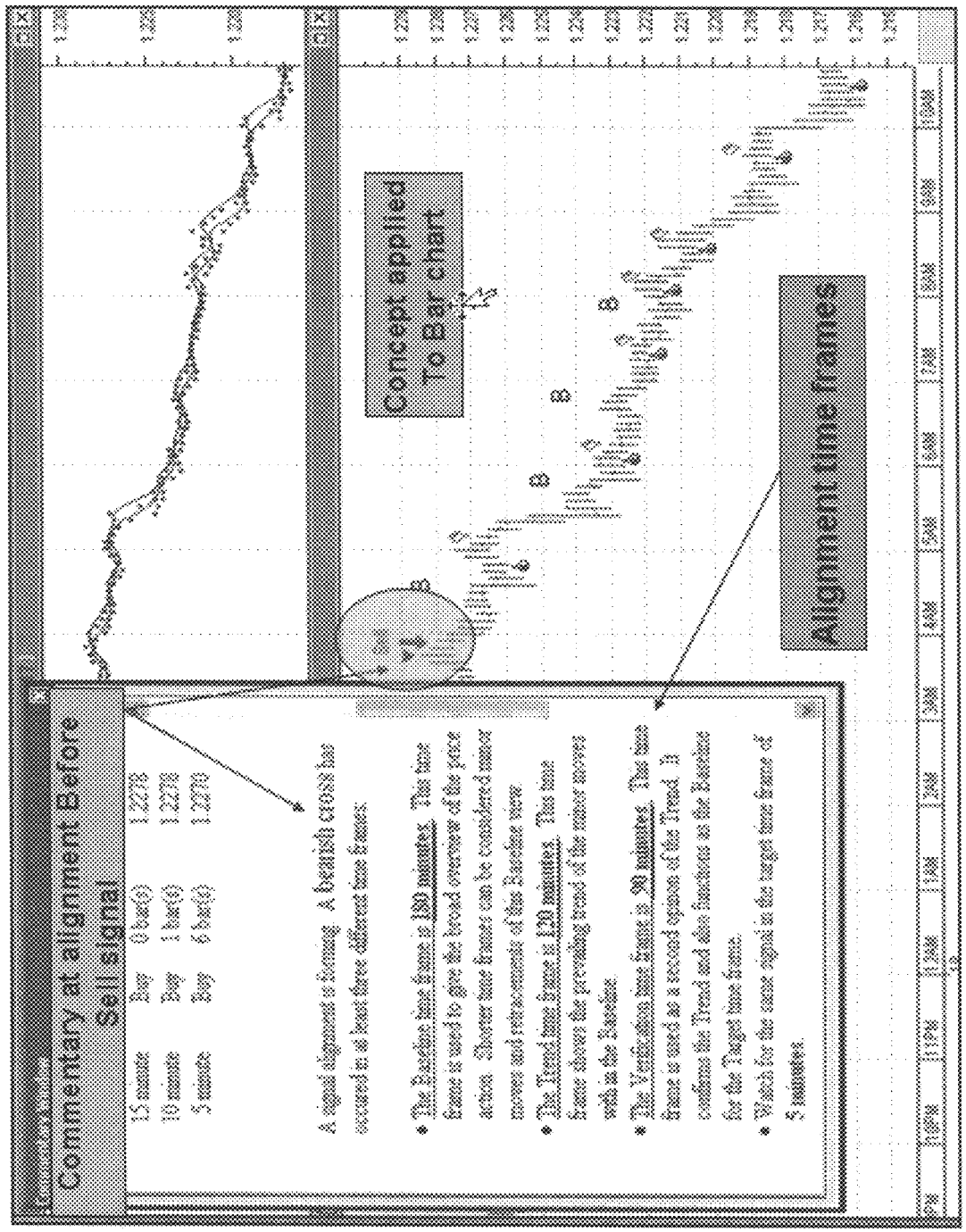
FIG. 23 shows a display illustrating multiple timeframe alignments and relevant symbols applied to a traditional bar chart with expert commentary according to a preferred embodiment of the present invention.
Figure 24:
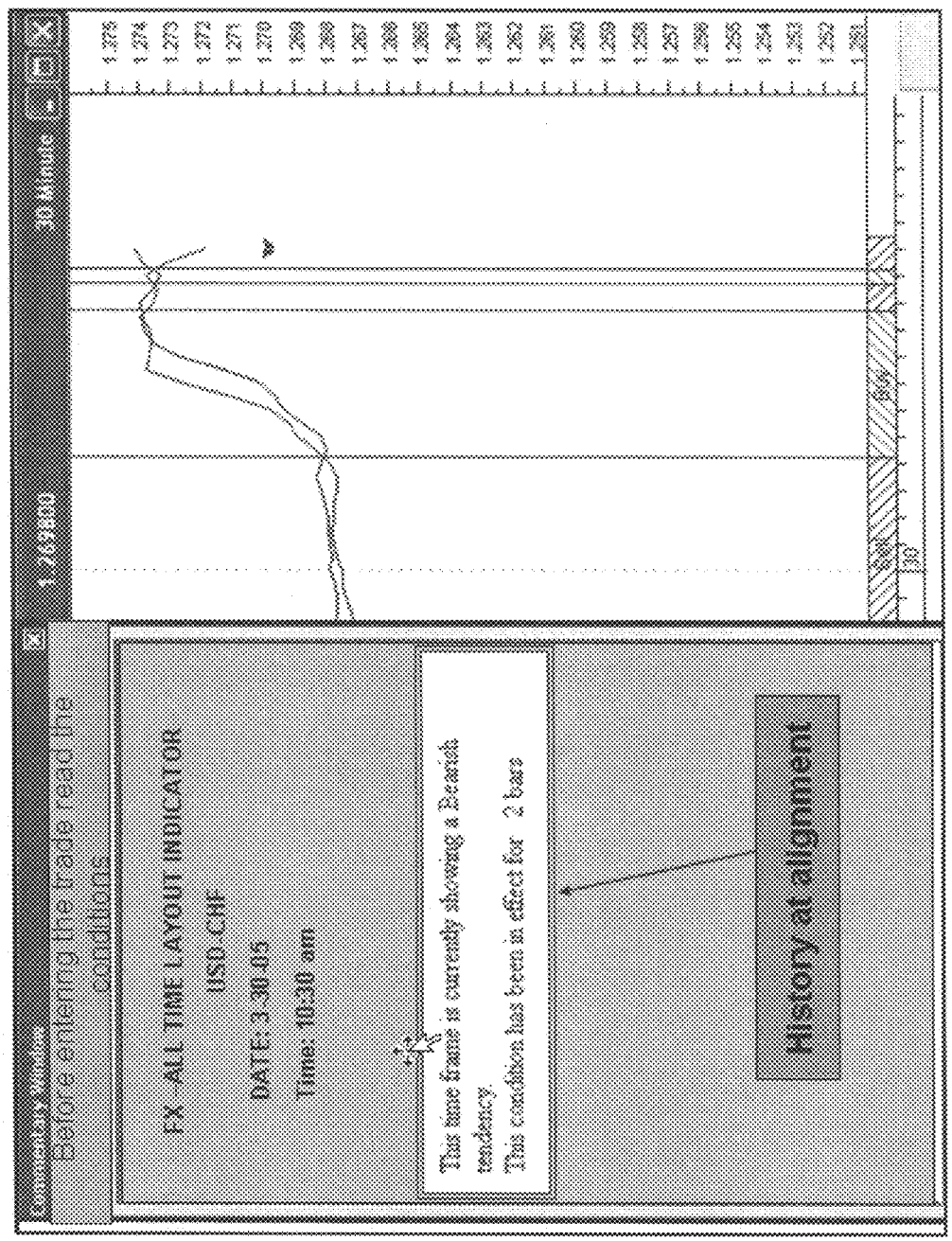
FIG. 24 shows a display illustrating multiple timeframe alignments and generated expert commentary according to a preferred embodiment of the present invention.

The concept of alignment and signals produced at alignment can also preferably be used on traditional charting methods such as bar chart, line chart, candle chart, etc. Refer to FIG. 22 and FIG. 23 for examples of the use of Bar charts with alignment. Preferably, the alignment concept can be also used with V-TWO, V-FOUR, Day Trader Heaven and other charting methods and layouts, as shown in FIG. 21 and FIG. 24.

The following example interpretation preferably can be done using current expert commentary and alignment methods (Refer FIG. 19 for a bearish alignment example and FIG. 20 for a bullish alignment example):

"A signal alignment is forming. A bullish cross has occurred in at least three different timeframes.

The Baseline timeframe is 480 minutes (strongest). This timeframe is used to give a broad overview of the price action. Shorter timeframes can be considered minor moves and retracements of this Baseline view.

The Trend timeframe is 360 minutes (stronger). This timeframe shows the prevailing trend of the minor moves within the Baseline. (Embedded trend).

The Verification timeframe is 180 minutes (strong). This timeframe is used as a second option of the Trend. It confirms the Trend and also functions as the Baseline for the Target timeframe.

Watch for the same signal in the target timeframe of 5 minutes. (Good Entry)"

Preferably, at or after every New Cross, regardless of the above alignment, another signal can be given on the traditional bar, candle or other types of charts in form of colored thumbs up (for bullish move) and a different color thumbs down (for bearish move). Preferably, this symbol may be used to take intermediate entries or for adding or removing existing lots. These thumbs up or thumbs down can be also used to show retracements within the baseline/trend time or verification timeframe. It is prudent to recognize the alignment of strongest waves and then enter at the smallest timeframe to avoid deep draw downs.

Figure 25:
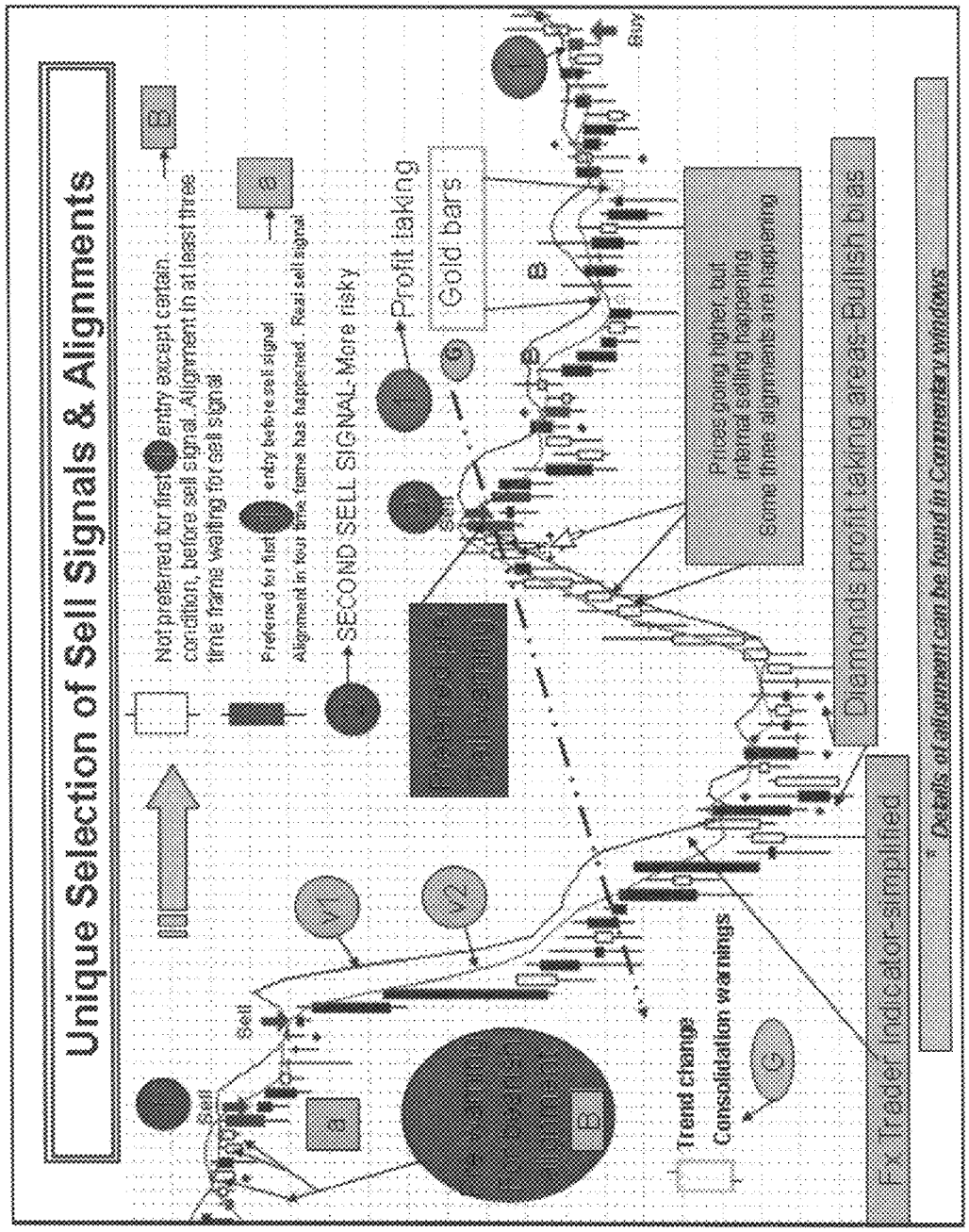
FIG. 25 shows a display illustrating unique selection of sell signals and alignments according to a preferred embodiment of the present invention.
Figure 26:
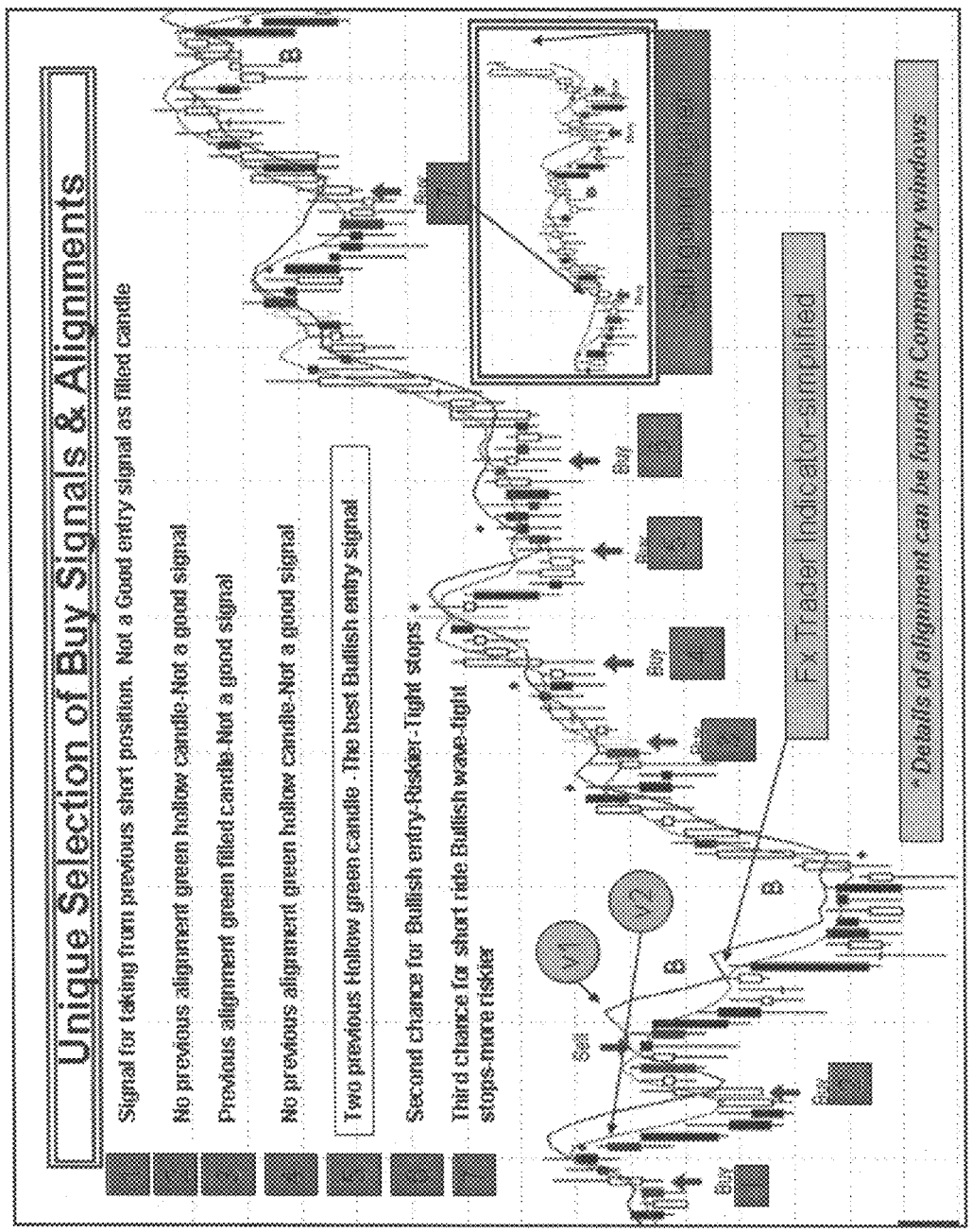
FIG. 26 shows a display illustrating unique selection of buy signals and alignments according to a preferred embodiment of the present invention.
Figure 27:
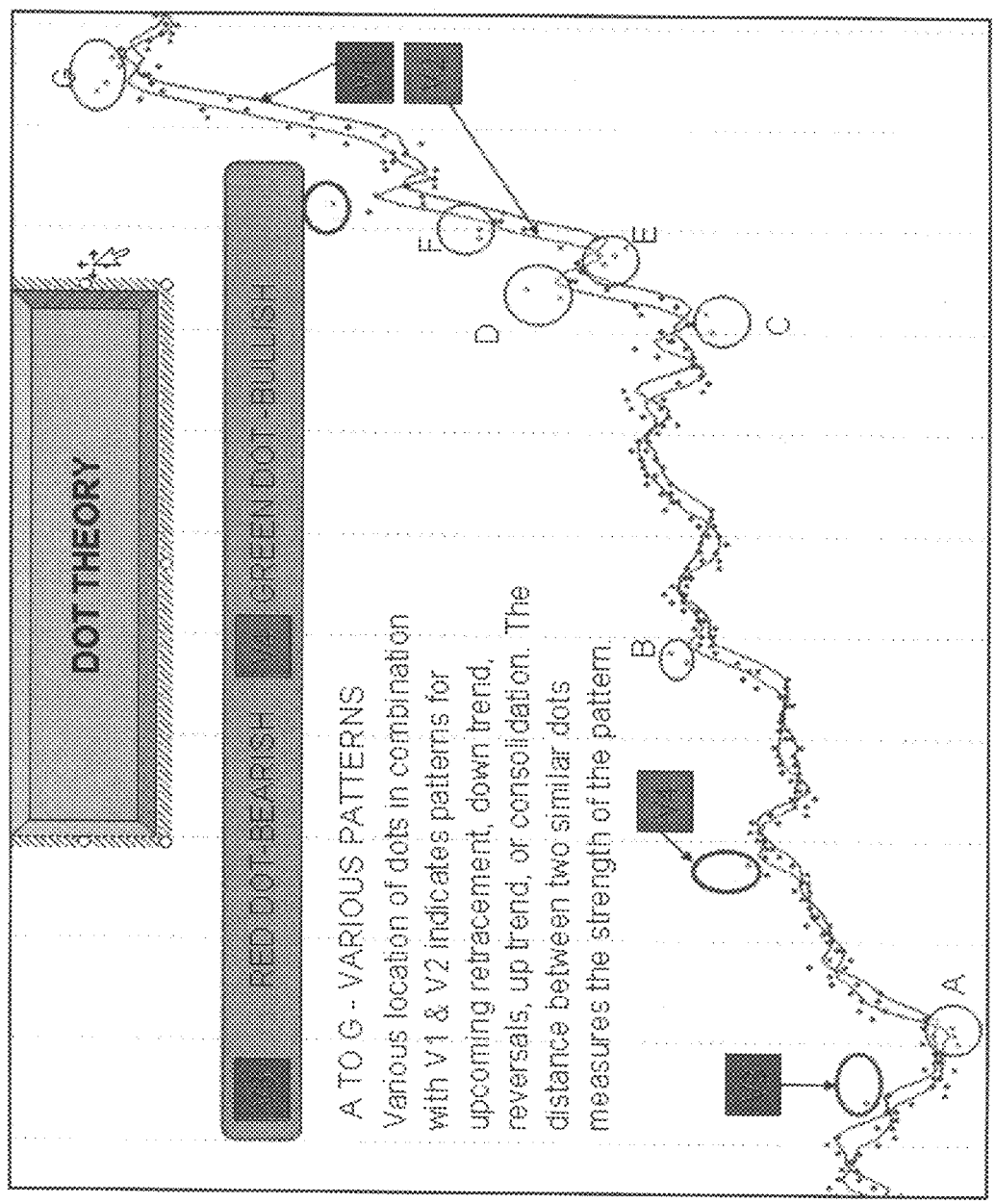
FIG. 27 shows a display illustrating the theory of V3 and V4 dots in relation to V1 and V2 plot lines according to a preferred embodiment of the present invention.

Preferably, the alignment concept can be used for any pre-determined combination of various timeframes such as: 180 minutes, 720 minutes, weekly and monthly with five minute entry signals. Preferably, the above concept is based on the natural occurrence of waves build up permitting a trader to ride any wave small or large as it develops at any give time. Cases like this may produce fewer buy or sell signals, but do indicate weighted buy and sell signals. In weighted alignment, the trader has to wait for things to happen and which may cause the trader to miss earlier entry opportunities. Refer to FIG. 25 for examples of a selection of sell signals that may be used with alignment. Refer to FIG. 26 for examples of a selection of buy signals that may be used with alignment.

Referring to FIG. 26A which presents a display example of a Market Summary for several currency pairs Market Vehicle. A Market Summary for several different individual currency pairs (or any Market Vehicle elements), preferably can be created using the New Crosses by showing different timeframes in any selected multiple of minutes or ticks (transactions). This broad visualization preferably eliminates the need for examining different timeframe charts for a variety of different Market Vehicles. Preferably, an alert can be created for various Market Vehicles and summarized, when using an exploration feature. This can be a huge time savings for institutional traders. Using current robotics, preferably a trader can use buy and sell signals for multiple Market Vehicles and their elements (elements refers to pairs of currencies, such as usd-jpy, usd-chf, aud-nzd, etc. each pair being an element of a Market Vehicle called currency pairs). The same logic can be applied for any Market Vehicle after certain adjustments.

Using existing alert signal technology, preferably an alert for any buy or sell signal can be generated when New Crosses (bullish or bearish) for two or more timeframes are aligned using either open, close, high, or low prices or a combination of any of four or more. Preferably, a signal can be sent either via email, pager, or to cell phone before and at the new alignment. Preferably, using alert signals other alerts can be created such as golden bar (Refer to Reversal Bar and Golden Bar Theory), when new crosses are formed or aligned on weekly, daily or quarterly or yearly timeframes. Preferably, it is practical, to custom design an alert using any of these concepts.

Additional Theories

In combination with V-TWO Indicators, V-FOUR Indicators, Alignment, New Crosses and Synthetic Crosses, following theories can be of help to traders:

Dot Theory

Reversal Bar and Golden Bar Theory

Real Time Swing Bar Theory (floating pivots to hard pivots)

FX Pivot Theory

Volatility Theory

Day Trader Heaven, Swing Trader Heaven, Short Term Trader Heaven or Long Term Trader Heaven Theory (also called FX All Target)

Critical Path Method for Alignment

Dot Theory

Figure 28:
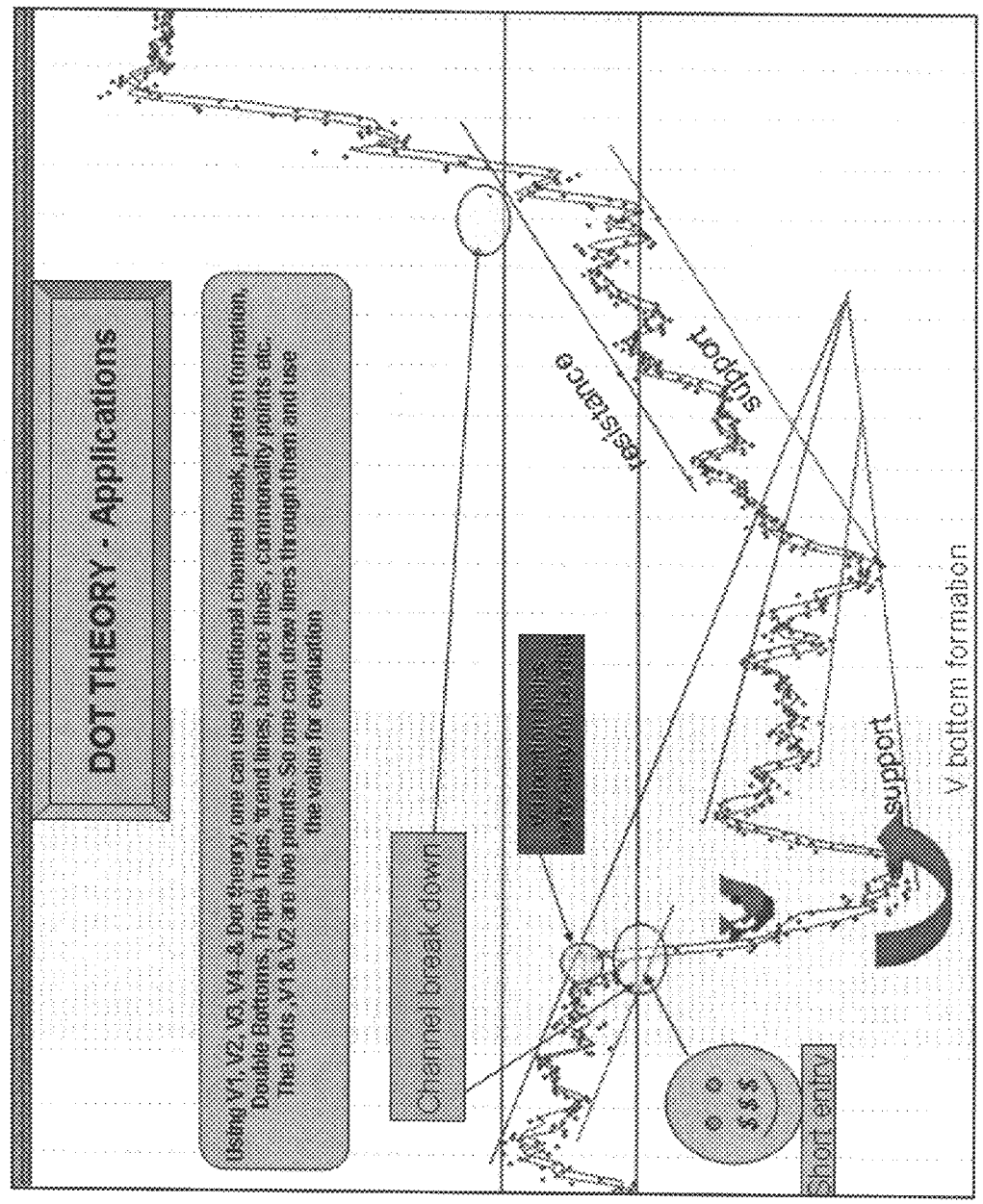
FIG. 28 shows a display illustrating the theory of V3 and V4 dots in relation to V1 and V2 plot lines and its use with other applications according to a preferred embodiment of the present invention.
Figure 29:
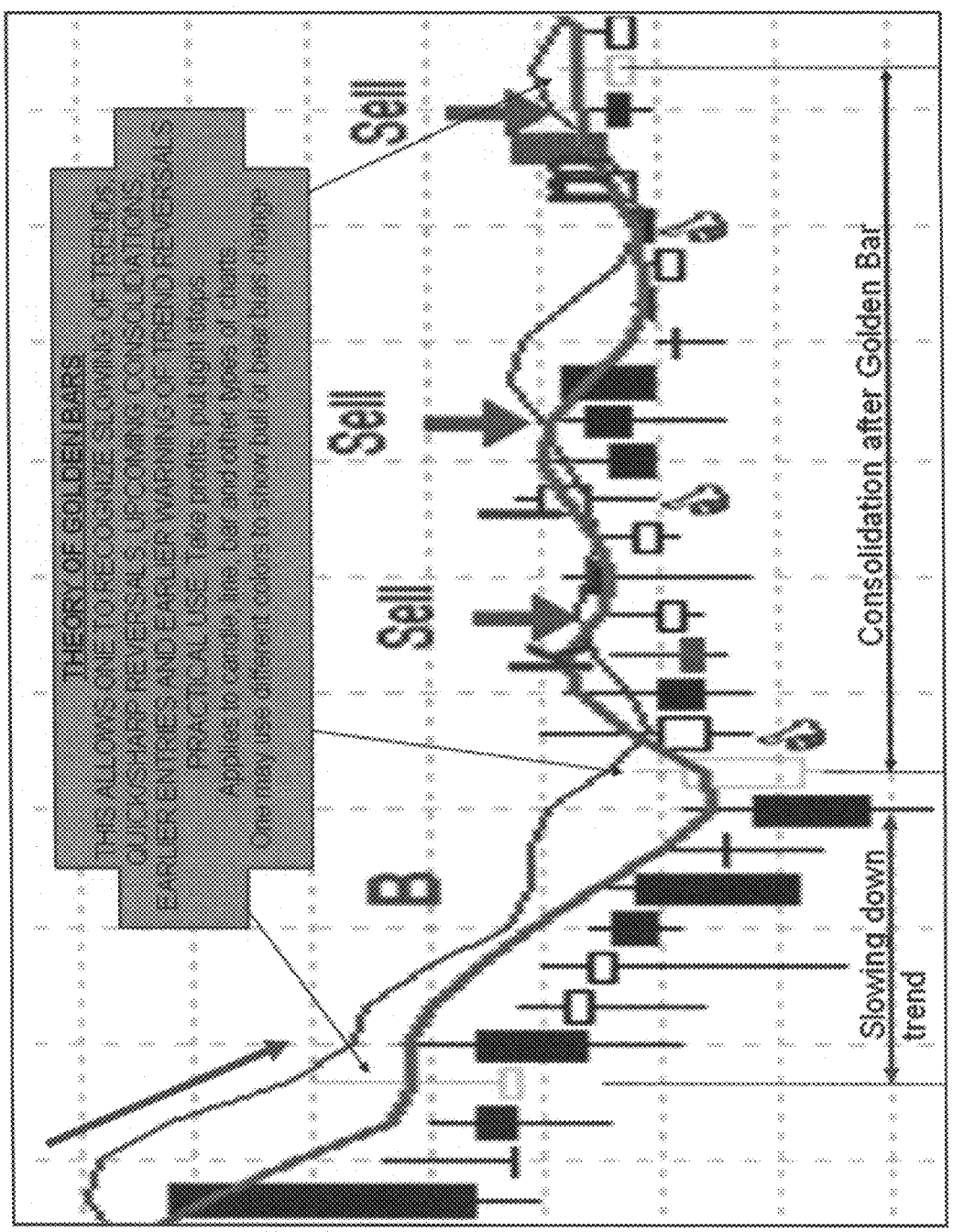
FIG. 29 shows a display illustrating the theory of golden bars in conjunction with V-TWO plot according to a preferred embodiment of the present invention.
Figure 30:
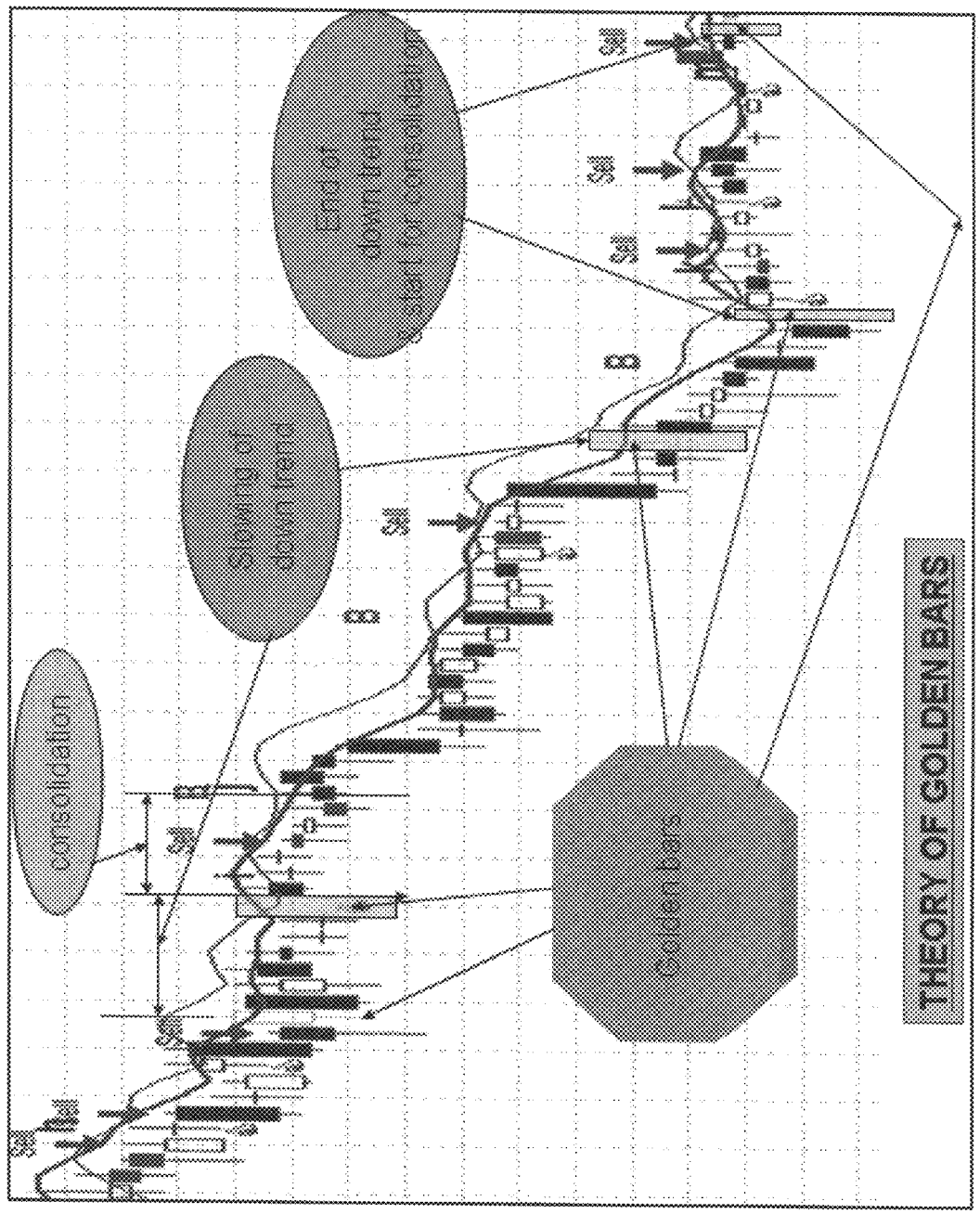
FIG. 30 shows a display illustrating the theory of golden bars in conjunction with V-TWO plot according to a preferred embodiment of the present invention.
Figure 31:
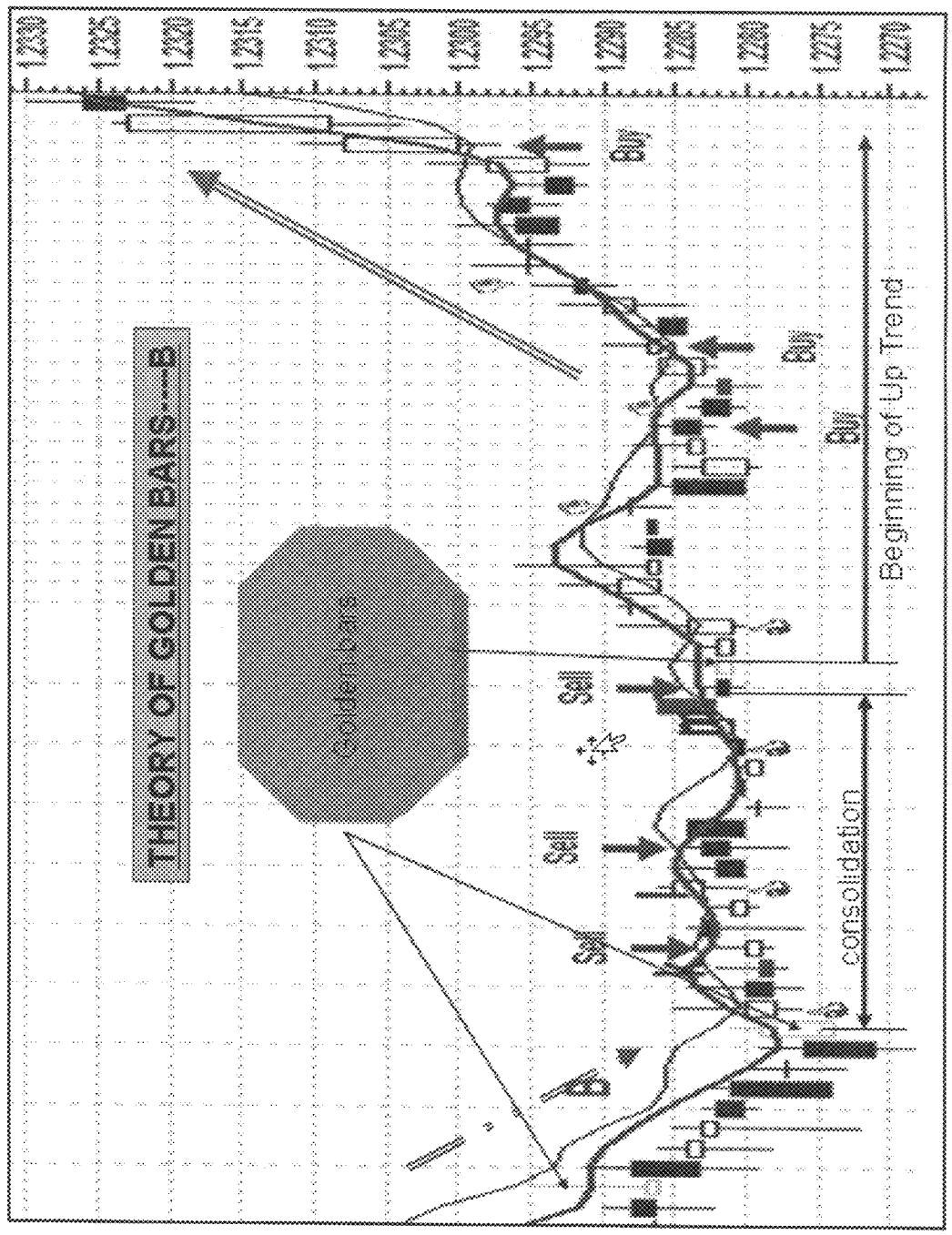
FIG. 31 shows a display illustrating indicators provided by the use of the theory of golden bars in conjunction with V-TWO Indicator according to a preferred embodiment of the present invention.

Using any Market Vehicle, preferably patterns can be developed and the key reversals can be identified visually as well as by using four values, two bullish and two bearish. For example, the distance between various V4 green dots and V3 red dots can further indicate the intensity of either buying or selling pressure. As discussed earlier, the V-FOUR Indicator which is the combination of V1 green lines, V2 red lines, V3 red Dots and V4 green dots plotted against an X and Y axis preferably can be used to indicate entry and exit points for any Market Vehicle. The V-FOUR Indicator may be referred to as a FX Indicator for Currencies, an ST Indicator for Stocks, an MU Indicator for Mutual funds, a COM Indicator for Commodities, an INX Indicator for Index. In fact, any Market Vehicle can be given similar name using the same concept. The New Crosses created by V1 and V2 and the position of V3 and V4 dots in comparison with the V1 and V2 lines can preferably give further evidence of real buying and selling pressure in a particular timeframe. The New Crosses created after plotting V1 and V2 to X and Y axis preferably can be then used to identify an alignment as described earlier. Preferably, at the New Crosses the position of V4 dots and V3 dots reversing identifies reversal points, while V4 dots and V3 dots over-lapping indicates indecision in the market. Further, the four values (two bullish and two bearish) shown as either V4 or V3 dots preferably can be used to find earlier entries and exits and can be used independently or in a combination with crosses or with other patterns. Refer FIG. 28 and FIG. 29 for examples.

Reversal Bar and Golden Bar Theory

Preferably, a colored bar can be used and added to the candle charts, traditional bar or other charts at several junctions for FX (currencies markets), ST (stock markets), MU (mutual fund markets), COM (commodities), INX (indexes). These junctions preferably are the key reversals using open, close, high, low prices and optionally FX Traders Volatility (Refer to Volatility Theory) identifying entry and exit based on dot patterns. A preferred formula looks at open, high, low, close and volatility to create a bar (or candle on candle charts), which can be displayed as a Golden bar (bearish reversal indicator) and a Turquoise bar (bullish reversal indicator).

The following are the preferred formulas for displaying a Golden bar for bearish reversals or a Turquoise bar for bullish reversals. Golden/Turquoise bars are preferably used to indicate a sudden reversal in trend, a sudden buying or selling indication, a slowdown of trend, an indication of a consolidation or a break out of a consolidation. Preferably, Golden/Turquoise bars can be used for any market in conjunction with traditional candle stick charts or bar charts. Preferably, they may also be used to enhance V-TWO and V-FOUR charts.

Preferably, a Turquoise bar will be displayed when the following bullish conditions are met, where T1 is the previous time frame and T2 is the current time frame:

Opening price on T2<Opening price on T1
High price on T2>High price on T1 (For bullish signal: High on T2>High on T1)
Low price on T2>or=low price on T1
Close price on T2>Close price on T1
Volatility on T2>Volatility T1

Preferably, a Golden bar will be displayed when the following bearish conditions are met, where T1 is the previous time frame and T2 is the current time frame:

Open price on T2>Open price on T1
High price on T2<or=High price on T1
Low price on T2<Low price on T1
Close price on T2<Close price on T1
Volatility on T2>Volatility on T1
In either case, conditions are usually reversals.

Factors of 1.2, 1.5, etc. can be applied to Volatility to evaluate the strength of bullish or bearish waves. For example:

Volatility on T2=1.2*Volatility on T1→Light selling
Volatility on T2=1.5*Volatility on T1→Heavy selling Factors of 1.2, 1.5, etc. can be applied to High price of T2 can indicate the strength of a Turquoise bar. For example:

High price of T2=1.2*High price of T1→Light bullish
High price of T2=1.5*High price of T1→Very bullish Preferably, using open, high, low, close prices for any time frame, the above formulas can be used in different ways to assist in finding key reversals, V-formations, U-formations, double tops, double bottoms, etc. Preferably, the formula can help to determine Double Tops and the possible reversal of a bullish trend.

Open price on T2<Open price on T1
High price on T2=High price on T1
Low price on T2>Low price on T1
Close price on T2<or=Close price on T1
Volatility on T2<or=Volatility T1

These bars preferably appear on either a candle or a bar chart. These bars indicate slowing of trends, beginning of new trends, consolidations, quick reversals, new event time reversals. They also act like speed bumps in the financial market. Refer to FIG. 29, FIG. 30, FIG. 31, FIG. 32 and FIG. 42 for more examples.

Real Time Swing Bar Theory (floating pivots to hard pivots)

Figure 32:
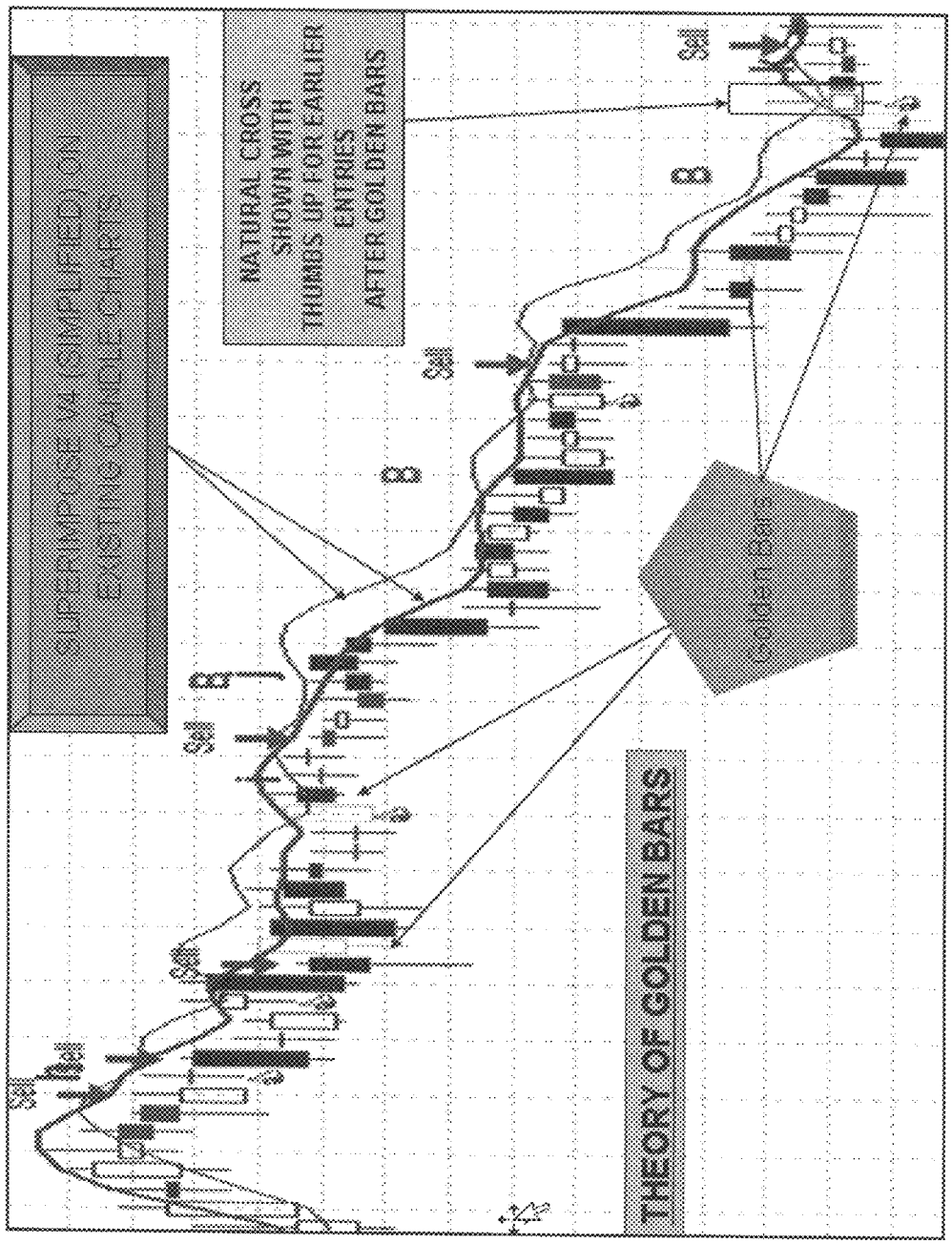
FIG. 32 shows a display illustrating indicators provided by the use of the theory of golden bars in conjunction with V-TWO Indicator according to a preferred embodiment of the present invention.
Figure 32A:
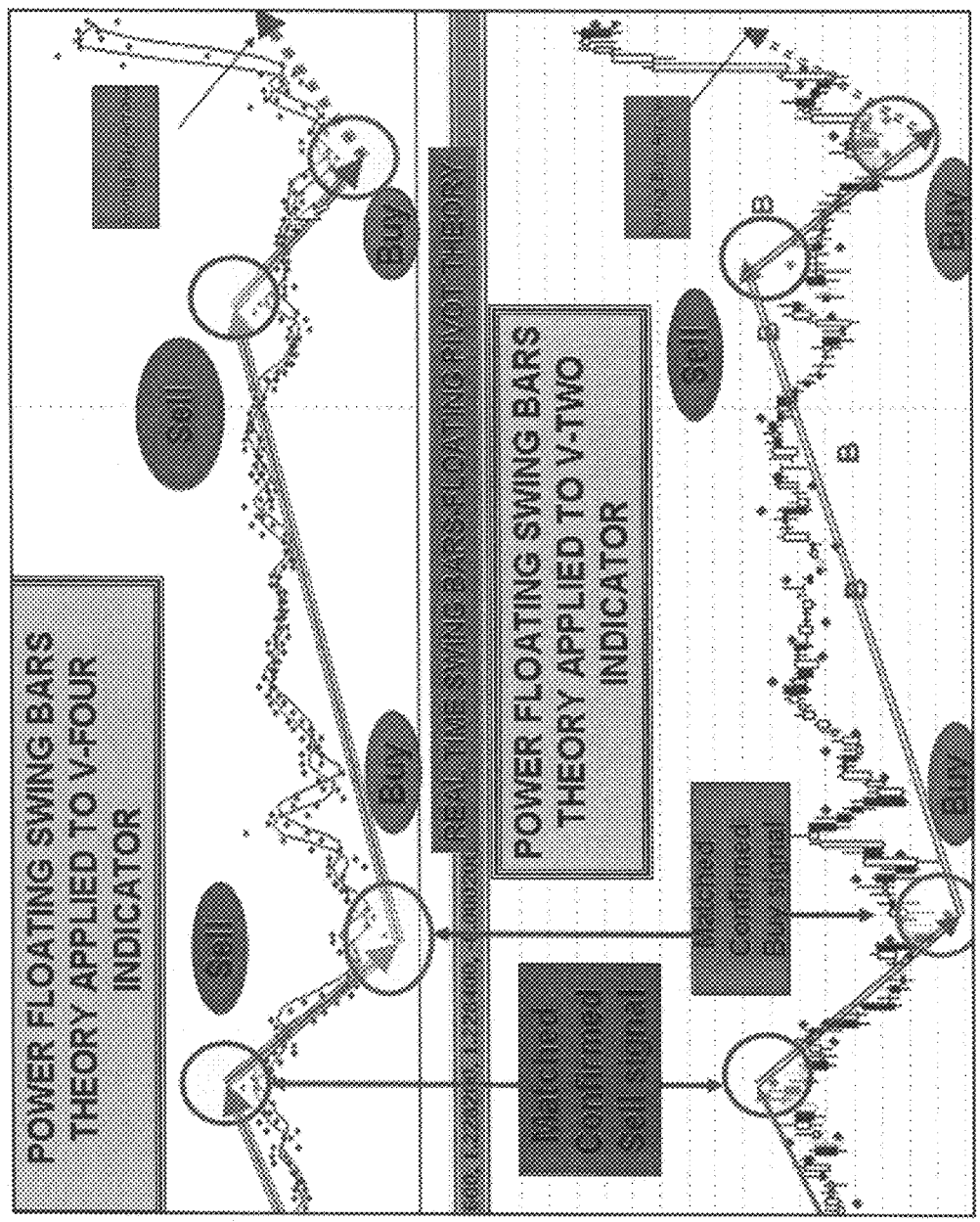
FIG. 32A shows a display illustrating the use of power swing bars indicators in conjunction with V-TWO Indicator according to a preferred embodiment of the present invention.

Preferably, using dot peak points (V4) and low points (V3), real time swing bars can be created for establishing major trend lines, intermediate trend lines, and live pivot points. Preferably, the tops and bottoms of these bars can be referred as floating pivots. Preferably, the same thing can be done with diamonds using the V-TWO Indicator. The floating pivots which match with V-TWO Indicator and V-FOUR Indicator are very powerful in their nature. It only requires a few timeframes matching the floating pivots of both Indicators to produce better odds of making the appropriate buy/sell decision. Preferably, the floating pivots for the V-TWO indicator are calculated based on values of V1 and V2 and floating pivots for V-FOUR Indicator are calculated based on the values of V3 and V4. Preferably, other factors and parameters may be used to get desired results. Preferably, the last swing line is always a real time swing line and it is always floating. Preferably, it projects the direction of the new trend after the last steady pivot created by previous movement. Each new floating pivot will preferably become steady when a new direction has been established. Combining these pivot points with traditional daily pivots and buy and sell signals generated by five minute charts using alignment and V-FOUR Indicator, can preferably create additional rigid entry and exit points (multiple confirmation points). Using current technology, preferably a live expert commentary can be created explaining the commonality of such points in various timeframes. Refer to FIG. 32A.

FX Pivot Theory

Figure 32B:
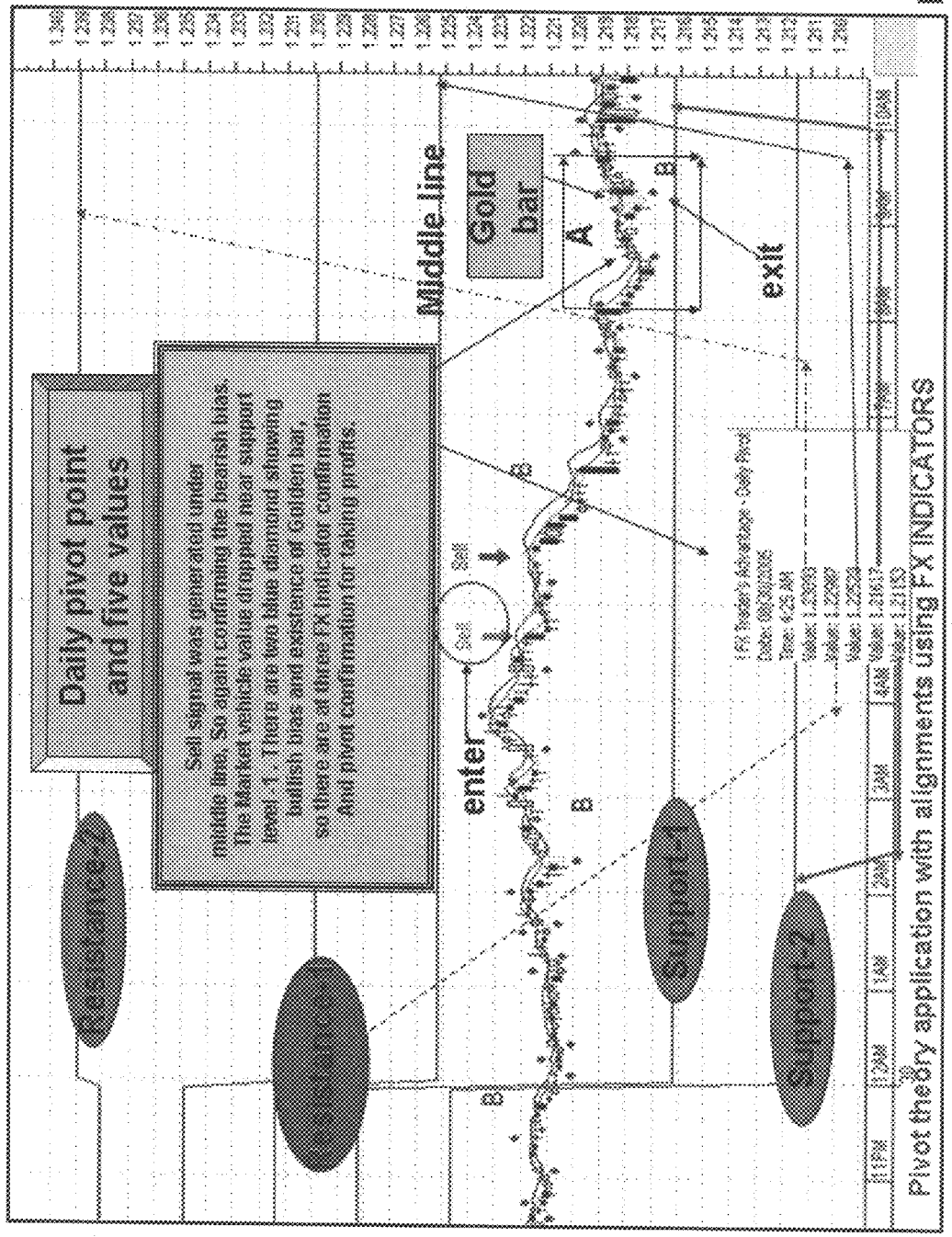
FIG. 32B shows a display illustrating the use of pivot theory indicators in conjunction with V-FOUR Indicator according to a preferred embodiment of the present invention.
Figure 33:
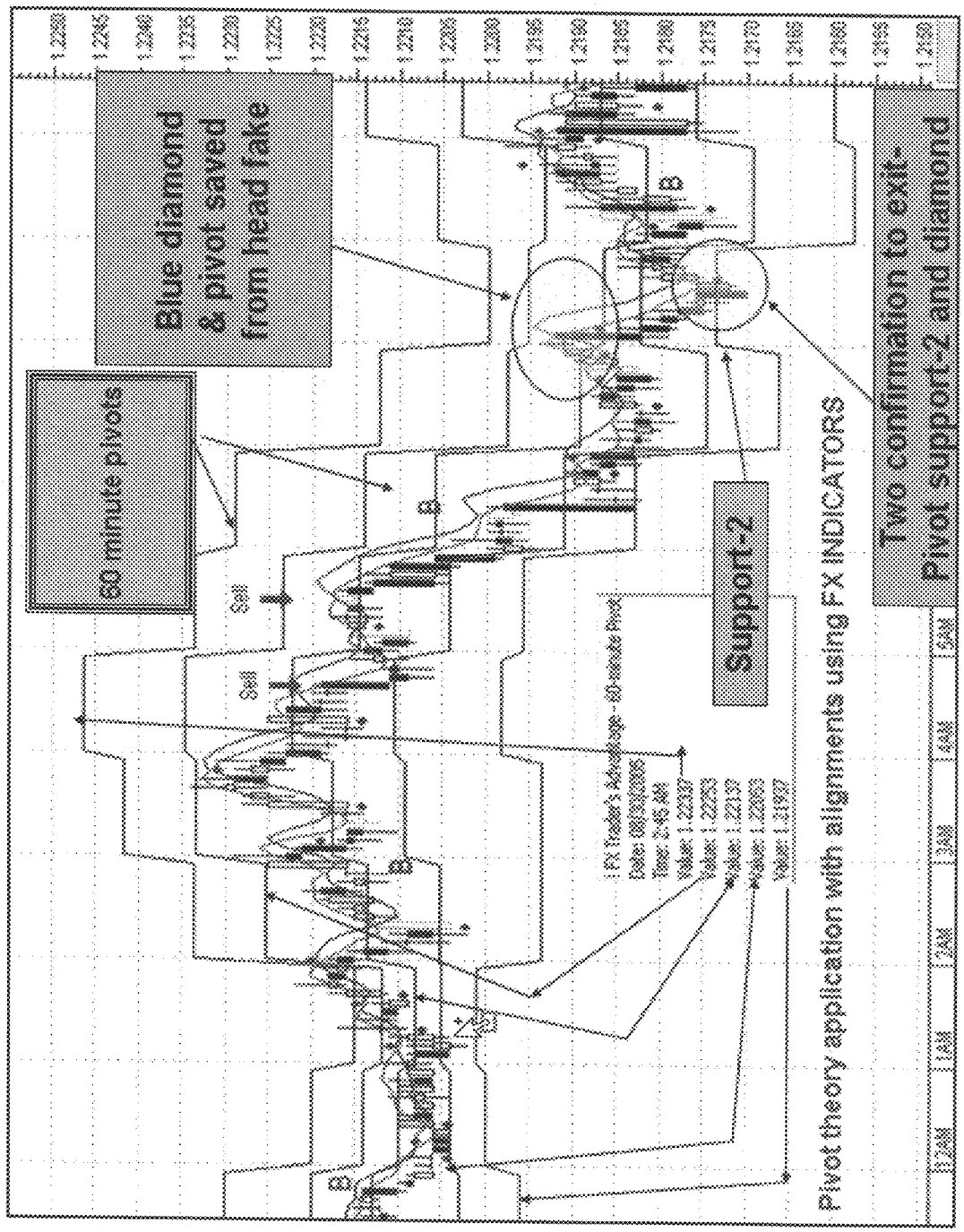
FIG. 33 shows a display illustrating the use of pivot theory indicators in conjunction with V-FOUR Indicator according to a preferred embodiment of the present invention.
Figure 35:
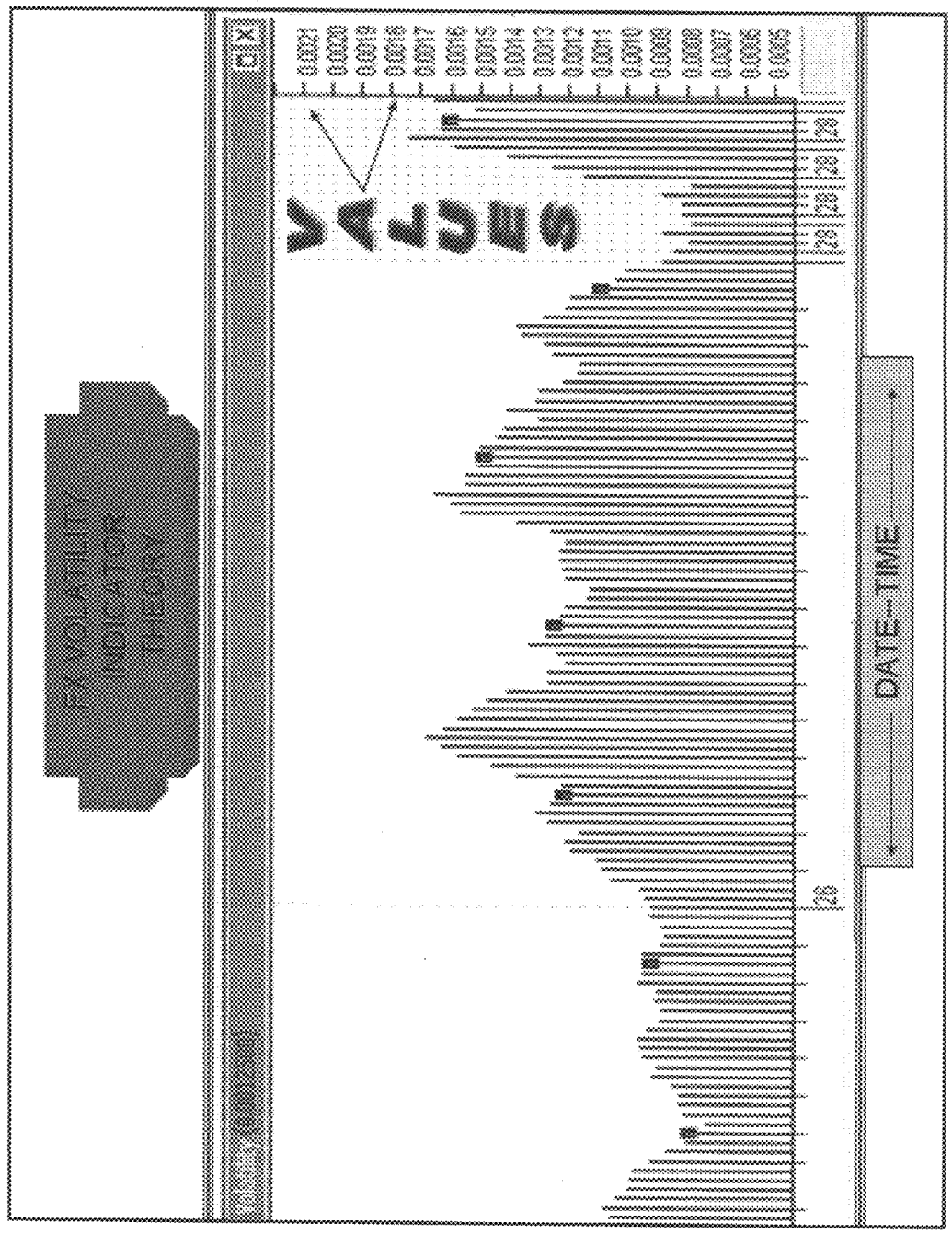
FIG. 35 shows a display illustrating the FX volatility theory according to a preferred embodiment of the present invention.
Figure 36:
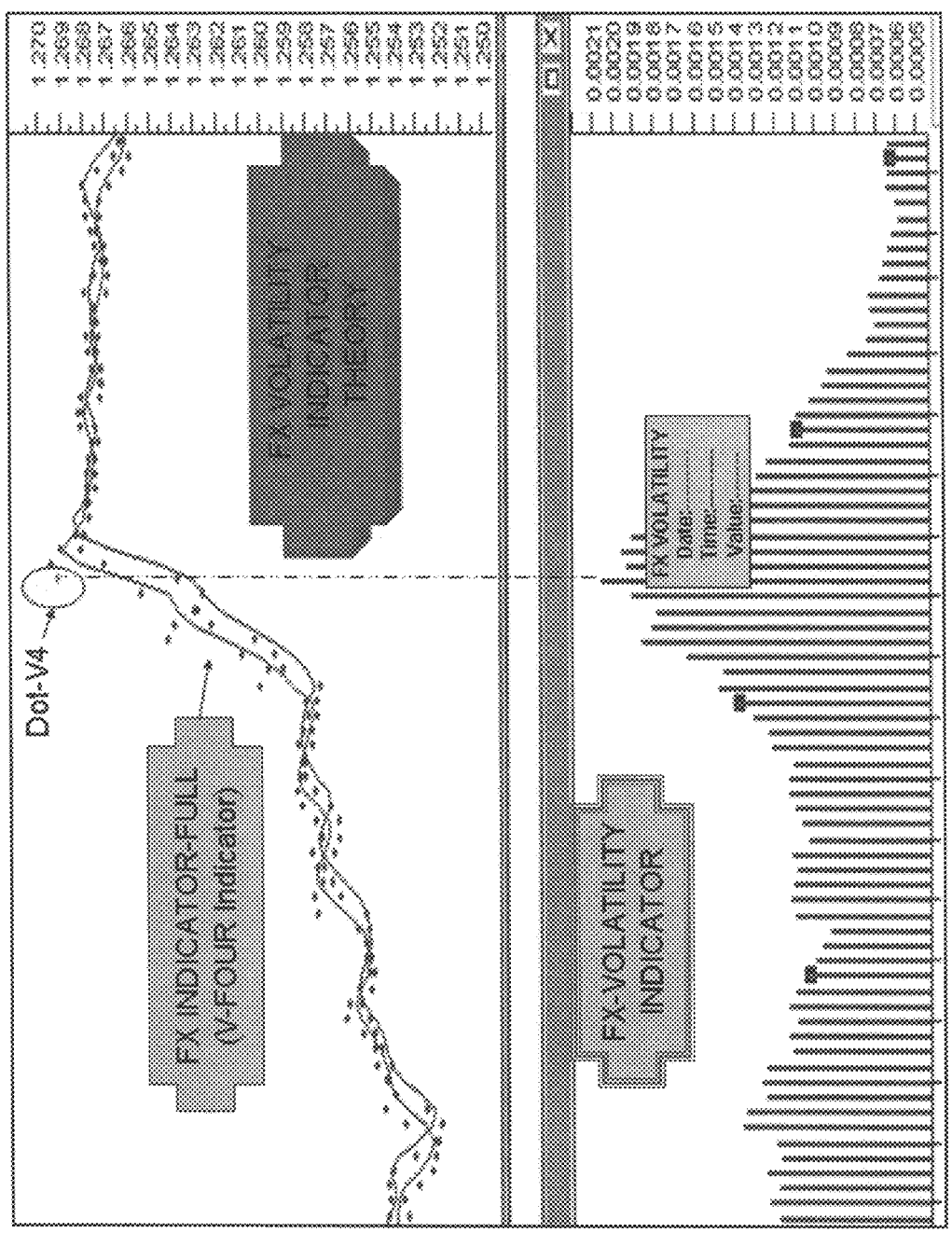
FIG. 36 shows a display illustrating the FX volatility theory in conjunction with V-FOUR Indicator with alignment according to a preferred embodiment of the present invention.
Figure 37:
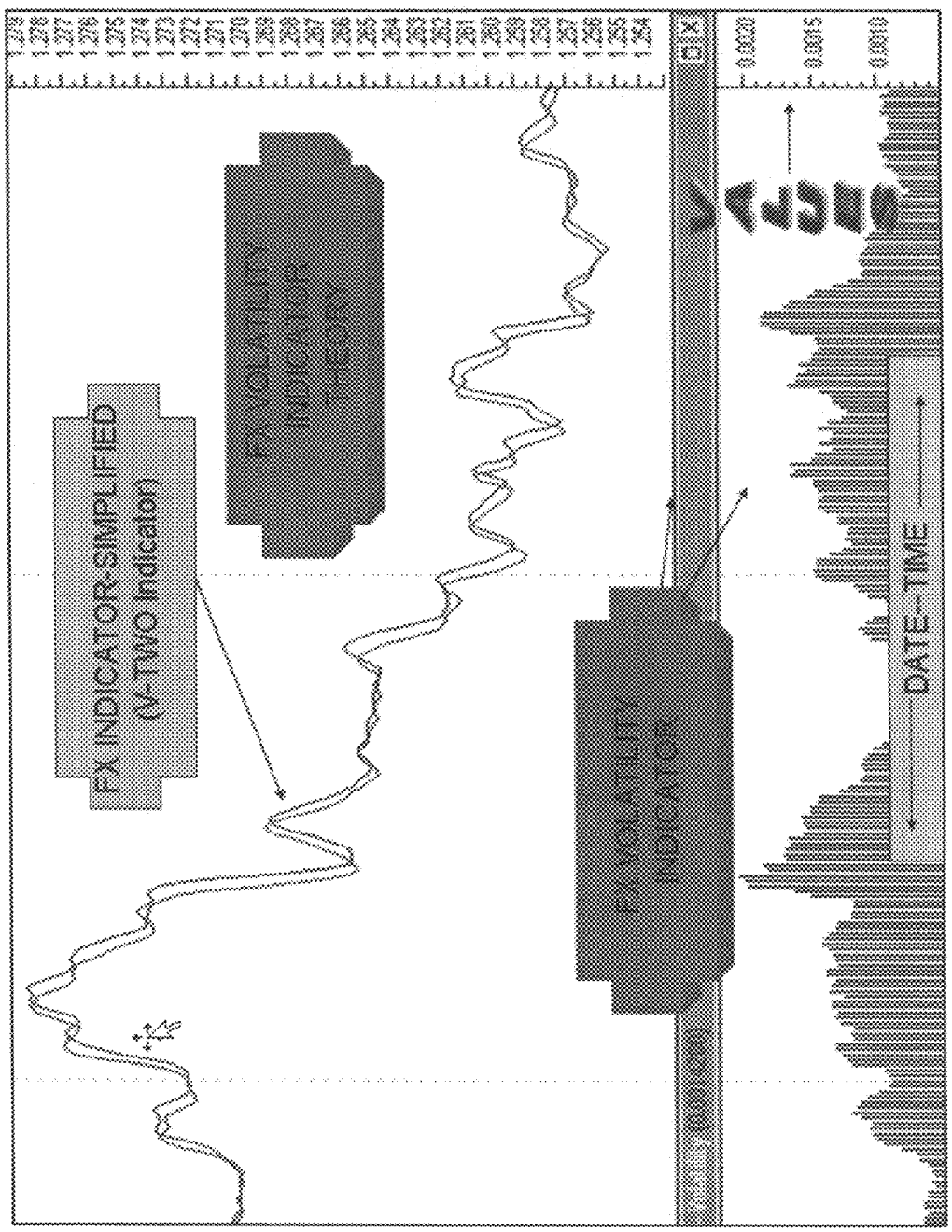
FIG. 37 shows a display illustrating the FX volatility theory in conjunction with V-TWO Indicator according to a preferred embodiment of the present invention.

Pivots, such as daily pivots, 60 minute pivots, or pivots for any timeframe, can be calculated using high, low, close prices of any Market Vehicle. Preferably, combining multiple alignment confirmation signals created by V-FOUR Indicator, V-TWO Indicator, or Golden bars with pivots calculations provide a very powerful signal either to the bullish side or bearish side of a market. As an example, in a bullish market, buy signals are created by alignment after verification of Critical Method to provide a strong visual buy signal. Preferably, entry will be after it has stayed above daily or desired pivot points or above first or second resistance levels. The same logic applies in opposite way for bearish entries. The gains from the application of this theory are usually very profitable in any market as well as with any Market Vehicle. Preferably, the five pivot lines or seven pivot lines can be merged with the x and y axis to visualize the location of entry or exit points. The same principals apply with any specially created pivots. Refer to FIG. 32B and FIG. 33.

Volatility Theory

Preferably, an indicator for volatility in foreign exchange markets can be developed on the basis of the variation of pips in any timeframe by adding the variation of a pip values based on the variations in one timeframe, the last five timeframes, the last ten timeframes or the last twenty timeframes (at least herein embodying calculating at least one fifth time-relevant value representing volatility of such at least one tradable instrument for such at least one timeframe). Preferably, the change in dollar values based on the contract size for any timeframe can also be plotted (at least herein embodying wherein such at least one fifth time-relevant value is based on at least one range of prices paid for such at least one tradable instrument for such at least one timeframe; and at least herein embodying creating at least one fifth graphical representation of such at least one fifth time-relevant value for such at least one timeframe). The rate of change in values of the price in a particular timeframe is very important in calculating volatility in foreign exchange markets. Refer to FIG. 34, FIG. 35, FIG. 36, and FIG. 37 for examples of volatility.

Bullish to bearish wave formation examples:
At cross: The value of volatility from the previous timeframe in most cases decreases.
After cross: The value of volatility increases compared to the volatility at cross.
Before cross: The value of volatility decreases compared to previous timeframe.

Bearish to bullish wave formation examples:
At cross: The value of volatility from the previous timeframe in most cases increases.
After cross: The value of volatility decreases compared to the volatility at cross in most cases.
Before cross: The value of volatility decreases compared to previous timeframe.

Preferably, the volatility value has a relationship with the values of V1, V2, V3 and V4. In other words both FX indicators, V-TWO and V-FOUR, have a relationship with values of all four. Knowing this relationship preferably permits predictions to be made for upcoming bullish or bearish waves, consolidation, slowing of trends or indecision times in the market.

Day Trader Heaven, Swing Trader Heaven, Short Term Trader Heaven or Long Term Trader Heaven Theory (also called FX All Target)

Figure 38:
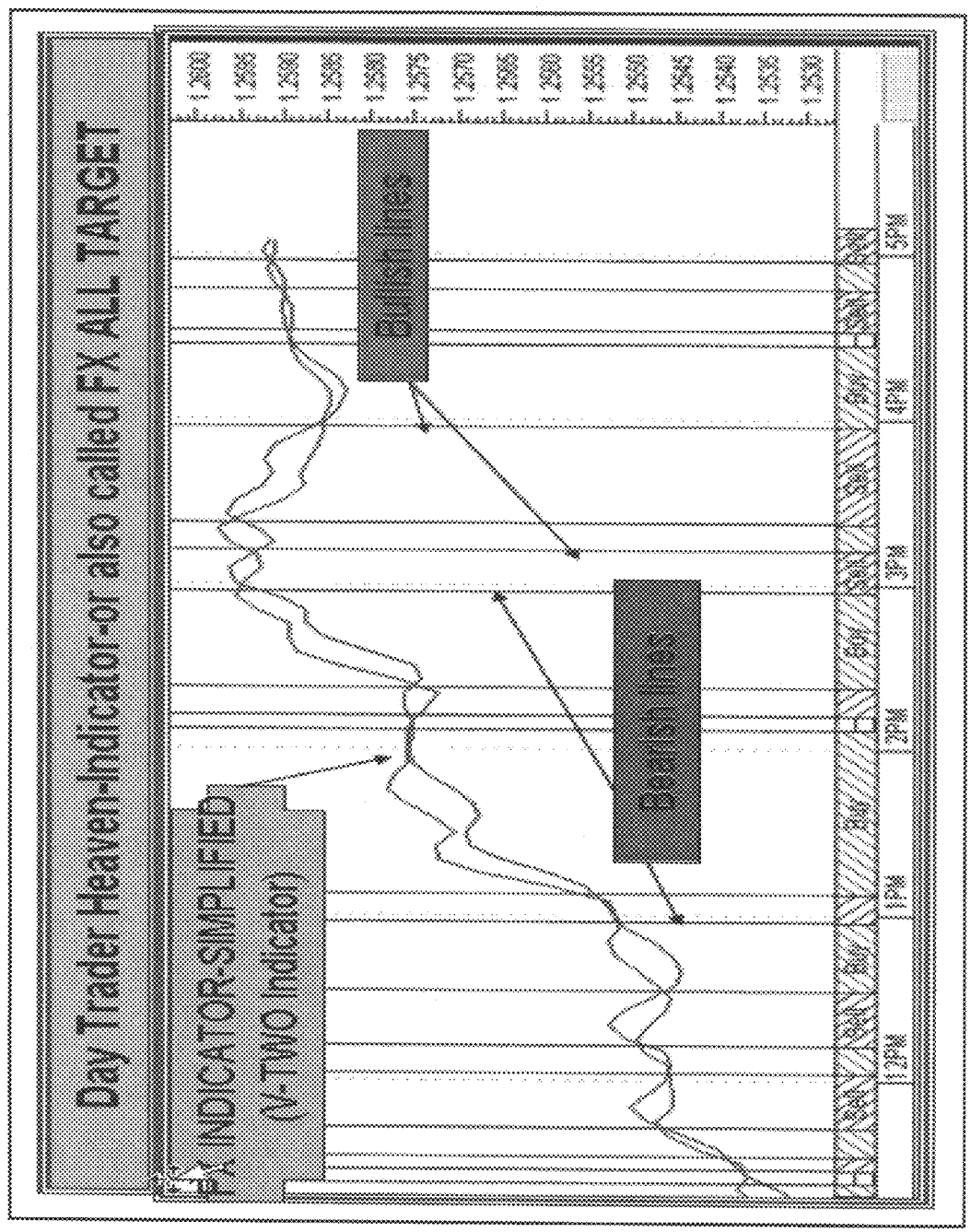
FIG. 38 shows a display illustrating day trader heaven, or FX All Target theory according to a preferred embodiment of the present invention.
Figure 39:
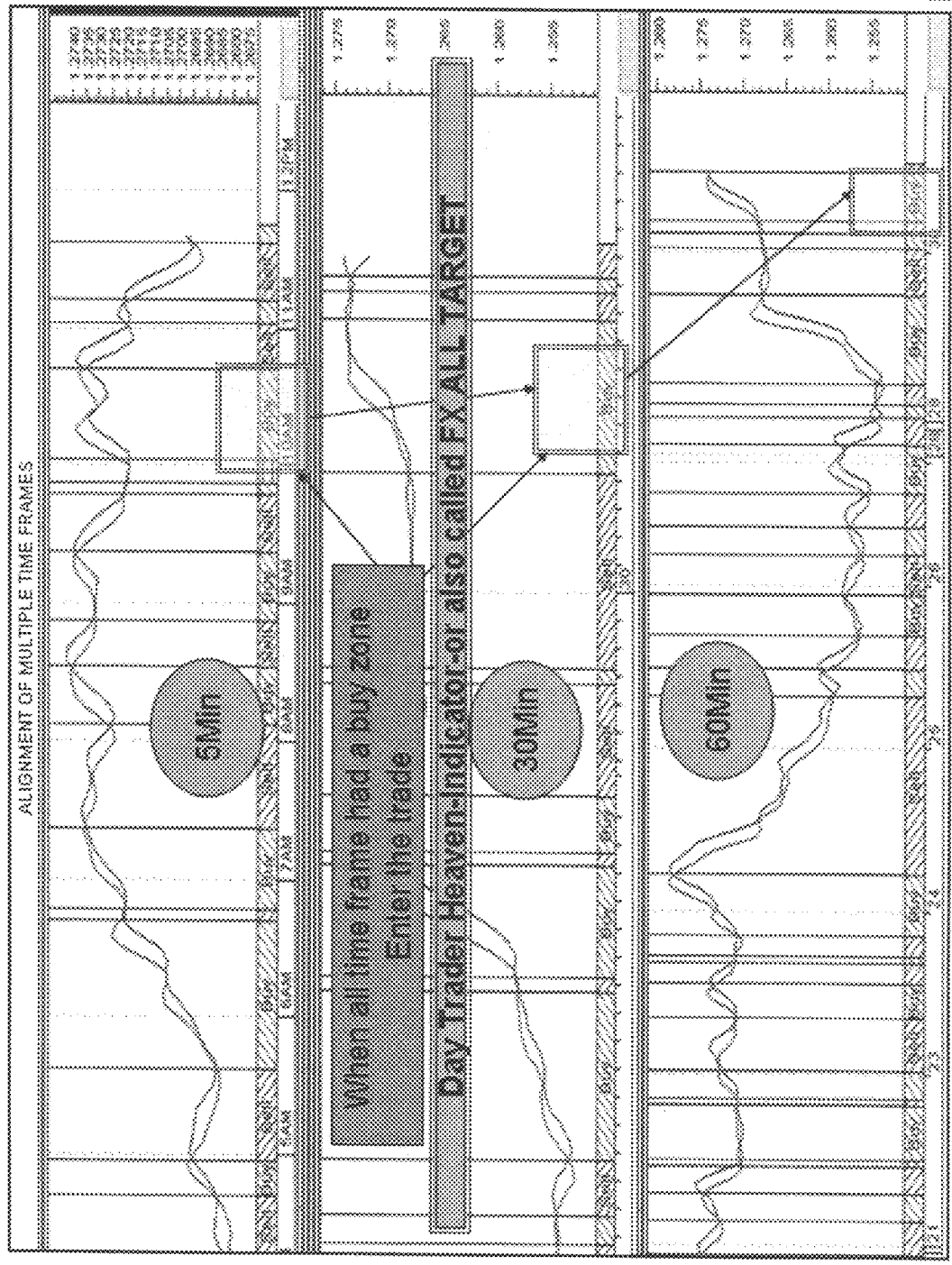
FIG. 39 shows a display illustrating day trader heaven, or FX All Target theory with three different timeframe displays according to a preferred embodiment of the present invention.
Figure 41:
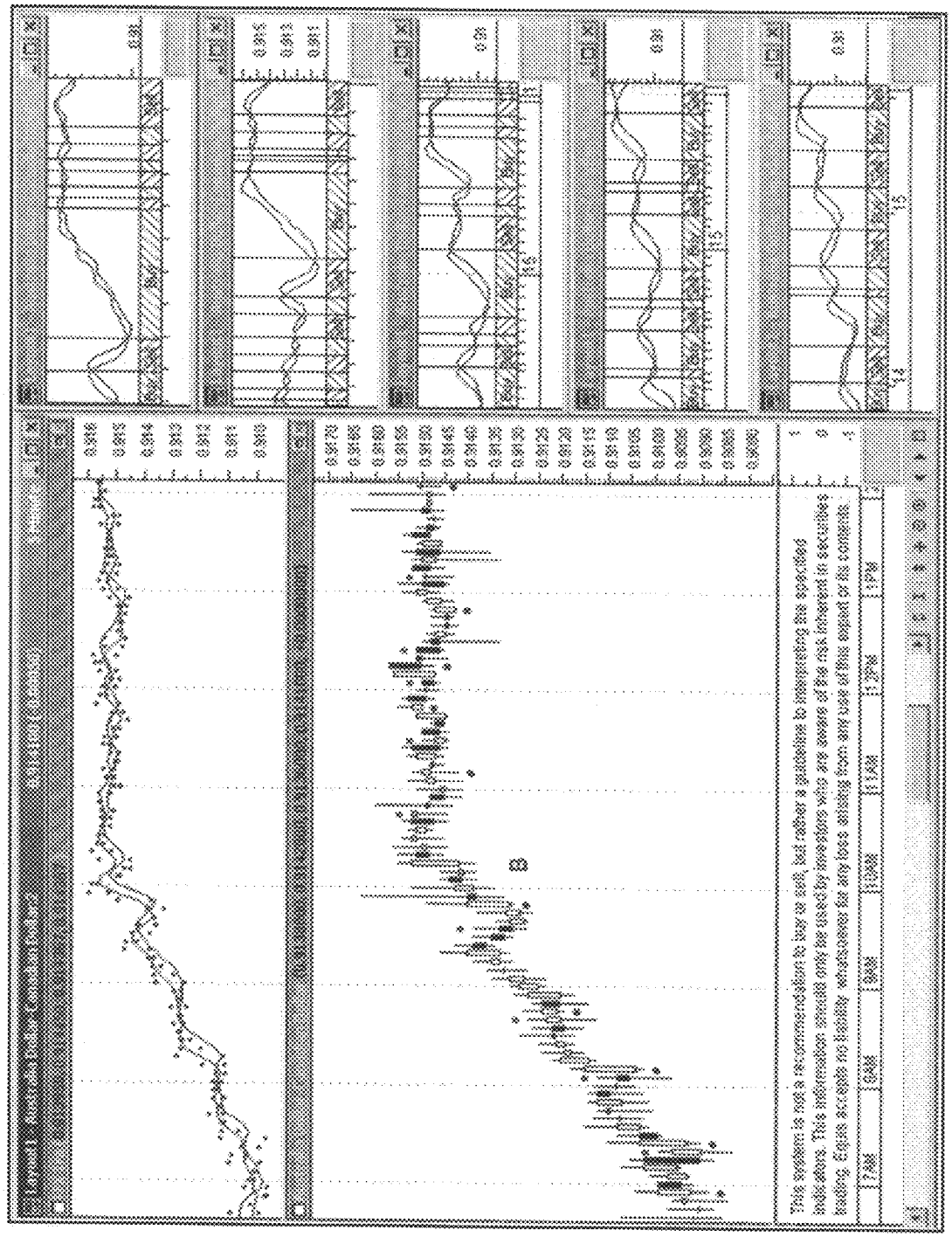
FIG. 41 shows an example of multiple charts presented simultaneously according to a preferred embodiment of the present invention.
Figure 42:
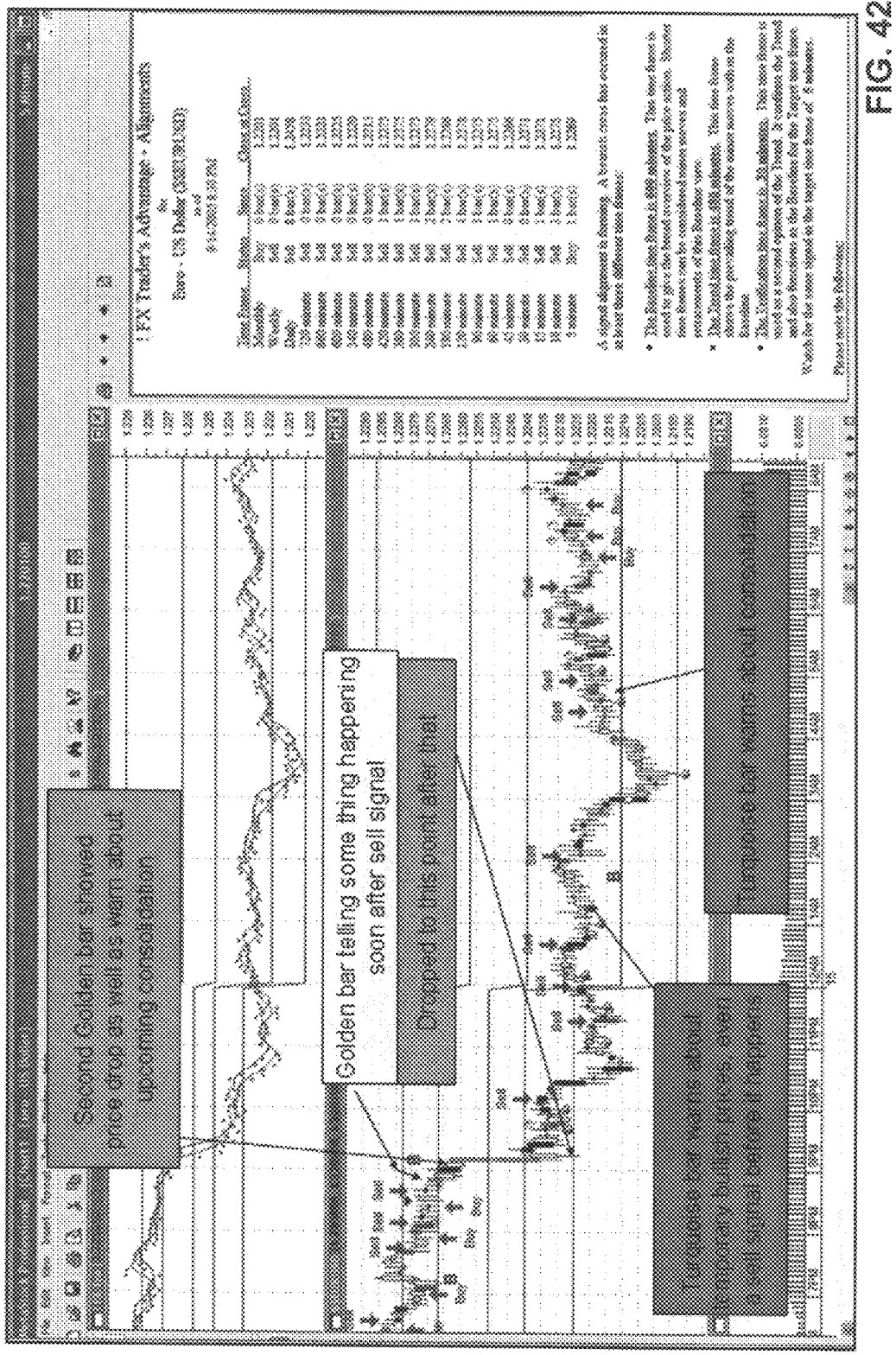
FIG. 42 shows an example of the use of Golden and Turquoise bars on a candlestick chart according to a preferred embodiment of the present invention.

In order to take advantage of short term alignments of bullish and bearish waves, using the V-TWO Indicator (FX Indicator Simplified), vertical lines may preferably be drawn through bullish crosses and bearish crosses. When the Green line, V2, is above the Red line, V1, after the cross, it is preferably interpreted as bullish bias or bullish wave signal and shown as a green vertical line. If, after the cross, the Red line, V1, is above Green line, V2, it is preferably considered a bearish bias or bearish wave signal and shown as a red vertical line. A trader can avoid the smaller waves and therefore avoid very short entries then plot them as no event or not tag them as buy or sell zone. Preferably, a trader may watch for alignment on a five minute to 60 minute chart and then enter a trade only when all timeframes either have a buy or sell zone. This can help scalping or day trading activities. Preferably, this concept can be used for any timeframe combination and also used for swing trades, short term trades and long term trades depending upon the timeframe selected. Also, preferably using expert commentary one can get live commentary about particular timeframe wave type and the location of current bar from previous cross. Refer to FIG. 38, FIG. 39 and FIG. 41.

Critical Path Method for Alignment

Preferably, a Critical Path (agreement of multiple alignment timeframes) can be created using multiple buy and sell signals either in five minute or other timeframes at an alignment. The resulting Critical Path preferably can be used to eliminate false or short term signals and identify strong signals.

Preferably, an algorithm can be created using the history provided by expert commentary at the alignment to recognize the real or false bullish or bearish waves. Preferably, the Critical Path algorithm will evaluate each individual timeframe set and for some number of sets in the past up to the present to determine the number of times the longer-time sets agreed or disagreed with the bearish to bullish signal set alignment. If the preponderance of the "longer" alignments were in the same direction, for instance from bearish to bullish, the trader will preferably be notified of the confirmation of the trend as shown in FIG. 40 (at least herein embodying such at least one plurality of timeframes comprises at least one part of multiple sets of such pluralities (of such different discrete periods of time) wherein each such set comprises a different combination of such discrete periods from any other such set; at least herein embodying at least one computer processor adapted for determining which of such sets are bullish and which of such sets are bearish; at least herein embodying at least one computer processor adapted for notifying such at least one trader of each of such sets which are bullish and each of such sets which are bearish; and at least herein embodying wherein such notifying may be used to assist such decision making by such least one trader).

Preferably, the position of New Crosses (either Natural or Synthetic) at alignment of multiple timeframes can be further used for development of Critical Path for real bullish or bearish waves, a sideways market or an oscillating market. A clear bull and bear fight can preferably be demonstrated by using flow of bullish and bearish waves at the critical alignments. Refer to FIG. 40 for an example of commentary for three consecutive alignments. Preferably, the following logic can be tracked:

Verify that this was a first bullish cross (first signal) and did not take the entry. On second signal it observed that entry time increases from 10 to 30 and trend time increased from 60 to 90.

The verification time increased from 45 to 60.

This is evidence that the small bullish waves are building up stronger bigger waves and a indicator to enter on next available signal is produced.

In the same way, after entering the third signal, if it produces a higher base line, it is further evidence for a stronger trend. The same logic applies for bearish waves.

During a sideways market, the signals are tracked to give the trader a first bullish signal and then bearish signals with the timeframe built up going back and forth on smaller waves to bigger waves, to generate a warning sign of the market being in oscillation or going sideways. When coming out of such a condition, the strength of the bullish or bearish waves are preferably tracked to determine which is generating stronger waves, and selects the one which is strongest to create a Critical Path for trading.

Additional types of Critical Paths can be developed using the same logic.

Concept to Reality

Preferably, the following are the basic indicators that use the algorithms for V1, V2, V3, and V4:

V-FOUR FX INDICATOR—Full Version uses V1, V2, V3, and V4

V-TWO FX INDICATOR—Simplified version uses only V1 and V2

Preferably, the above indicators can be used to create the following timeframe indicators:

FX-5 MINUTE BUY SIGNAL/FX-5 MINUTE SELL SIGNAL
FX-10 MINUTE BUY SIGNAL/FX-10 MINUTE SELL SIGNAL
FX-15 MINUTE BUY SIGNAL/FX 15 MIN SELL SIGNAL
FX-30 MIN BUY SIGNAL/FX 30 MIN SELL SIGNAL
FX-45 MIN BUY SIGNAL/FX-45 MIN SELL SIGNAL
FX-60 MIN BUY SIGNAL/FX-60 MIN SELL SIGNAL
FX-DAILY BUY SIGNAL/FX-DAILY SELL SIGNAL
FX-WEEKLY BUY SIGNAL/FX-WEEKLY SELL SIGNAL
FX MONTHLY BUY SIGNAL/FX-MONTHLY SELL SIGNAL

FX QUATERLY BUY SIGNAL/FX-QUATERLY SELL SIGNAL

FX YEARLY BUY SIGNAL/FX YEARLY SELL SIGNAL

Note: One can apply any custom timeframe from a tick (transaction) to any multiple of minutes.

Preferably, following are independent indicators which work in conjunction with above indicators:

FX-VOLATILITY INDICATOR
FX-DAILY PIVOT FORMULA
FX-60 MIN PIVOT FORMULA
FX-ANY TIMEFRAME PIVOT FORMULA
FX-REAL TIME SWING PIVOT FOR ANY TIMEFRAME

Preferably, additional indicators that can be developed:

Indicator showing all golden bars (Bullish) and Turquoise bars (bearish) in all timeframes Indicator which can tag first buy and first sell signal in all timeframes.

Indicator showing possible reversal in trend, forecasting slower or faster trend, upcoming consolidation or break out with a possible direction using the V-TWO FX Indicator and V-FOUR FX Indicator.

V1-V2 Indicator
V1/V2—Simple ratio (V-TWO) Indicator
Delta V-Rate of Change (V1 and V2)
Close-V1, Close-V2
Pivot-V1, Pivot-V2
V3-V4 Indicator
V3/V4—Full ratio (V-FOUR) Indicator
Delta V-Rate of Change (V2, and V3)
Close-V3 Indicator, Close-V4 Indicator
Pivot-V3, Pivot-V4 Indicator
V1/V3—Bear strength Indicator
V2/V4—Bull strength Ratio Preferably, alignments can be developed using Natural Crosses and Synthetic Crosses, the following alignments can be used for entry or exit signals:

Alignment of Golden Bars (Bearish) and Turquoise Bars (Bullish) in multiple timeframes using expert commentary. These alignments will preferably produce possible trend reversal points, upcoming trend changes, and possible upcoming strong or weaker consolidations, and forecasting retracements.

Alignment of multiple timeframes (two or more) to have better entry and exit for any Market Vehicle.

Alignment created in a first phase of Commentary window for multiple timeframes can preferably be used to create a critical path to track down the flow of bullish or bearish waves and distinguish good waves from false waves, track embedded trends, distinguish internal buying or selling, may be called Guided Wave Theory.

Alignment between V1, V2, V3, V4 using various conditions preferably can be used to forecast possible reversals, upcoming trend changes, consolidations, critical entry and exit points, multiple confirmations for entry and exit.

Alignment of real time swing bars with traditional FX daily or other timeframe pivots, and with buy or sell signal alignment using V-FOUR Indicator.

Possible Templates

Preferably, the following display templates can be created for the ease of using V-TWO FX Indicator, V-FOUR FX Indicator and many other creations.

All Target Short Term template—Using 5 minute, 10 minute, 15 minute, 30 minute, 45, minute and 60 minute timeframe using either V2 OR V4 Indicator (five minute) for an entry and exit signal. This preferably uses buy and sell zones and their alignment. This is called either a Day Trader Heaven or FX Indicator. The preferred purpose of creating this layout is to do very short term trades and use it as an entry for a longer term trades, including swing trading. For swing traders it will be named Swing Trader Heaven Indicator, Short Term Heaven Indicator, etc.

Golden Bar template—This template may be used in conjunction with traditional bar or candle charts with V-FOUR Indicator.

Volatility template—Use this template as an independent indicator in conjunction with V-FOUR OR V-TWO Indicators.

Market Summary template—Provides an overview of all 17 major currency pairs, using FX Long Term Direction template, a FX Short Term Direction template and a FX Signal (Master) template.

FX Long Term Direction template preferably includes:

Commentary—Preferably, the main 17 currency pairs are listed in columns. The current trend of the long term interval is displayed with either green or red arrows indicating direction. The long term intervals are: 480, 540, 600, 660, 720, Daily, Weekly, and Monthly (option: Quarterly, Yearly)

Highlights—Preferably, the price plot is highlighted either green (bullish) or red (bearish) depending on the trend.

FX Short Term Direction template preferably includes:

Commentary—Preferably, the main 17 currency pairs are listed in columns. The current trend of the short term interval is displayed with either green or red arrows indicating direction. The short term intervals are: 60, 90, 120, 180, 240, 300, 360, 420 minutes.

Highlights—Preferably, the price plot is highlighted either green (bullish) or red (bearish) depending on the trend.

FX Signal (Master) template preferably includes:

Commentary—Preferably, will display a grid of 17 currency pairs by five columns. Column Headings are: Base line, Trend time, Verification and Entry. Grid will identify each time interval and the signal that is given. Where no trades exist for a pair this will be indicated by and line of text N/A. Preferably, it will suggest the chart of the pair with the entry timeframe be monitored if they want to watch the trade develop.

Highlights—Preferably, the price plot is highlighted either green (bullish) or red (bearish) depending on the trend.

Symbols—Preferably, the following symbols will be plotted when there is a signal: Bullish Bounce, Bearish Bounce, Bullish Cross, and Bearish Cross.

Alerts—Preferably, the following Alerts will be triggered when there is a signal: Bullish Bounce, Bearish Bounce, Bullish Cross, and Bearish Cross. Preferably, the trader can pick and choose any combination of four on an individual basis.

Other Layouts

FX Layout: A layout of Daily, Weekly, 60 min and 15 min charts with the FX Indicator on all. The FX Long Term Direction commentary will preferably be included on the Daily and Weekly, the FX Short Term Direction Commentary will preferably be on the 60 minute and the FX Signal Expert will preferably be on the 15 minute And other timeframes on latter stages and with five minute entries.

Day Trader Heaven: A layout can be created for 5 min, 10 min, 15 min, 30 min, 45 min and 60 minute with FX Trader Indicator and commentary preferably can be generated for each timeframe. Preferably, putting them together as a group of charts, a buy or sell signal can be generated the similar way as described above when alignment of all New Crosses occurs in all four or fix timeframes.

FX Exploration: Filters for Crosses and Bounces and will display in a Results Report those pairs that either had a Cross or Bounce. Displays in the Results Reports:

Col A—Crosses (1 or 0)
Col B—Bounces (1 or 0)
Col C—Entry time (interval)
Col D—Verification time (interval)
Col E—Trend Time (interval)
Col F—Base line (interval)

Automation

Preferably, a buy or sell order can be sent to trading robots for trade execution in real time, based on the first buy and sell signals shown on five minute charts generated with a combination of FX TRADE with green or red candles and with buy and sell signs at the confirmation of alignment of multiple crosses. Additionally, preferably any signals generated after first buy or sell signals can be also used and traded automatically. Preferably, with trading robots a trader can use any signal generated from any indicator, from any theory here, from any concept here, mix them, match them and have robot give the trader some rest.

Ticks versus Timeframes

One common time basis for reporting trading data (open price, close price, high price, low price) is five minutes, however the same data may be reported on the basis of five transactions or five ticks. According to a preferred embodiment of the present invention, all algorithms and calculations can be completed on the basis of time, such as minutes, or on the basis of transactions completed, commonly referred to as ticks. Preferably, the trader may specify which reporting basis is to be used.

Using traditional Indicators

Preferably, there is no requirement for using traditional indicators such as RSI, Stochastic, etc. However, a volatility Indicator (FX Traders Volatility) based on price swings during any timeframe may be created.

Training Programs Content, Preparation and Delivery

Figure 43:
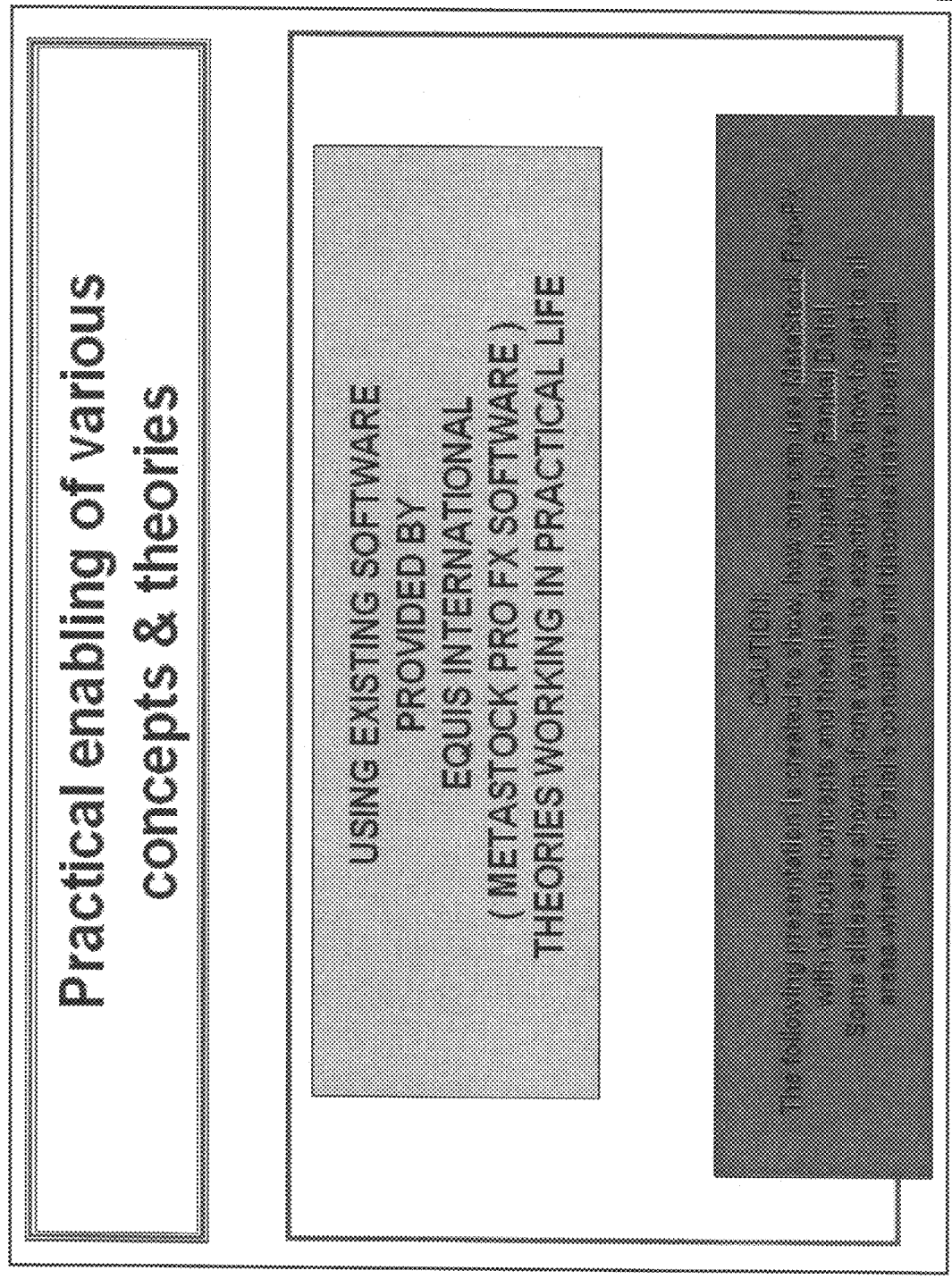
FIG. 43 shows an example of the initial presentation screen for trader training according to a preferred embodiment of the present invention.

According to a preferred embodiment of the present invention, the preferred objective of the trader training curriculum is to provide traders the tools, understanding and skills to make the best possible trading decisions as suggested by an example training program introduction slide as shown in FIG. 43. Preferably, the trader training program comprises presentation of example analysis screens, discussion of the underlying computations for each key indicator (for example V-FOUR), presentation of the nature of the signals produced by each key indicator and presentation of the significance of the signals and what trading decisions the signals suggest and why. Preferably, the scope of training comprises the concepts, methods and the signals embodied in the preferred computer real-time analysis system for the following concepts:

V-FOUR Indicators,
V-TWO Indicators,
Alignment and Commentary,
New Crosses and Synthetic Crosses,
Dot Theory,
Reversal Bar Theory,
Golden Bar Theory,
Real Time Swing Bar Theory,
FX Pivot Theory,
Volatility Theory,
Day Trader Heaven,
Swing Trader Heaven,
Short Term Trader Heaven,
Long Term Trader Heaven Theory (also called FX All Target), and
Critical Path Method for Alignment.

Figure 44:
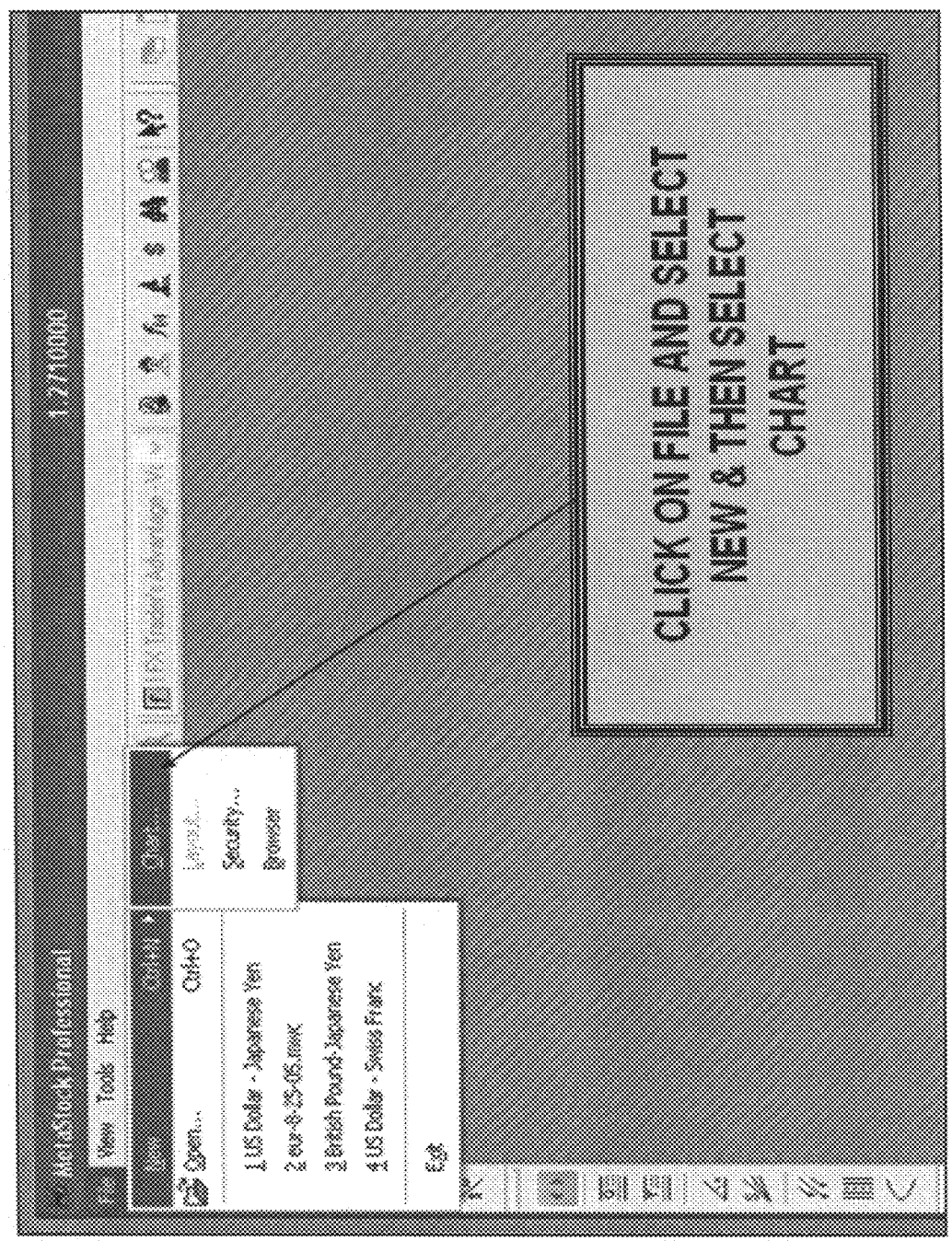
FIG. 44 shows an example of an initial set up screen for starting the preferred computer real-time analysis system within a charting system such as MetaStock® according to a preferred embodiment of the present invention.
Figure 45:
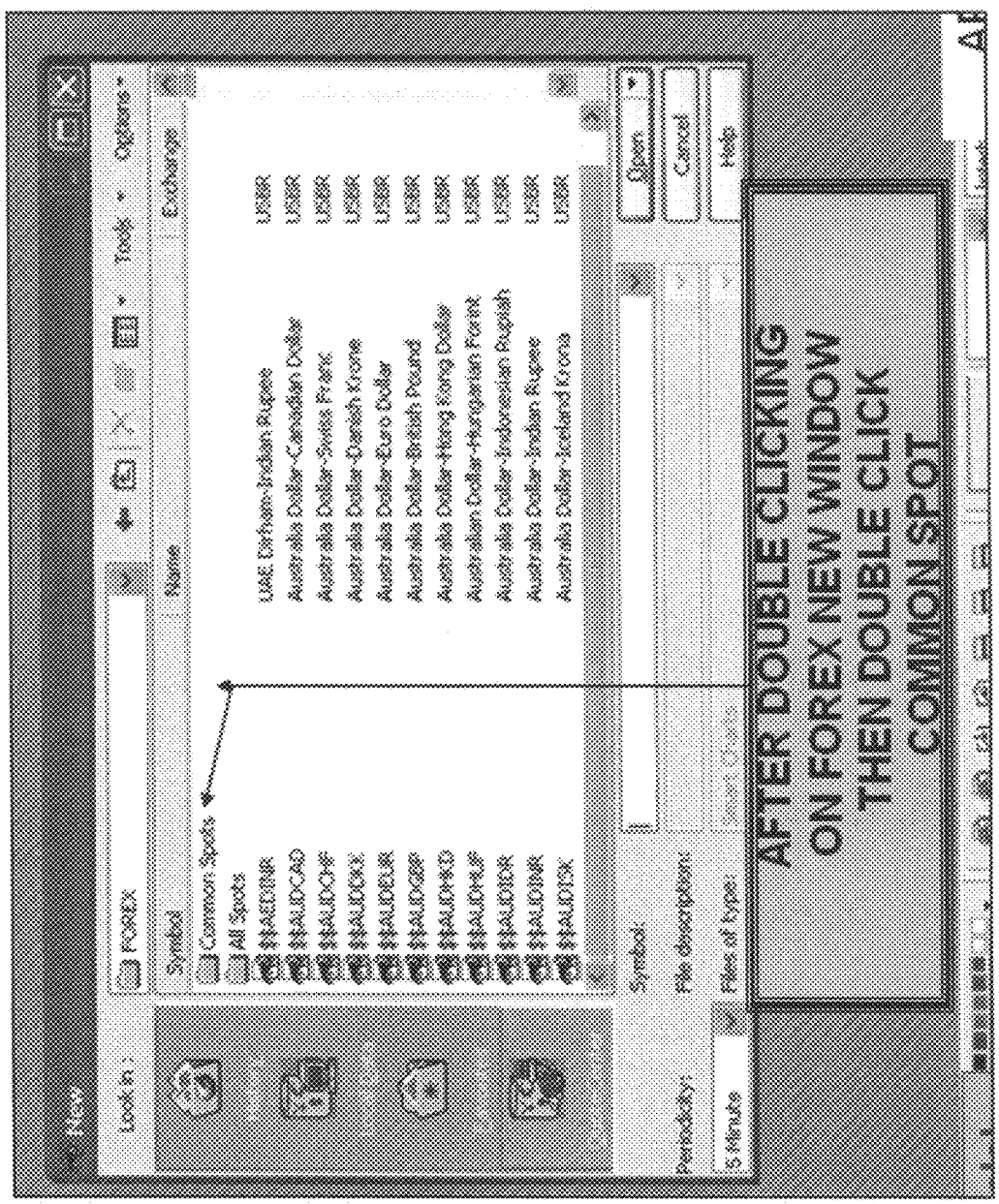
FIG. 45 shows an example of a set up screen for selecting a market for use with the preferred computer real-time analysis system within a charting system such as MetaStock® according to a preferred embodiment of the present invention.
Figure 46:
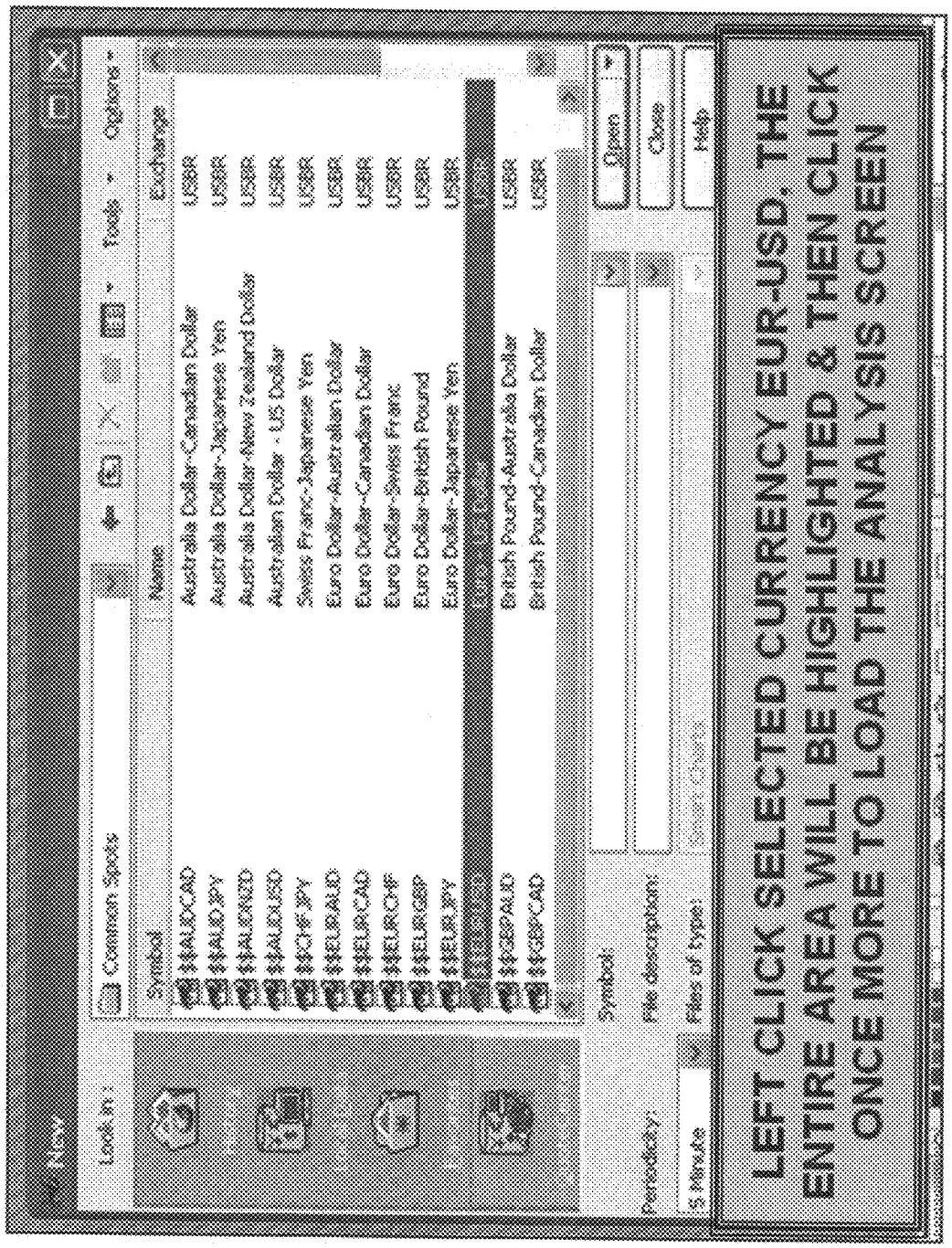
FIG. 46 shows an example of a set up screen for selecting a currency pair for analysis by the preferred computer real-time analysis system within a charting system such as MetaStock® according to a preferred embodiment of the present invention.
Figure 47:
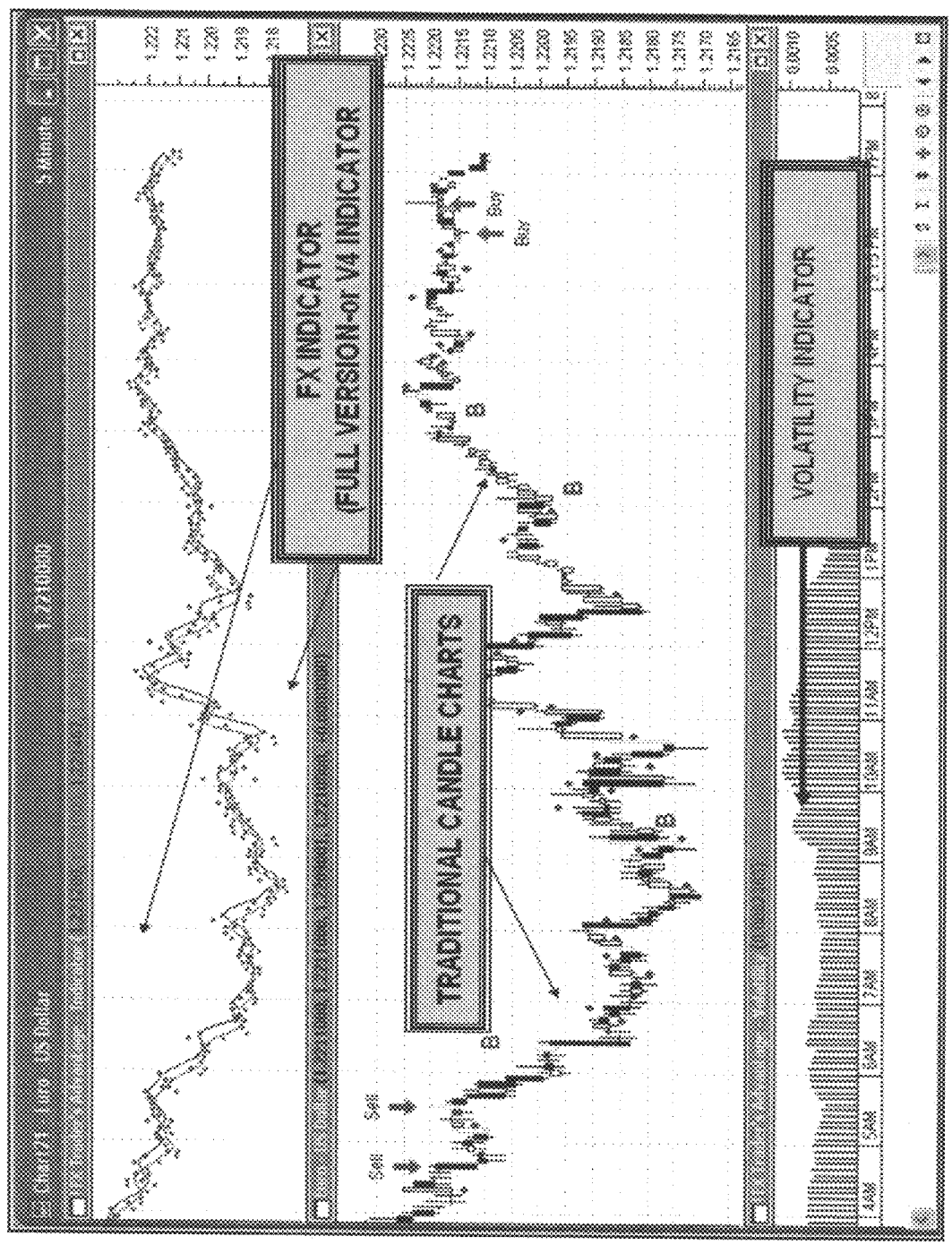
FIG. 47 shows an example of an analysis screen presenting FX Indicator, Traditional Candle Chart and Volatility Indicator provided by the preferred computer real-time analysis system according to a preferred embodiment of the present invention.
Figure 48:
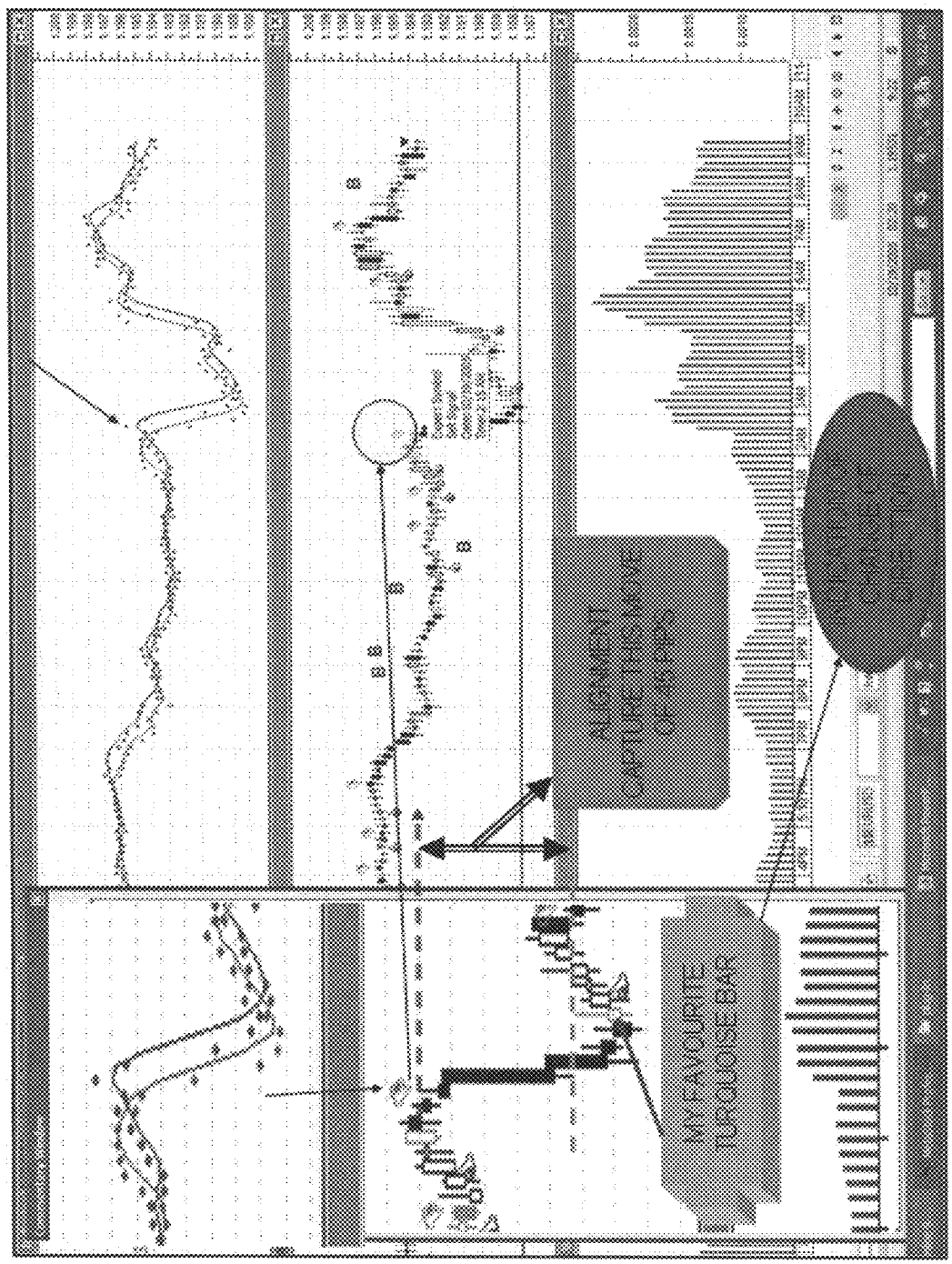
FIG. 48 shows an example of a first analysis screen demonstrating market changes indicators when using FX Indicator, Traditional Candle Chart and Volatility Indicator provided by the preferred computer real-time analysis system according to a preferred embodiment of the present invention.
Figure 49:
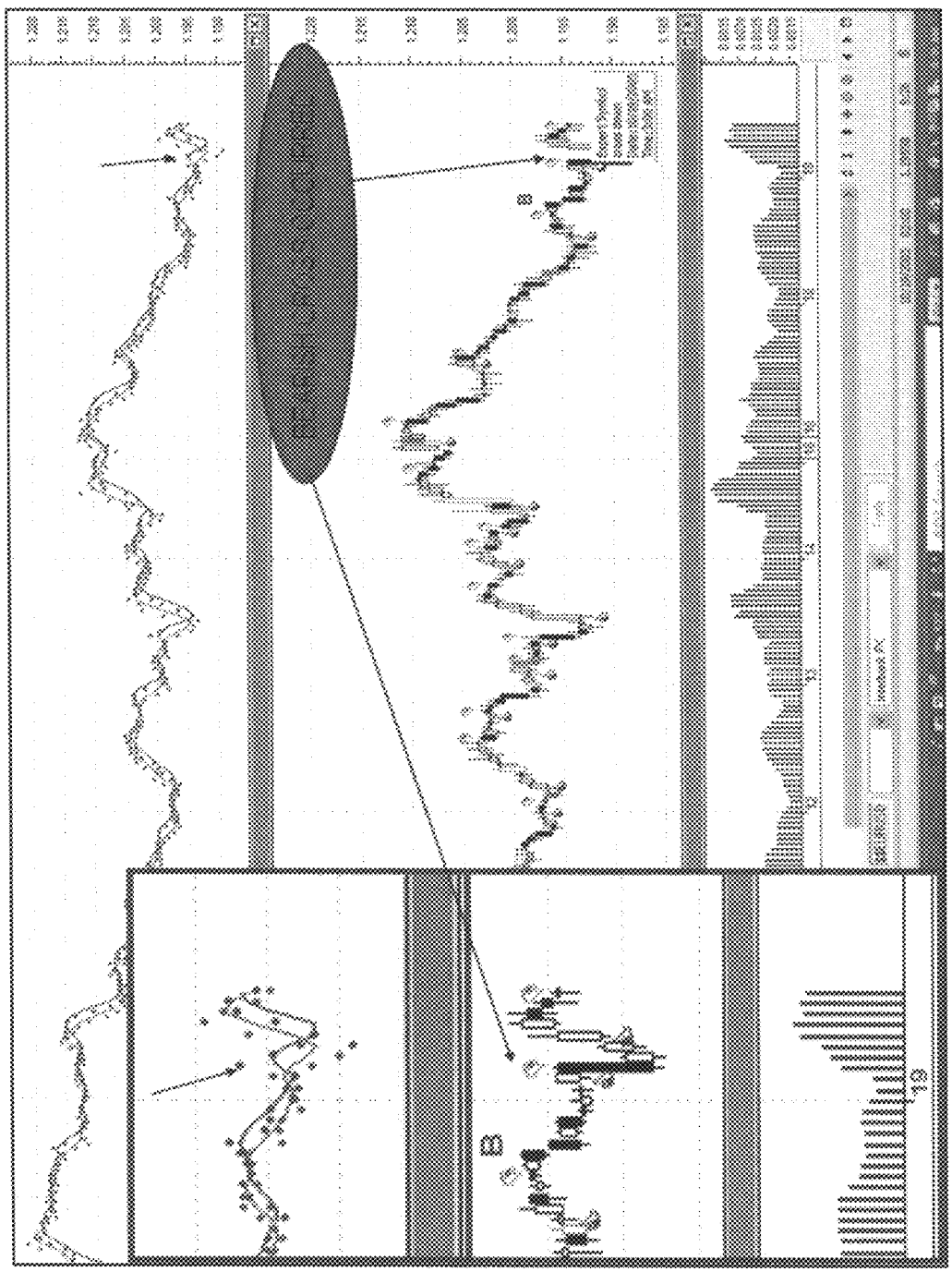
FIG. 49 shows an example of a second analysis screen demonstrating market changes indicators when using FX Indicator, Traditional Candle Chart and Volatility Indicator provided by the preferred computer real-time analysis system according to a preferred embodiment of the present invention.
Figure 50:
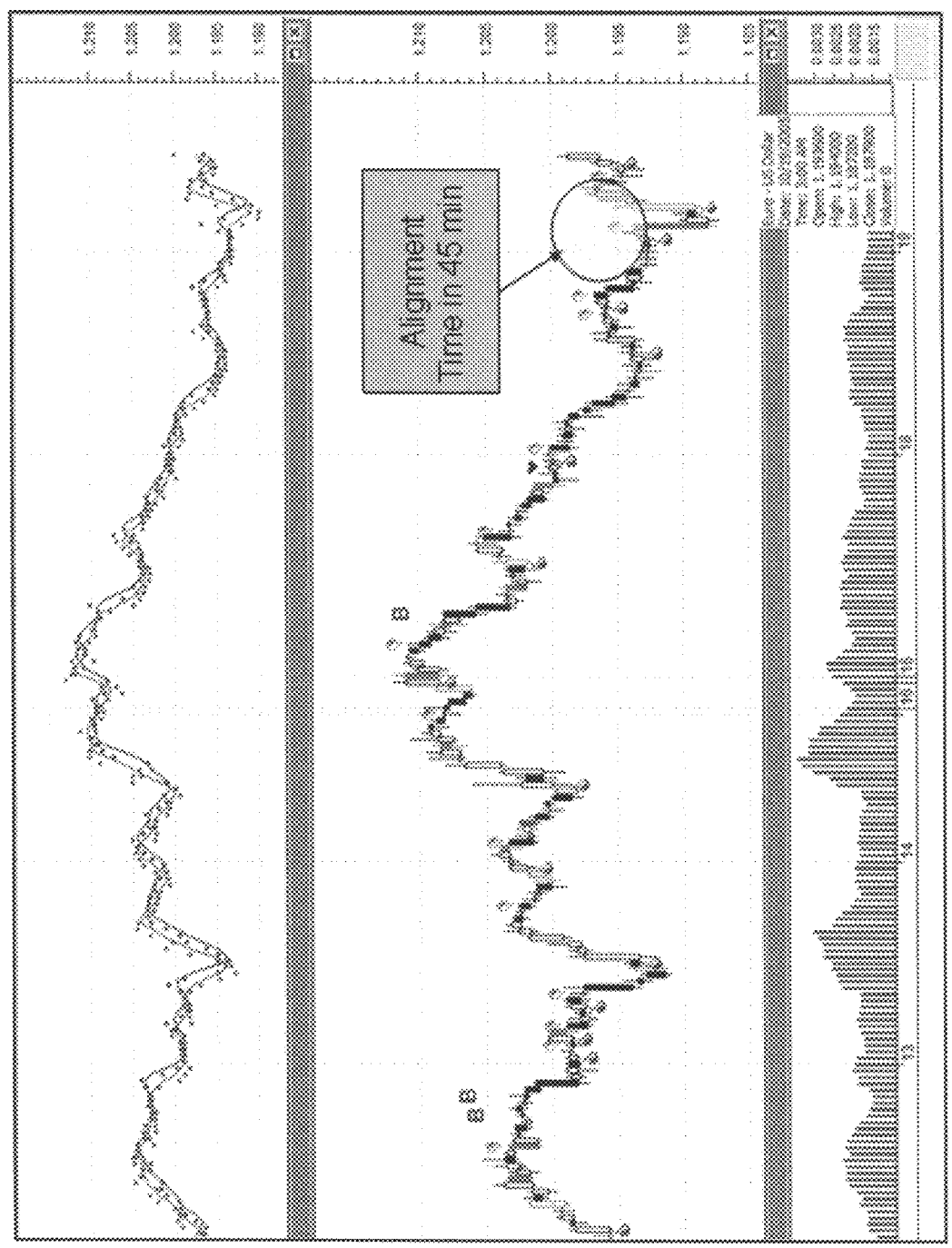
FIG. 50 shows an example of a third analysis screen demonstrating market changes indicators when using FX Indicator, Traditional Candle Chart and Volatility Indicator provided by the preferred computer real-time analysis system according to a preferred embodiment of the present invention.
Figure 51:
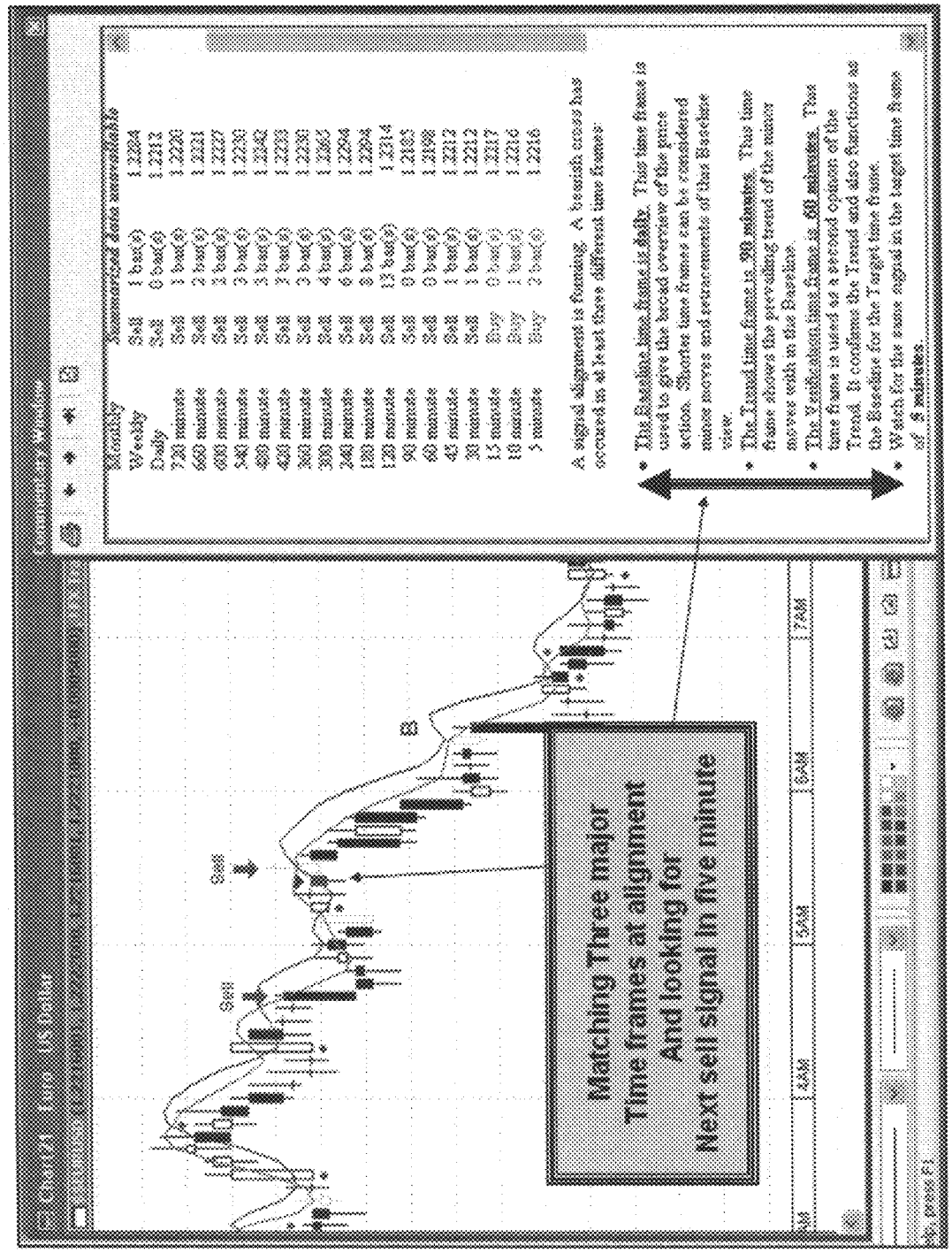
FIG. 51 shows an example of an analysis screen demonstrating market changes indicators when using V-TWO Indicator superimposed on a Traditional Candle Chart and Alignment and Commentary provided by the preferred computer real-time analysis system according to a preferred embodiment of the present invention.
Figure 52:
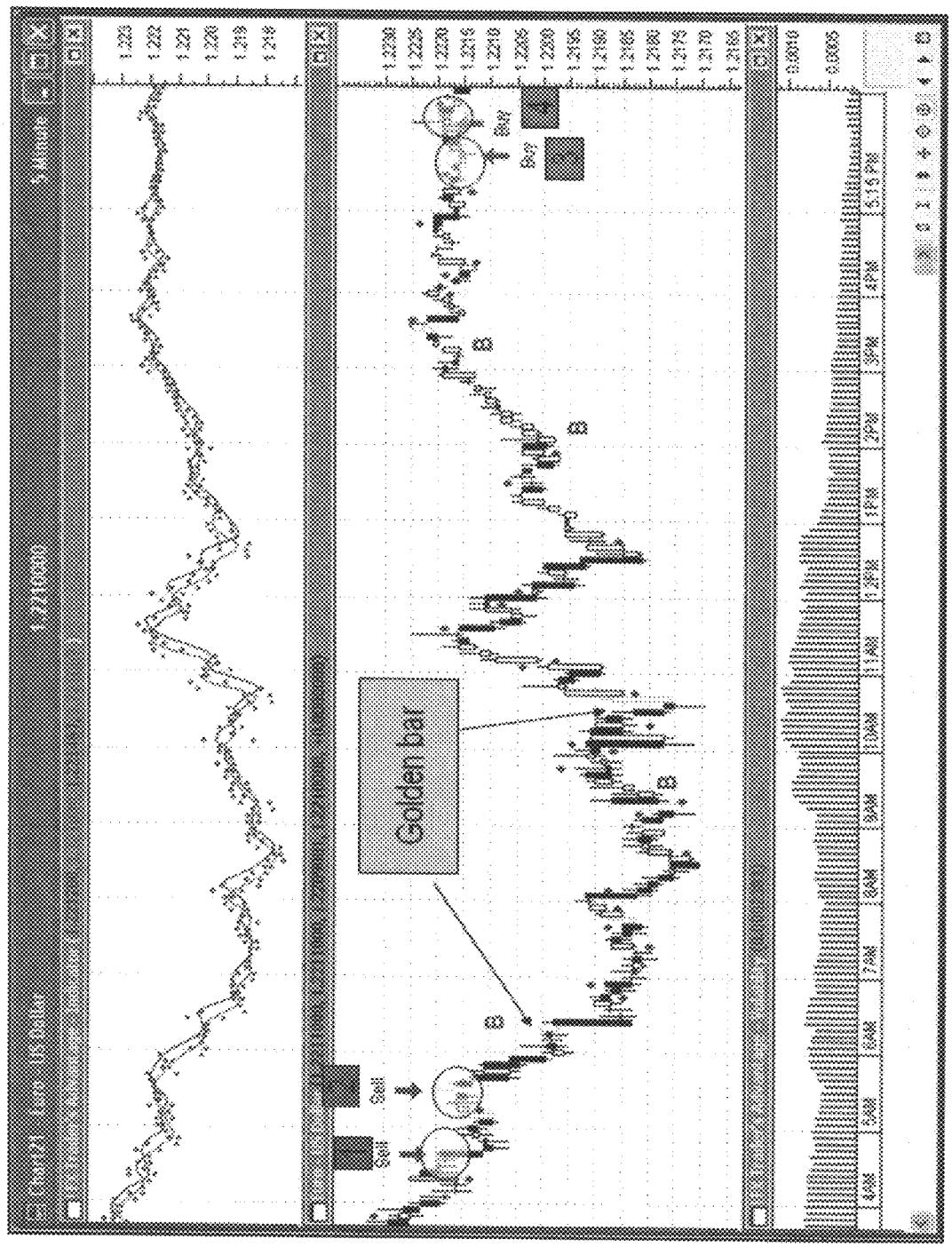
FIG. 52 shows an example of an analysis screen demonstrating market change indicators when using FX Indicator, a Traditional Candle Chart with Golden Bar and Volatility Indicator provided by the preferred computer real-time analysis system according to a preferred embodiment of the present invention.
Figure 53:
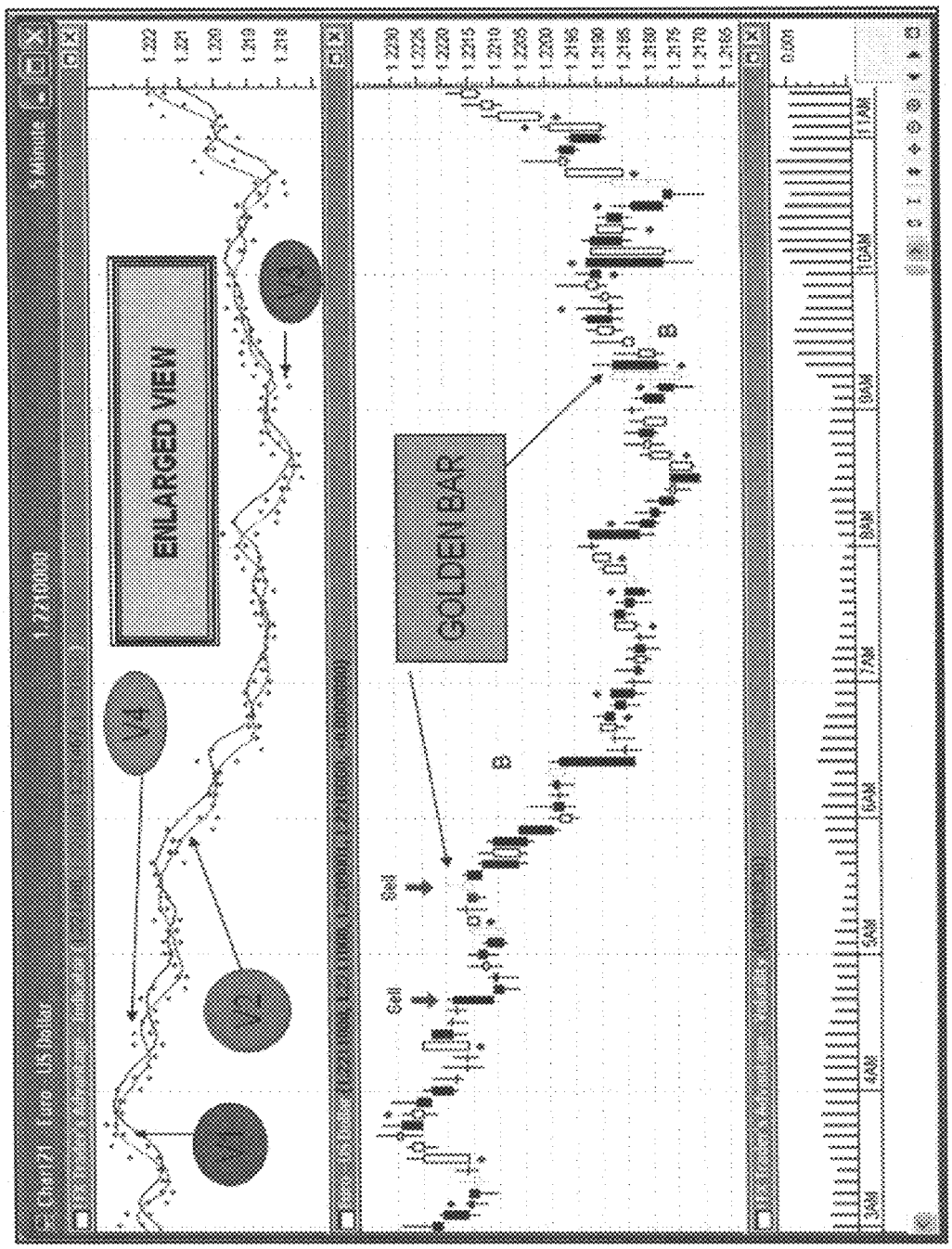
FIG. 53 shows an example of an enlarged view of an analysis screen demonstrating market change indicators when using FX Indicator, a Traditional Candle Chart with Golden Bar and Volatility Indicator provided by the preferred computer real-time analysis system according to a preferred embodiment of the present invention.
Figure 54:
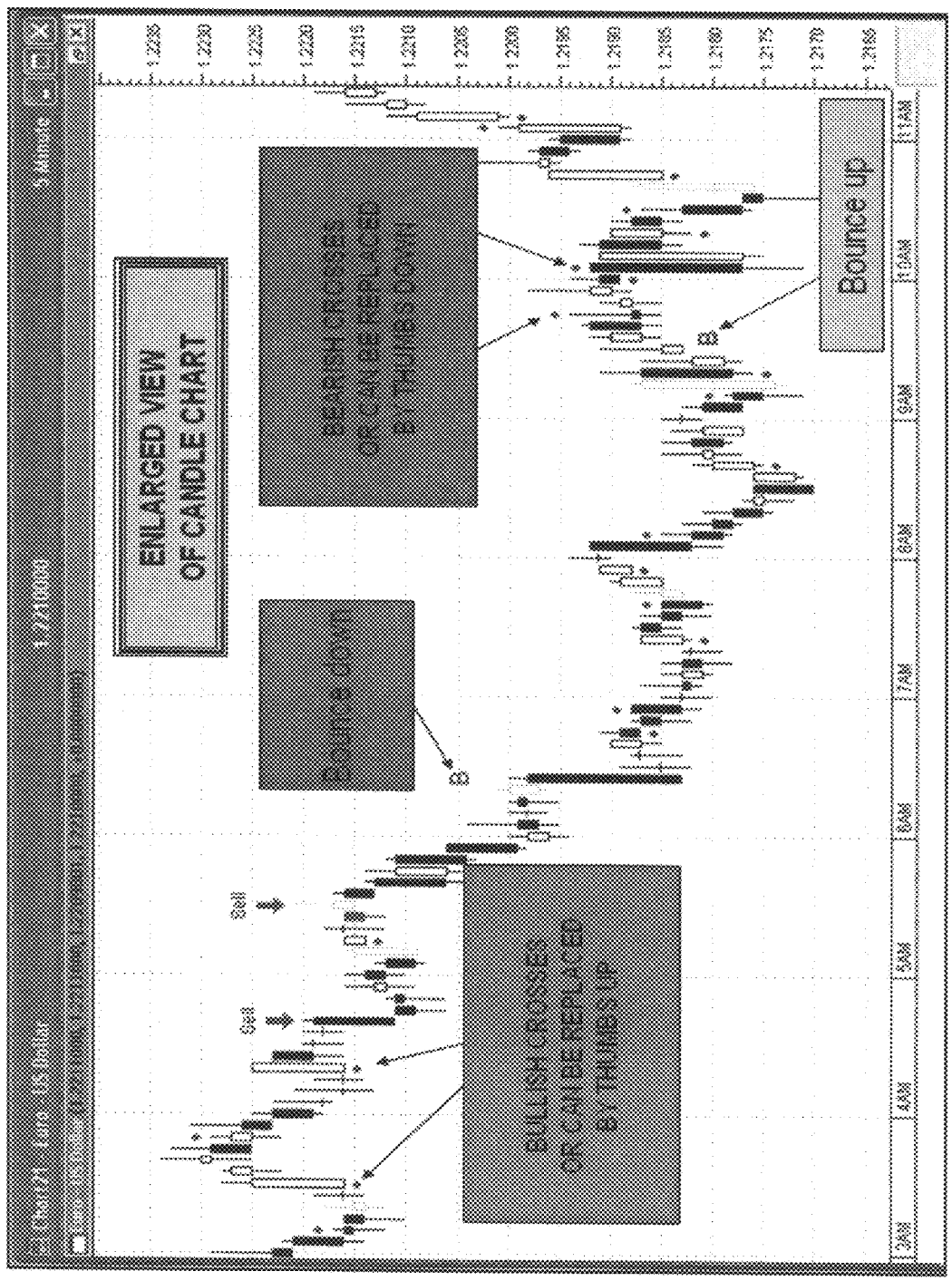
FIG. 54 shows an example of an analysis screen demonstrating market change indicators when using a Traditional Candle Chart with Golden Bar provided by the preferred computer real-time analysis system according to a preferred embodiment of the present invention.
Figure 55:
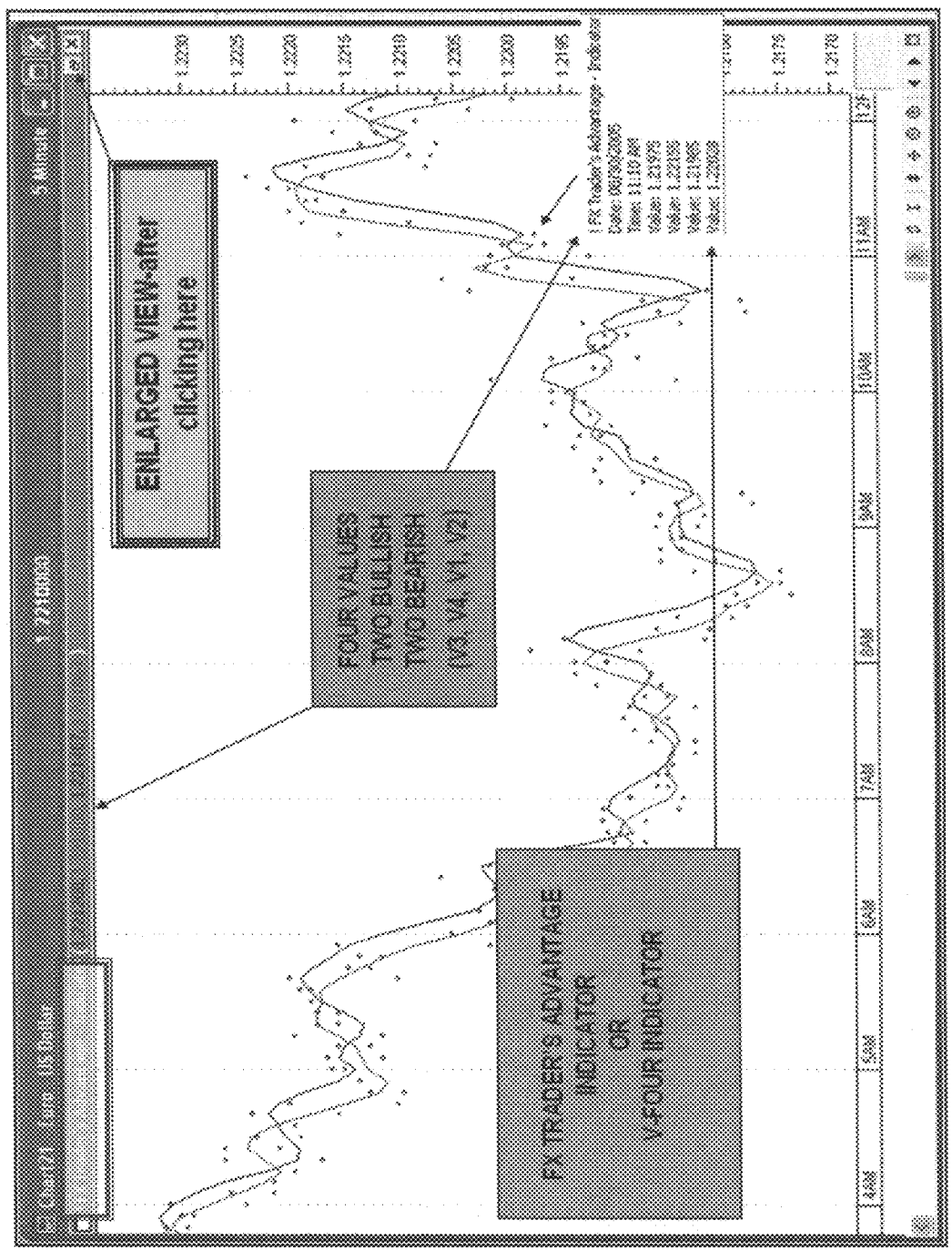
FIG. 55 shows an example of an enlarged view of an analysis screen demonstrating market change indicators when using FX Indicator Bar provided by the preferred computer real-time analysis system according to a preferred embodiment of the present invention.
Figure 56:
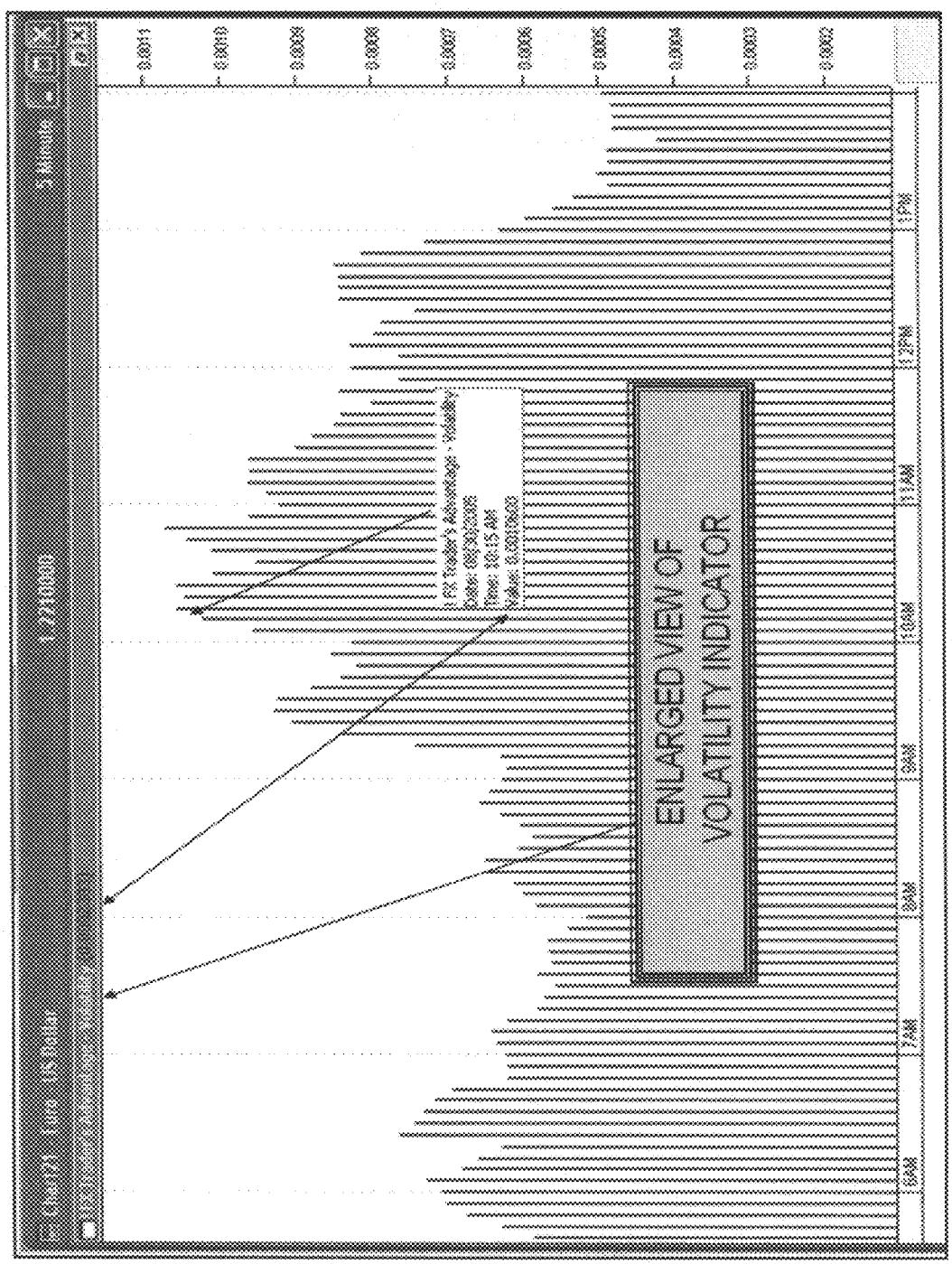
FIG. 56 shows an example of an enlarged view of an analysis screen demonstrating market change indicators when using a using Volatility Indicator provided by the preferred computer real-time analysis system according to a preferred embodiment of the present invention.
Figure 57:
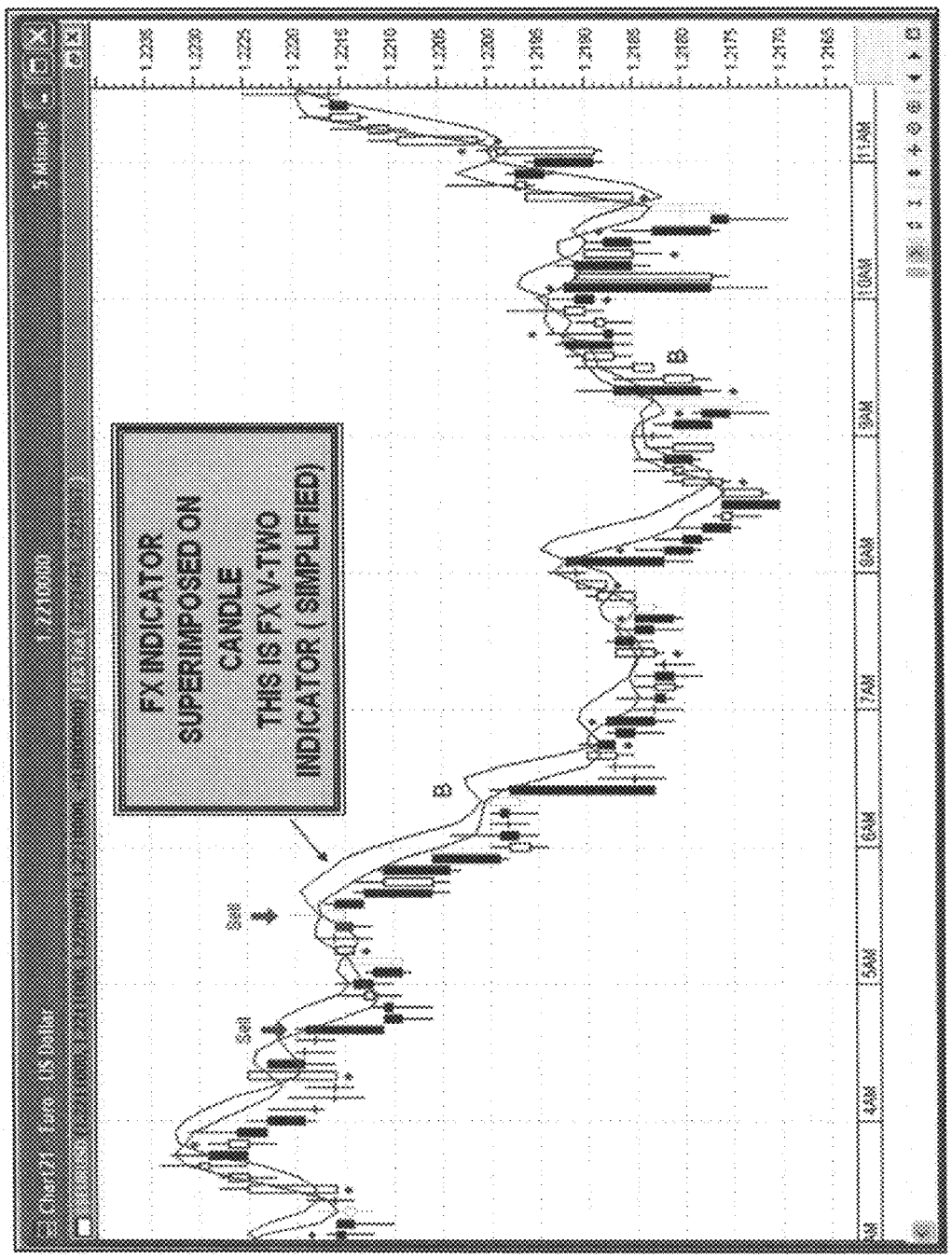
FIG. 57 shows an example of an enlarged view of an analysis screen demonstrating market change indicators when using V-TWO Indicator superimposed on a Traditional Candle Chart provided by the preferred computer real-time analysis system according to a preferred embodiment of the present invention.
Figure 58:
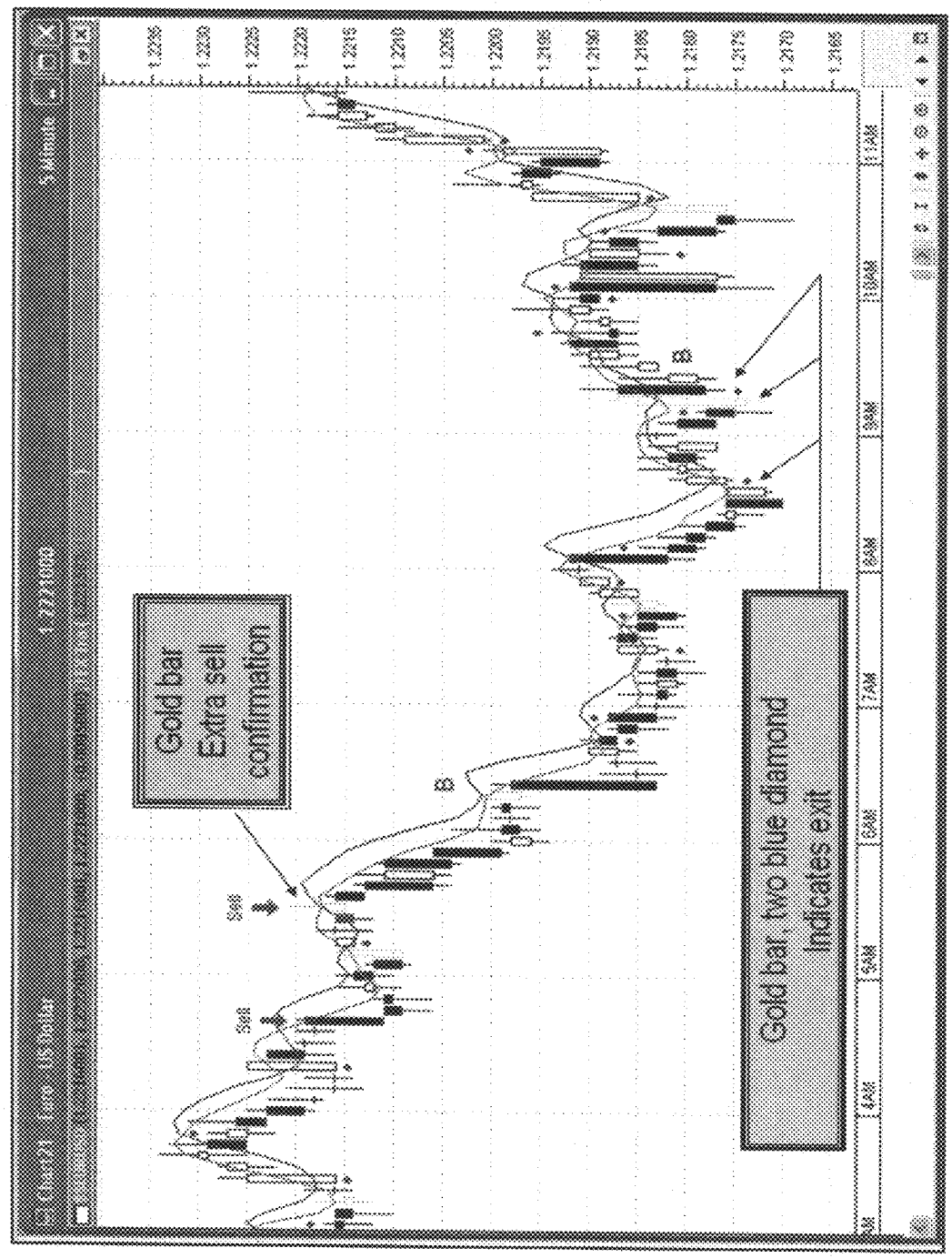
FIG. 58 shows an example of an analysis screen demonstrating market change indicators when using a using V-TWO Indicator superimposed on a Traditional Candle Chart with Golden Bar Indicators provided by the preferred computer real-time analysis system according to a preferred embodiment of the present invention.
Figure 59:
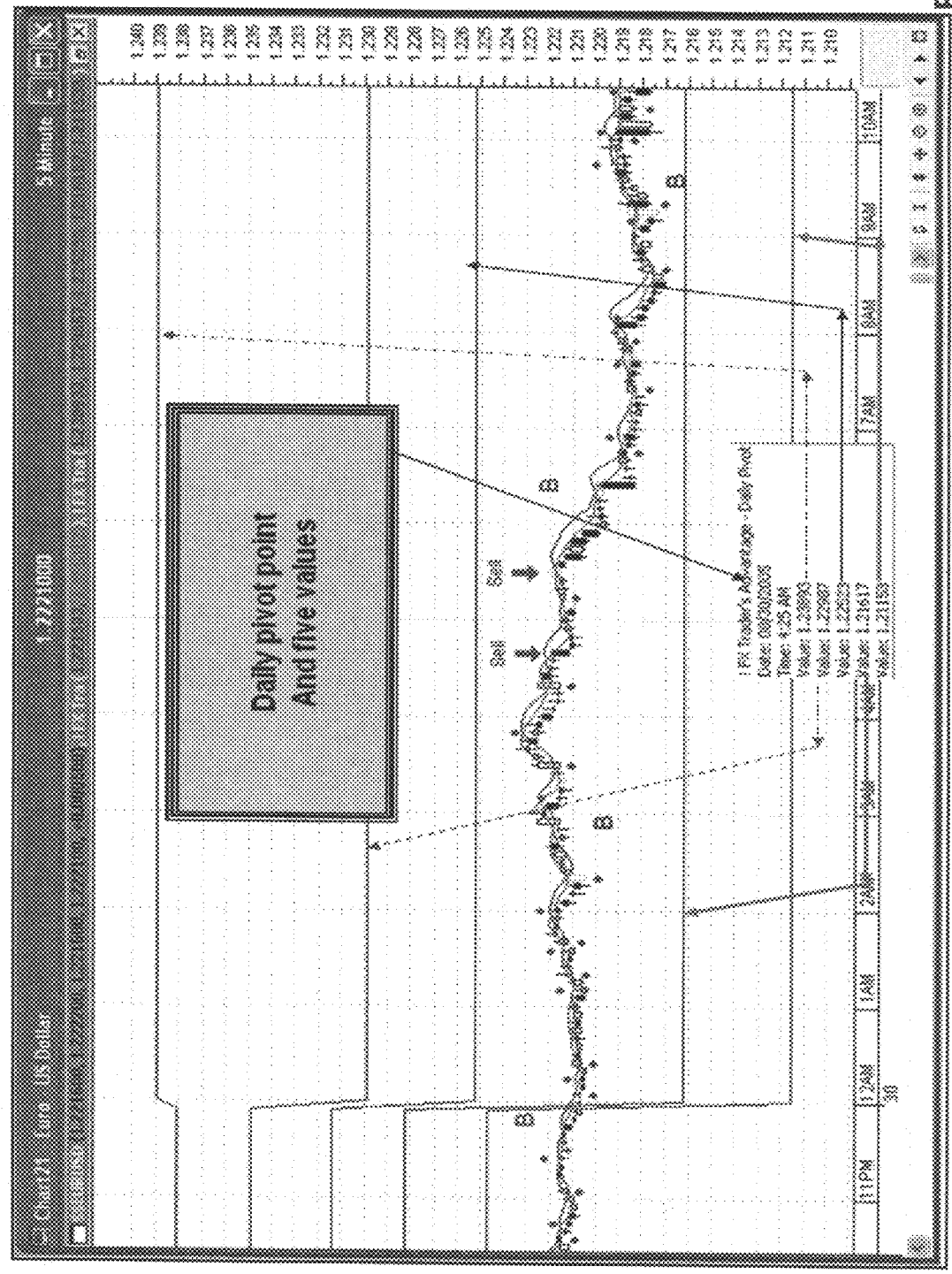
FIG. 59 shows an example of an analysis screen demonstrating market change indicators when using a using Daily Pivot Indicators and V-TWO Indicators superimposed on a Traditional Candle Chart with Golden Bar Indicators provided by the preferred computer real-time analysis system according to a preferred embodiment of the present invention.
Figure 60:
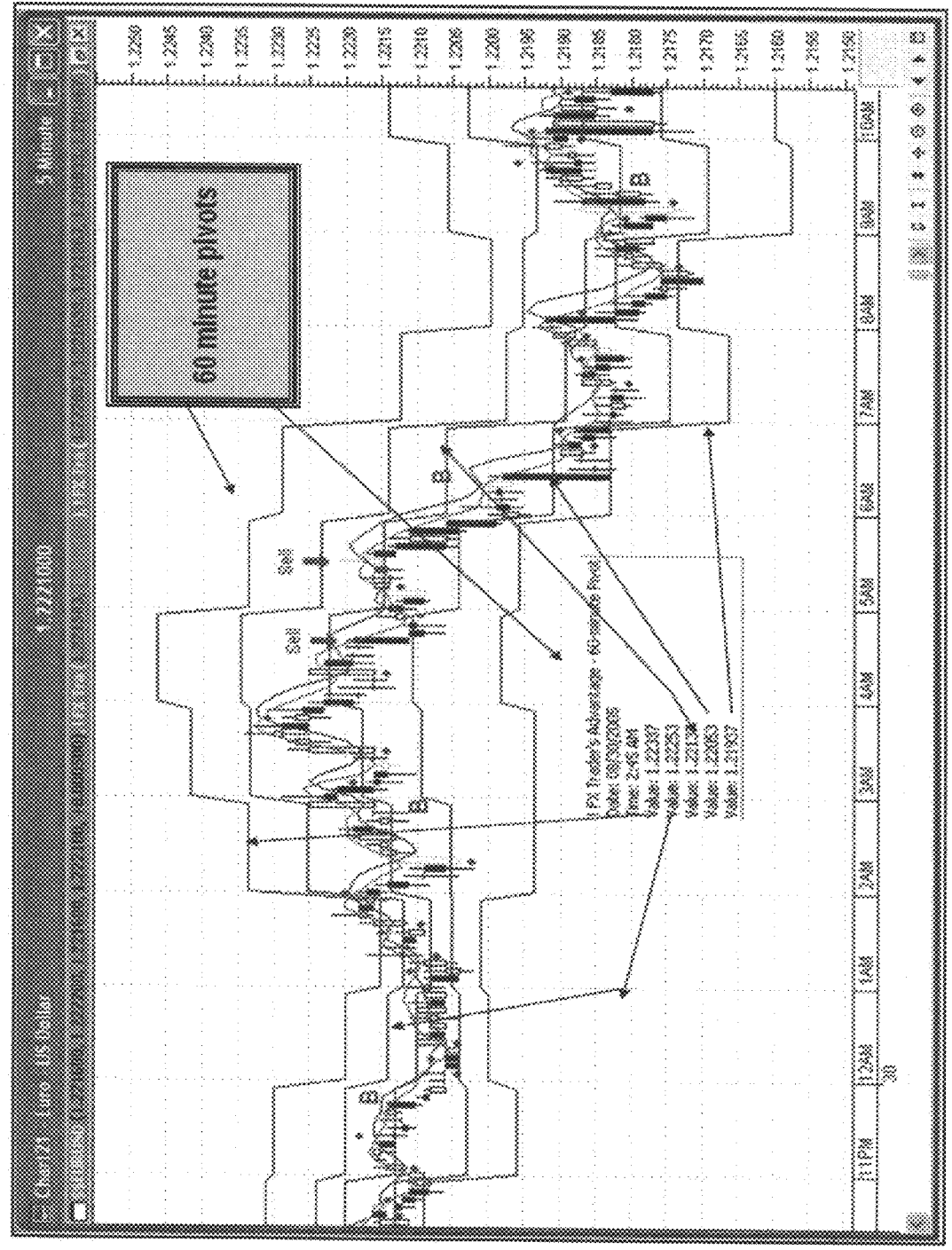
FIG. 60 shows an example of an analysis screen demonstrating market change indicators when using a using 60 Minute Pivot Indicators and V-TWO Indicators superimposed on a Traditional Candle Chart with Golden Bar Indicators provided by the preferred computer real-time analysis system according to a preferred embodiment of the present invention.
Figure 61:
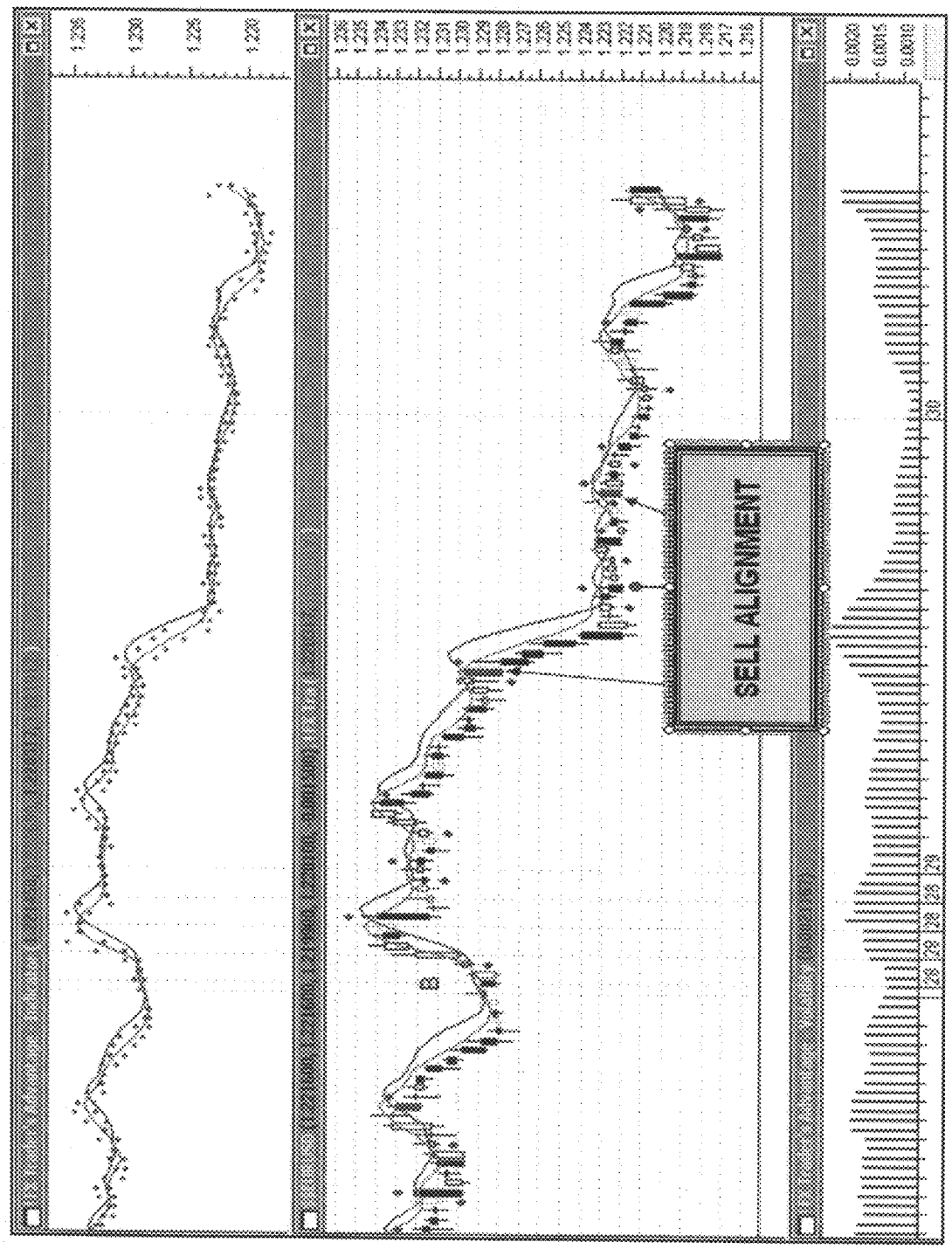
FIG. 61 shows an example of a fourth analysis screen demonstrating market changes indicators when using FX Indicator, Traditional Candle Chart and Volatility Indicator suggesting a selling decision alignment provided by the preferred computer real-time analysis system according to a preferred embodiment of the present invention.
Figure 62:
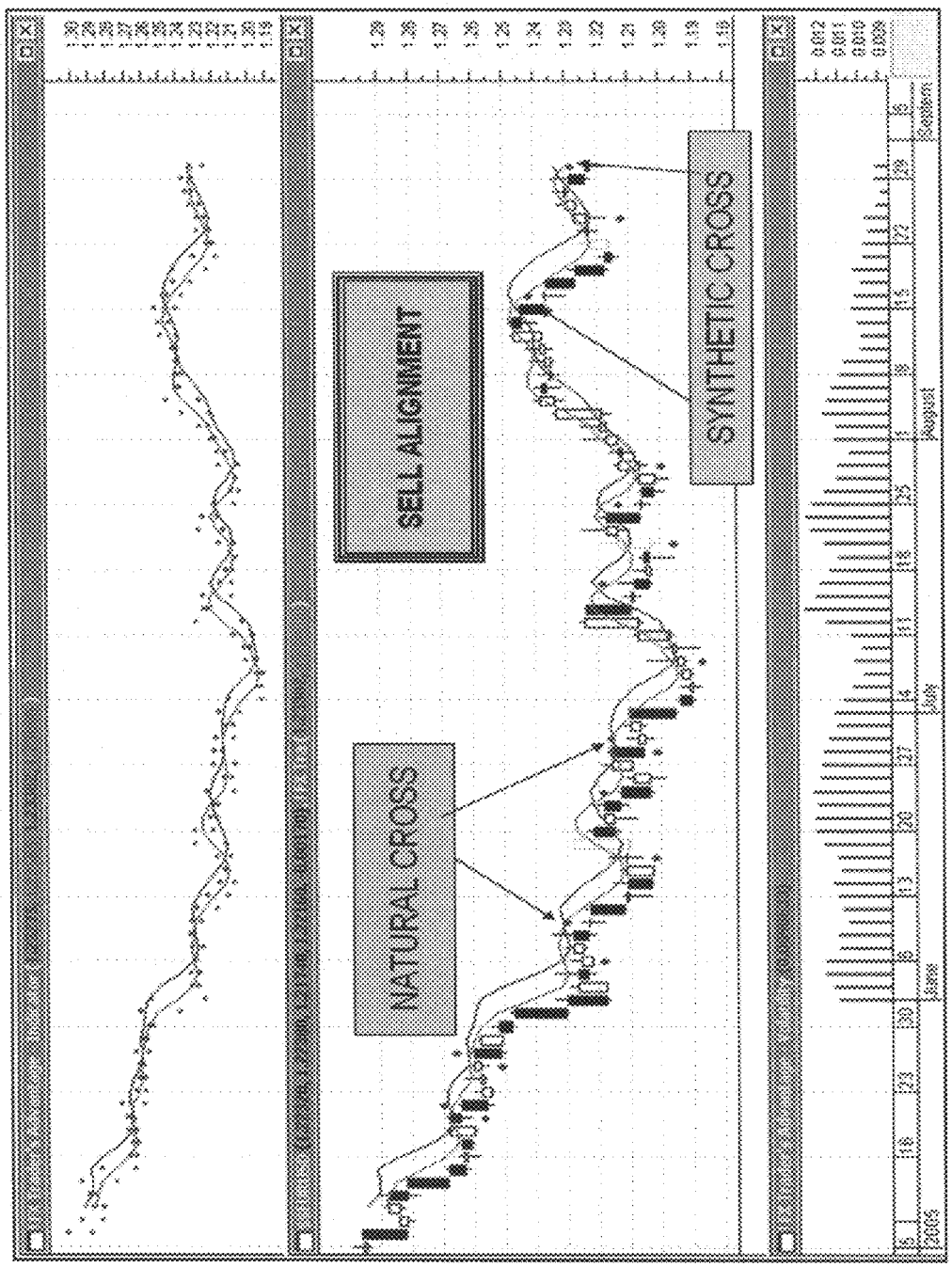
FIG. 62 shows an example of a fifth analysis screen demonstrating market changes indicators when using FX Indicator, Traditional Candle Chart and Volatility Indicator suggesting a selling decision alignment and natural and synthetic crosses provided by the preferred computer real-time analysis system according to a preferred embodiment of the present invention.
Figure 63:
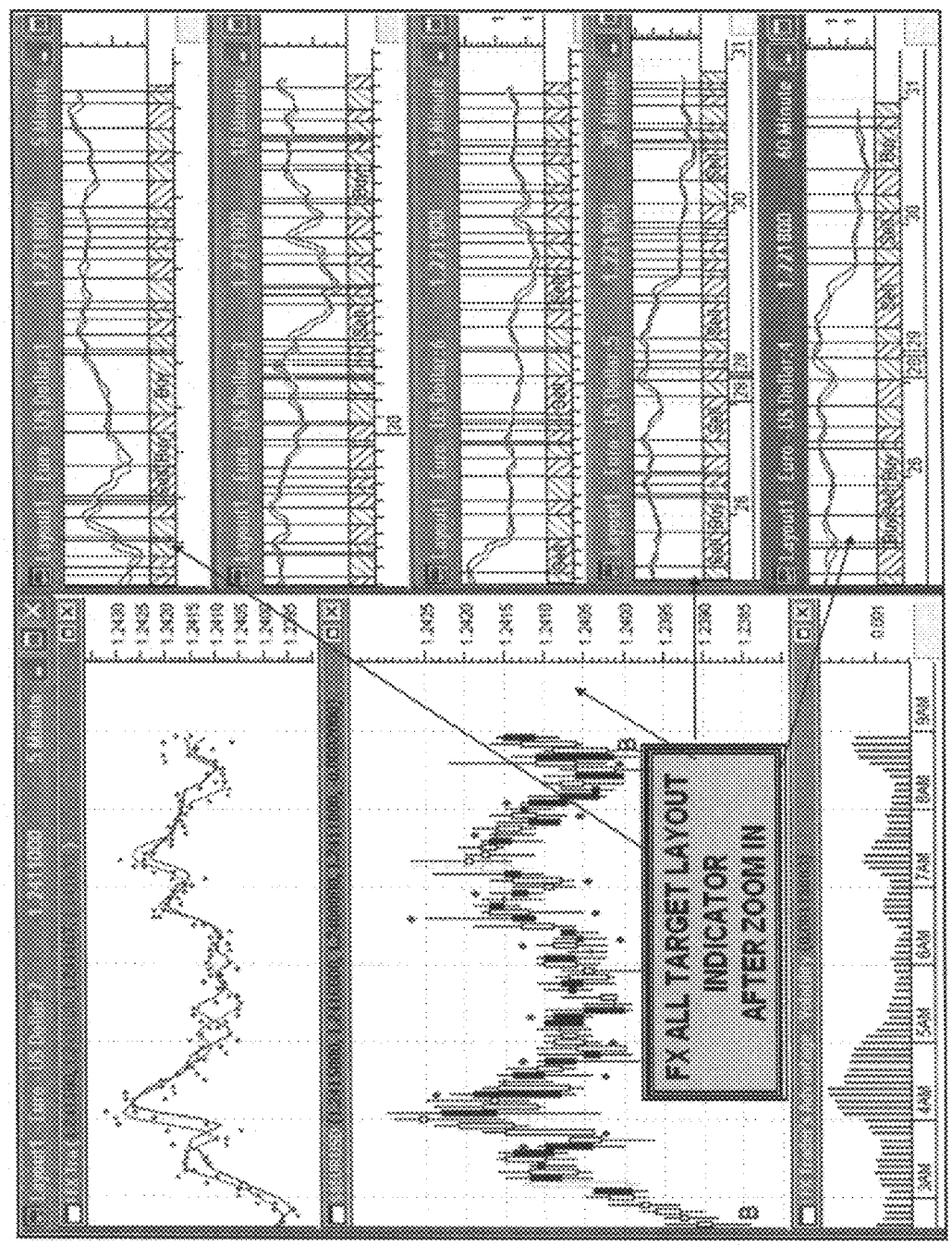
FIG. 63 shows an example of an FX All Target analysis screen demonstrating market changes indicators when using FX Indicator, Traditional Candle Chart and Volatility Indicator and Day Trader Heaven Indicators provided by the preferred computer real-time analysis system according to a preferred embodiment of the present invention.

Preferably, training will include instruction on initial set up of the desired analysis screens and indicators. Selected example steps of the method for loading an analysis screen are provided in FIG. 44, FIG. 45, and FIG. 46 culminating in presentation of an analysis screen as shown in FIG. 47, FIG. 52, FIG. 53, and FIG. 56. Further, as shown in FIG. 47, preferably V_FOUR indicators are provided in the upper portion of the screen with a candle chart in the middle section and a volatility indicator chart at the bottom (at least herein embodying providing at least one first teaching aid comprising at least one first explanatory chart associated with at least one example of such at least one analysis screen; and at least herein embodying wherein such at least one analysis screen comprises at least one indicator signal computed by said computer real-time analysis system). As shown in FIG. 56 an analysis screen may be adjusted to present only one indicator, in this case volatility. Upon reading the teachings of this specification, those with ordinary skill in the art will now understand that, under appropriate circumstances, considering such issues as training requirements, user preferences, available data, etc., other combinations of indicators, such as FX Pivot Theory with candle charts and V-TWO, etc., may suffice. Preferably, traders are provided instruction on the methods of calculation associated with each of the indicators. Refer to FIG. 4, FIG. 5, FIG. 6, FIG. 7 and FIG. 8 for examples of presentation of calculations used for various indicators (at least herein embodying providing at least one second teaching aid comprising at least one second explanatory chart relating to at least one method of computation of such at least one indicator signal).

According to a preferred embodiment of the present invention, the preferred instruction method also includes identification and description of the methods of interpreting the market change information identified by the indicators individually and in combination. As shown in FIG. 1, FIG. 2 a single indicator, V-TWO, is used to identify changes in a market and what the changes suggest. As shown in FIG. 42, FIG. 48, FIG. 49, FIG. 50, FIG. 51, FIG. 54, FIG. FIG. 55, FIG. 56, FIG. 57, FIG. 58, FIG. 59, FIG. 60, FIG. 61, FIG. 62 and FIG. 63 multiple indicators can be combined to identify market changes and permit a trader to validate each indicator against other indicators as to what the identified changes suggest. Preferably, the instruction method presents various market change scenarios and combinations of the indicators embodied in the preferred computer real-time analysis system (at least herein embodying providing at least one third teaching aid comprising at least one third explanatory chart relating to interpretation of such at least one indicator signal).

According to a preferred embodiment of the present invention, the preferred instruction method also provides trading-decision guidance based on market changes identified by one or more indicators. As shown in FIG. 19, FIG. 20, FIG. 20A, FIG. 25, FIG. 26, and FIG. 29 instruction preferably provides suggested actions that may be taken by a trader and the related risks. Preferably, for example, as shown in FIG. 25 and FIG. 26 the instruction method provides for the use of multiple indicators such as V-TWO, and Golden Bar to identify market changes, the action suggested by the changes, some indication of expected market direction, suggested actions and related risks (at least herein embodying providing at least one fourth teaching aid comprising at least one fourth explanatory chart relating to directly guiding trading decisions of such at least one trader; and at least herein embodying providing instruction of such at least one trader relating to such directly guiding trading decisions of such at least one trader using such at least one first teaching aid, such at least one second teaching aid, such at least one third teaching aid, and such at least one fourth teaching aid).

Further, according to a preferred embodiment of the present invention, curricula encompassing each of the examples and explanations prepared for each of the concepts embodied in the preferred computer real-time analysis system will preferably be prepared, for use in classroom-based sessions, as Internet-based (on-line) sessions and as off-line sessions provided on at least one type of distributable media for the following teaching formats:

workshop;
seminar;
tutorial;
basic concepts;
advanced concepts; and
interactive hands-on.

Additionally, according to a preferred embodiment of the present invention, preferably conducting live classroom-based sessions and Internet-based sessions for:

at least one workshop;
at least one seminar;
at least one tutorial;
at least one interactive hands-on training;
at least one basic concepts session; and
at least one advanced concepts session.

Preferably, at least one session of at least one of the teaching formats will be recorded for distribution, via the Internet or on distributable media, as at least one recorded training session.

Summary

The primary concept of V-TWO Indicator and V-FOUR Indicator, Dots, Golden Bar and Critical Path is to preferably improve the ease and accuracy of trading in any tradable instrument. Preferably, the trader can save time evaluating charts and indicators, avoid confusion and produce more favorable results.

Although applicant has described applicant's preferred embodiments of this invention, it will be understood that the broadest scope of this invention includes modifications such as diverse shapes, sizes, and materials. Such scope is limited only by the below claims as read in connection with the above specification.

Further, many other advantages of applicant's invention will be apparent to those skilled in the art from the above descriptions and the below claims.

What is claimed is:

1. A computer method relating to real-time transforming at least one "data-feed" relating to historical time-relevant trading data relating to at least one tradable instrument, comprising:

a) receiving, by at least one computer, historical time-relevant trading data relating to such at least one tradable instrument;

b) calculating, by at least one computer, as at least one first calculation, at least one first time-relevant value representing historical collective desire to sell such at least one tradable instrument using such historical time-relevant trading data for at least one plurality of timeframes, wherein such at least one plurality of timeframes comprise discrete periods of time, each of substantially different time lengths than each other, from at least one minute to at least one year;

c) calculating, by at least one computer, as at least one second calculation, at least one second time-relevant value representing historical collective desire to buy such at least one tradable instrument using such historical time-relevant trading data for such at least one plurality of timeframes;

d) comparing, by at least one computer, such historical collective desire to sell such at least one tradable instrument to such historical collective desire to buy such at least one tradable instrument to make a first determining of at least one "greater-lesser relationship" between such historical collective desire to buy and such historical collective desire to sell for at least one timeframe of such at least one plurality of timeframes;

e) comparing, by at least one computer, in at least one prior timeframe, such historical collective desire to sell such at least one tradable instrument to such historical collective desire to buy such at least one tradable instrument to make a second determining of at least one "greater-lesser relationship" between such historical collective desire to buy and such historical collective desire to sell for at least one timeframe of such at least one plurality of timeframes;

f) comparing, by at least one computer, such first determining with such second determining g) identifying, by at least one computer, any reversal of such "greater-lesser relationship" between such first determining and such second determining;

h) creating, by at least one computer, at least one set of buy/sell indicators for such at least one tradable instrument for each such indentified reversal;

i) creating, by at least one computer, at least one first graphical representation of such at least one first time-relevant value for such at least one timeframe;

j) creating, by at least one computer, at least one second graphical representation of such at least one second time-relevant value for such at least one timeframe;

k) wherein such at least one first graphical representation and such at least one second graphical representation are presented, by at least one computer, jointly in at least one comparative analysis chart;

l) wherein such real-time transforming at least one "data-feed" to provide such graphical representations is accomplished;

m) comparing, by at least one computer, such historical collective desire to sell such at least one tradable instrument to such historical collective desire to buy such at least one tradable instrument to determine at least one "greater-lesser relationship" for at least one plurality of such periods of time of such at least one plurality of timeframes;

n) presenting, by at least one computer, results of such comparison for each of such at least one plurality of such periods of time for such at least one plurality of timeframes; and o) presenting, by at least one computer, at least one notice when such at least one reversal of such "greater-lesser relationship" occurs in at least two such discrete periods of time.

2. The computer method according to claim 1 further comprising:
   a) calculating, by at least one computer, at least one third time-relevant value for such at least one timeframe;
   b) wherein such at least one third time-relevant value is based on at least one lowest price paid for such at least one tradable instrument for such at least one timeframe;
   c) calculating, by at least one computer, at least one fourth time-relevant value for such at least one timeframe;
   d) wherein such at least one fourth time-relevant value is based on at least one highest price paid for such at least one tradable instrument for such at least one timeframe;
   e) creating, by at least one computer, at least one third graphical representation of such at least one third time-relevant value for such at least one timeframe;
   f) creating, by at least one computer, at least one fourth graphical representation of such at least one fourth time-relevant value for such at least one timeframe; and
   g) wherein such at least one third graphical representation and such at least one fourth graphical representation are each presented, by at least one computer, jointly with such at least one first graphical representation and such at least one second graphical representation on such at least one comparative analysis chart.

3. The computer method according to claim 2 further comprising:
   a) calculating, by at least one computer, at least one fifth time-relevant value representing volatility of such at least one tradable instrument for such at least one timeframe;
   b) wherein such at least one fifth time-relevant value is based on at least one range of prices paid for such at least one tradable instrument for such at least one timeframe;
   c) creating, by at least one computer, at least one fifth graphical representation of such at least one fifth time-relevant value for such at least one timeframe;
   d) presenting, by at least one computer, such at least one fifth graphical representation in at least one volatility chart; and
   e) presenting, by at least one computer, such at least one volatility chart in conjunction with such at least one comparative analysis chart.

4. The computer method according to claim 2 wherein such historical time-relevant trading data comprises at least:
   a) highest price for such at least one tradable instrument for such at least one timeframe;
   b) lowest price for such at least one tradable instrument for such at least one timeframe;
   c) opening price for such at least one tradable instrument for such at least one timeframe; and
   d) closing price for such at least one tradable instrument for such at least one timeframe.

5. The computer method according to claim 4 wherein:
   a) such at least one first time-relevant value is based on such at least one first calculation using at least such closing price for such at least one tradable instrument for such at least one timeframe; and
   b) such at least one second time-relevant value is based on such at least one second calculation using at least such closing price for such at least one tradable instrument for such at least one timeframe.

6. The computer method according to claim 1 wherein such at least one set of buy/sell indicators comprises:
   a) at least one sell indicator; and
   b) at least one buy indicator.

7. The computer method according to claim 6 further comprising:
   a) presenting, by at least one computer, such at least one sell indicator on such at least one comparative analysis chart when such at least one first time-relevant value is greater than such at least one second time-relevant value; and
   b) presenting, by at least one computer, such at least one buy indicator on such at least one comparative analysis chart when such at least one second time-relevant value is greater than such at least one first time-relevant value for at least one timeframe.

8. The computer method according to claim 1 further comprising:
   a) evaluating, by at least one computer, at least two timeframes, in parallel, within such at least one plurality of timeframes;
   b) calculating, by at least one computer, in substantially real-time, any historically time-relevant trading trends, at least whether bearish trends or bullish trends, within each timeframe of such at least one plurality of timeframes;
   c) comparing, by at least one computer, each such calculation of such trading trends in such each timeframe with at least one trading trend in at least one timeframe prior to such each timeframe; and
   d) presenting, by at least one computer, at least one notice of any such comparisons comprising a change in such trading trend (bearish versus bullish).

9. The computer method according to claim 8 wherein each such prior timeframe, compared to each such timeframe, comprises at least one time-adjacent and equal-length timeframe as each such timeframe.

10. The computer method according to claim 1 further comprising automatically presenting, by at least one computer, at least one notice when such at least one reversal of such "greater-lesser relationship" occurs in at least three such discrete periods of time.

11. The computer method according to claim 1 further comprising automatically presenting, by at least one computer, at least one notice when such at least one reversal of such "greater-lesser relationship" occurs in at least four such discrete periods of time.

12. The computer method according to claim 1 further comprising:
   a) creating, by at least one computer, at least one first symbol representing occurrence of such at least one reversal of such "greater-lesser relationship" for joint presentation with at least one other chart;
   b) creating, by at least one computer, at least one second symbol representing such "greater-lesser relationship" for joint presentation with such at least one other chart;
   c) creating, by at least one computer, at least one third symbol representing occurrence of such at least one reversal of such "greater-lesser relationship" in at least three such discrete periods of time for joint presentation with such at least one other chart; and
   d) creating, by at least one computer, at least one fourth symbol representing occurrence of such at least one reversal of such "greater-lesser relationship" in at least four such discrete periods of time for joint presentation with such at least one other chart.

13. A computer real-time analysis system, relating to assisting decision making, by at least one trader, related to buying and selling at least one tradable instrument comprising:

a) at least one computer processor adapted for receiving, in substantially real-time, historical time-relevant trading data relating to such at least one tradable instrument;

b) at least one computer processor adapted for calculating, as at least one first calculation, in substantially real-time, at least one first time-relevant value representing historical collective desire to sell such at least one tradable instrument using such historical time-relevant trading data for at least one plurality of timeframes, wherein such at least one plurality of timeframes comprise discrete periods of time, each of substantially different time lengths than each other, from at least one minute to at least one year;

c) at least one computer processor adapted for calculating, as at least one second calculation, in substantially real-time, at least one second time-relevant value representing historical collective desire to buy such at least one tradable instrument using such historical time-relevant trading data for such at least one plurality of timeframes;

d) at least one computer processor adapted for comparing, in substantially real-time, such historical collective desire to sell such at least one tradable instrument to such historical collective desire to buy such at least one tradable instrument to make a first determining of at least one "greater-lesser relationship" between such historical collective desire to buy and such historical collective desire to sell for at least one timeframe of such at least one plurality of timeframes;

e) at least one computer processor for comparing, in at least one prior timeframe, such historical collective desire to sell such at least one tradable instrument to such historical collective desire to buy such at least one tradable instrument to make a second determining of at least one "greater-lesser relationship" between such historical collective desire to buy and such historical collective desire to sell for at least one timeframe of such at least one plurality of timeframes;

f) at least one computer processor adapted for comparing such first determining with such second determining;

g) at least one computer processor adapted for identifying any reversal of such "greater-lesser relationship" between such first determining and such second determining;

h) at least one computer processor adapted for creating, in substantially real time, at least one set of buy/sell indicators for such at least one tradable instrument for each such indentified reversal;

i) at least one computer processor adapted for creating at least one first graphical representation of such at least one first time-relevant value for such at least one timeframe;

j) at least one computer processor adapted for creating at least one second graphical representation of such at least one second time-relevant value for such at least one timeframe;

k) at least one computer processor adapted for jointly displaying such at least one first graphical representation and such at least one second graphical representation in at least one comparative analysis chart providing at least one system relating to comparative analysis;

l) at least one computer processor adapted for automatically comparing such historical collective desire to sell such at least one tradable instrument to such historical collective desire to buy such at least one tradable instrument to determine at least one "greater-lesser relationship" for at least one plurality of such periods of time of such at least one plurality of timeframes;

m) at least one computer processor adapted for automatically notifying such at least one trader of such results of such comparison for each of such at least one plurality of such periods of time for such at least one plurality of timeframes; and n) at least one computer processor adapted for automatically notifying such at least one trader when such at least one reversal of such "greater-lesser relationship" occurs in at least two such discrete periods of time.

14. The computer real-time analysis system according to claim 13 further comprising:

a) at least one computer processor adapted for calculating at least one third time-relevant value for such at least one timeframe;

b) wherein such at least one third time-relevant value is based on at least one lowest price paid for such at least one tradable instrument for such at least one timeframe;

c) at least one computer processor adapted for calculating at least one fourth time-relevant value for such at least one timeframe;

d) wherein such at least one fourth time-relevant value is based on at least one highest price paid for such at least one tradable instrument for such at least one timeframe;

e) at least one computer processor adapted for creating at least one third graphical representation of such at least one third time-relevant value for such at least one timeframe;

f) at least one computer processor adapted for creating at least one fourth graphical representation of such at least one fourth time-relevant value for such at least one timeframe; and g) at least one computer processor adapted for jointly displaying such at least one third graphical representation and such at least one fourth graphical representation on such at least one comparative analysis chart.

15. The computer real-time analysis system according to claim 13 further comprising:

a) at least one computer processor adapted for calculating at least one fifth time-relevant value representing volatility of such at least one tradable instrument for such at least one timeframe;

b) wherein such at least one fifth time-relevant value is based on at least one range of prices paid for such at least one tradable instrument for such at least one timeframe;

c) at least one computer processor adapted for creating at least one fifth graphical representation of such at least one fifth time-relevant value for such at least one timeframe;

d) at least one computer processor adapted for displaying such at least one fifth graphical representation in at least one volatility chart; and e) at least one computer processor adapted for displaying such at least one volatility chart in conjunction with such at least one comparative analysis chart.

16. The computer real-time analysis system according to claim 13 wherein such at least one time relevant historical trading data comprises at least:

a) highest price for such at least one tradable instrument for such at least one timeframe;

b) lowest price for such at least one tradable instrument for such at least one timeframe;

c) opening price for such at least one tradable instrument for such at least one timeframe; and d) closing price for such at least one tradable instrument for such at least one timeframe.

17. The computer real-time analysis system according to claim 13 wherein:
   a) such at least one first time-relevant value is based on such at least one first calculation using such closing price for such at least one tradable instrument for such at least one timeframe; and
   b) such at least one second time-relevant value is based on such at least one second calculation using such closing price for such at least one tradable instrument for such at least one timeframe.

18. The computer real-time analysis system according to claim 13 wherein such at least one set of buy/sell indicators comprises:
   a) at least one sell indicator; and
   b) at least one buy indicator.

19. The computer real-time analysis system according to claim 18 comprises:
   a) at least one computer processor adapted for displaying such at least one sell indicator on such at least one comparative analysis chart when such at least one first time-relevant value is greater than such at least one second time-relevant value for at least one timeframe; and
   b) at least one computer processor adapted for displaying such at least one buy indicator on such at least one comparative analysis chart when such at least one second time-relevant value is greater than such at least one first time-relevant value for at least one timeframe.

20. The computer real-time analysis system according to claim 13 further comprising:
   a) at least one computer processor adapted for parallel evaluation of such at least two timeframes within at least one plurality of timeframes comprising discrete periods of time, each of substantially different time lengths than each other, and each ending at the present time, from at least one minute to at least one year;
   b) at least one computer processor adapted for calculating, in substantially real-time, any historically time-relevant trading trends, at least whether bearish trends or bullish trends, within each timeframe of such at least one plurality of timeframes signals;
   c) at least one computer processor adapted for comparing each such calculation of such trading trends in such each timeframe with at least one trading trend in at least one timeframe prior to such each timeframe; and
   d) at least one computer processor adapted for notifying such at least one trader of any such comparisons comprising a change in such trading trend (bearish versus bullish).

21. The computer real-time analysis system according to claim 20 wherein each such prior timeframe, compared to each such timeframe, comprises at least one time-adjacent and equal-length timeframe as each such timeframe.

22. The computer real-time analysis system according to claim 13 further comprising at least one computer processor adapted for automatically notifying such at least one trader when such at least one reversal of such "greater-lesser relationship" occurs in at least three such discrete periods of time.

23. The computer real-time analysis system according to claim 13 further comprising at least one computer processor adapted for automatically notifying such at least one trader when such at least one reversal of such "greater-lesser relationship" occurs in at least four such discrete periods of time.

24. The computer real-time analysis system according to claim 13 further comprising:
   a) at least one computer processor adapted for creating at least one first symbol representing occurrence of such at least one reversal of such "greater-lesser relationship" for joint presentation with at least one other chart;
   b) at least one computer processor adapted for creating at least one second symbol representing such "greater-lesser relationship" for joint presentation with such at least one other chart;
   c) at least one computer processor adapted for creating at least one third symbol representing occurrence of such at least one reversal of such "greater-lesser relationship" in at least three such discrete periods of time for joint presentation with such at least one other chart; and
   d) at least one computer processor adapted for creating at least one fourth symbol representing occurrence of such at least one reversal of such "greater-lesser relationship" in at least four such discrete periods of time for joint presentation with such at least one other chart.

* * * * *